(12) United States Patent
Mathison

(10) Patent No.: US 9,347,614 B2
(45) Date of Patent: May 24, 2016

(54) METHOD AND SYSTEM FOR TANK REFILLING USING ACTIVE FUELING SPEED CONTROL

(71) Applicant: Honda Motor Co., Ltd., Tokyo (JP)

(72) Inventor: Steve Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 131 days.

(21) Appl. No.: 14/300,229

(22) Filed: Jun. 9, 2014

(65) Prior Publication Data

US 2014/0290790 A1     Oct. 2, 2014

Related U.S. Application Data

(63) Continuation-in-part of application No. 13/832,311, filed on Mar. 15, 2013, which is a continuation-in-part of application No. 12/982,966, filed on Dec. 31, 2010, now Pat. No. 8,783,303, application No. 14/300,229, (Continued)

(51) Int. Cl.
  *B65B 1/30*     (2006.01)
  *F17C 5/06*     (2006.01)
  *F17C 5/00*     (2006.01)

(52) U.S. Cl.
  CPC . *F17C 5/06* (2013.01); *F17C 5/007* (2013.01); *F17C 2201/0109* (2013.01);

(Continued)

(58) Field of Classification Search
  CPC ...... F17C 5/06; F17C 5/007; F17C 2250/043; F17C 2250/0439; F17C 2250/0694; F17C 2250/0495; F17C 2250/0631; F17C 2260/023; F17C 2260/026; F17C 2260/022; F17C 2260/025

See application file for complete search history.

(56) References Cited

U.S. PATENT DOCUMENTS

| | | |
|---|---|---|
| 3,536,109 A | 10/1970 | Ginsburgh et al. |
| 4,347,472 A | 8/1982 | Lemelson |

(Continued)

FOREIGN PATENT DOCUMENTS

| | | |
|---|---|---|
| CN | 1826492 | 8/2006 |
| CN | 101087975 | 12/2007 |

(Continued)

OTHER PUBLICATIONS

Office Action of U.S. Appl. No. 14/280,550 dated Sep. 8, 2015, 28 pages.

(Continued)

*Primary Examiner* — Jason K Niesz
(74) *Attorney, Agent, or Firm* — Rankin, Hill & Clark LLP

(57) ABSTRACT

Disclosed is an improved analytical method that can be utilized by hydrogen filling stations for directly and accurately calculating the end-of-fill temperature in a hydrogen tank that, in turn, allows for improvements in the fill quantity while tending to reduce refueling time. The calculations involve calculation of a composite heat capacity value, MC, from a set of thermodynamic parameters drawn from both the tank system receiving the gas and the station supplying the gas. These thermodynamic parameters are utilized in a series of simple analytical equations to define a multi-step process by which target fill times, final temperatures and final pressures can be determined. The parameters can be communicated to the station directly from the vehicle or retrieved from a database accessible by the station. Because the method is based on direct measurements of actual thermodynamic conditions and quantified thermodynamic behavior, significantly improved tank filling results can be achieved.

20 Claims, 37 Drawing Sheets

Related U.S. Application Data which is a continuation-in-part of application No. 13/843,537, filed on Mar. 15, 2013, now Pat. No. 9,212,783, which is a continuation-in-part of application No. 12/982,966.

(60) Provisional application No. 61/833,134, filed on Jun. 10, 2013, provisional application No. 61/332,919, filed on May 10, 2010, provisional application No. 61/326,375, filed on Apr. 21, 2010.

(52) U.S. Cl.
CPC .. *F17C 2201/054* (2013.01); *F17C 2203/0604* (2013.01); *F17C 2203/0619* (2013.01); *F17C 2203/0624* (2013.01); *F17C 2221/012* (2013.01); *F17C 2221/033* (2013.01); *F17C 2223/0123* (2013.01); *F17C 2223/0153* (2013.01); *F17C 2223/0161* (2013.01); *F17C 2223/036* (2013.01); *F17C 2225/0123* (2013.01); *F17C 2225/036* (2013.01); *F17C 2250/043* (2013.01); *F17C 2250/0439* (2013.01); *F17C 2250/0443* (2013.01); *F17C 2250/0491* (2013.01); *F17C 2250/0495* (2013.01); *F17C 2250/0631* (2013.01); *F17C 2250/0694* (2013.01); *F17C 2260/022* (2013.01); *F17C 2260/023* (2013.01); *F17C 2260/025* (2013.01); *F17C 2260/026* (2013.01); *F17C 2265/065* (2013.01); *F17C 2270/0139* (2013.01); *F17C 2270/0168* (2013.01); *F17C 2270/0176* (2013.01); *Y02E 60/321* (2013.01)

(56) References Cited

U.S. PATENT DOCUMENTS

| | | |
|---|---|---|
| 4,398,172 A | 8/1983 | Carroll et al. |
| 4,490,798 A | 12/1984 | Franks et al. |
| 4,527,600 A | 7/1985 | Fisher et al. |
| 4,934,419 A | 6/1990 | Lamont et al. |
| 5,058,044 A | 10/1991 | Stewart et al. |
| 5,202,617 A | 4/1993 | Nor |
| 5,204,819 A | 4/1993 | Ryan |
| 5,238,030 A | 8/1993 | Miller et al. |
| 5,259,424 A | 11/1993 | Miller et al. |
| 5,327,066 A | 7/1994 | Smith |
| 5,359,522 A | 10/1994 | Ryan |
| 5,479,966 A | 1/1996 | Tison et al. |
| 5,564,306 A | 10/1996 | Miller |
| 5,569,922 A | 10/1996 | Clarke |
| 5,570,729 A | 11/1996 | Mutter |
| 5,594,318 A | 1/1997 | Nor et al. |
| 5,602,745 A | 2/1997 | Atchley et al. |
| 5,628,349 A | 5/1997 | Diggins et al. |
| 5,750,995 A | 5/1998 | Clarke |
| 5,762,118 A | 6/1998 | Epworth et al. |
| 5,868,176 A | 2/1999 | Barajas et al. |
| 5,868,179 A | 2/1999 | Hartsell, Jr. |
| 5,881,779 A * | 3/1999 | Kountz ............ F17C 5/06 141/2 |
| 5,956,259 A | 9/1999 | Hartsell, Jr. et al. |
| 5,970,786 A | 10/1999 | Smith et al. |
| 5,971,042 A | 10/1999 | Hartsell, Jr. |
| 6,024,137 A | 2/2000 | Strnad et al. |
| 6,068,030 A | 5/2000 | Tatsuno |
| 6,070,156 A | 5/2000 | Hartsell, Jr. |
| 6,073,081 A | 6/2000 | Hettinger et al. |
| 6,089,284 A | 7/2000 | Kaehler et al. |
| 6,185,501 B1 | 2/2001 | Smith et al. |
| 6,237,647 B1 | 5/2001 | Pong et al. |
| 6,250,347 B1 | 6/2001 | Tatsuno |
| 6,338,008 B1 | 1/2002 | Kohut et al. |
| 6,343,241 B1 | 1/2002 | Kohut et al. |
| 6,381,514 B1 | 4/2002 | Hartsell, Jr. |
| 6,382,269 B1 | 5/2002 | Tatsuno |
| 6,394,150 B1 | 5/2002 | Haimovich et al. |
| 6,401,767 B1 | 6/2002 | Cohen et al. |
| 6,463,967 B1 | 10/2002 | Boyle |
| 6,497,363 B1 | 12/2002 | Kelrich |
| 6,598,792 B1 | 7/2003 | Michot et al. |
| 6,619,336 B2 | 9/2003 | Cohen et al. |
| 6,672,340 B2 * | 1/2004 | Mutter ............ F17C 5/06 141/21 |
| 6,688,342 B2 | 2/2004 | Lewis |
| 6,708,573 B1 | 3/2004 | Cohen et al. |
| 6,727,809 B1 | 4/2004 | Smith |
| 6,745,801 B1 | 6/2004 | Cohen et al. |
| 6,822,551 B2 * | 11/2004 | Li ............ B67D 7/0401 340/10.1 |
| 6,964,821 B2 | 11/2005 | Hirakata |
| 7,059,364 B2 | 6/2006 | Kountz et al. |
| 7,171,989 B2 | 2/2007 | Corless et al. |
| 7,406,987 B2 | 8/2008 | Takano et al. |
| 7,412,994 B2 | 8/2008 | Corless et al. |
| 7,523,770 B2 | 4/2009 | Horowitz et al. |
| 7,543,611 B2 | 6/2009 | Kaellberg |
| 7,647,194 B1 * | 1/2010 | Casey ............ F17C 5/06 702/130 |
| 7,671,482 B2 | 3/2010 | Tighe |
| 7,820,313 B2 | 10/2010 | Winkler |
| 7,921,883 B2 | 4/2011 | Cohen et al. |
| 8,360,112 B2 | 1/2013 | Allidieres et al. |
| 8,517,062 B2 | 8/2013 | Allidieres et al. |
| 8,783,303 B2 | 7/2014 | Harty et al. |
| 2005/0103400 A1 | 5/2005 | Eichelberger et al. |
| 2005/0178463 A1* | 8/2005 | Kountz ............ F17C 9/02 141/4 |
| 2007/0079892 A1 | 4/2007 | Cohen et al. |
| 2007/0090937 A1 | 4/2007 | Stabler |
| 2008/0000542 A1 | 1/2008 | Cohen et al. |
| 2008/0185068 A1 | 8/2008 | Cohen et al. |
| 2008/0231836 A1 | 9/2008 | Curello et al. |
| 2008/0289720 A1 | 11/2008 | Takano et al. |
| 2009/0044877 A1* | 2/2009 | Faudou ............ F17C 5/06 141/4 |
| 2009/0107577 A1 | 4/2009 | Allidieres et al. |
| 2009/0205745 A1 | 8/2009 | Farese et al. |
| 2010/0121551 A1 | 5/2010 | Boss et al. |
| 2010/0185360 A1 | 7/2010 | Windbergs et al. |
| 2010/0241470 A1 | 9/2010 | Smith |
| 2010/0294393 A1 | 11/2010 | Allidieres et al. |
| 2010/0307636 A1 | 12/2010 | Uemura et al. |
| 2011/0035049 A1 | 2/2011 | Barrett |
| 2011/0100507 A1 | 5/2011 | Weitzhandler et al. |
| 2011/0259469 A1 | 10/2011 | Harty et al. |
| 2012/0192989 A1 | 8/2012 | Schulze |
| 2012/0267002 A1* | 10/2012 | Kittilsen ............ F17C 5/06 141/4 |

FOREIGN PATENT DOCUMENTS

| | | |
|---|---|---|
| DE | 19643801 | 5/1998 |
| EP | 0653585 | 5/1995 |
| EP | 1205704 | 5/2002 |
| EP | 2093475 | 8/2009 |
| EP | 1831598 | 1/2011 |
| WO | 2007077376 | 7/2007 |

OTHER PUBLICATIONS

Non final Office Action for related U.S. Appl. No. 12/982,966 dated Oct. 2, 2013.
International Search Report and Written Opinion of PCT/US2014/022935 dated Jul. 9, 2014, 10 pages.
Search Report from counterpart Chinese Patent Application 2011800308318 issued Jan. 10, 2014.
Office Action of U.S. Appl. No. 13/832,311 dated Oct. 7, 2015, 27 pages.

* cited by examiner

Applying the MC Method - Pressure Target $$T_{init} = T_{ambient} + \Delta T_{cold}, \Delta t = 0$$    Set cold soak temperature Text Format Vehicle Station $$m_{init} = V \times \rho_{init}(T_{init}, P_{init})$$    Calculate initial cold mass $$m_{add} = m_{cv} - m_{init}$$    Calculate additional mass $$u_{init} = u_{init}(T_{init}, P_{init})$$    Calculate initial internal energy $$h_{avg} = \frac{\Sigma m_{add} h_e(T, P)}{m_{add}}$$    Estimate average enthalpy to be delivered $$u_{adiabatic} = \frac{m_{init} u_{init} + m_{add} h_{avg}}{m_{cv}}$$    Calculate adiabatic internal energy $$T_{adiabatic} = T(\rho_{target}, P_{adiabatic}, u_{adiabatic})$$    Calculate adiabatic temperature $$MC = C + A \frac{U_{adiabatic}}{U_{init}} + g(1 - e^{-k\Delta t_j})^j$$    Calculate MC $$T_{final} = \frac{m_{cv} C_v T_{adiabatic} + MCT_{init}}{(MC + m_{cv} C_v)}$$    Calculate $T_{Final}$ $$P_{Target} = P(\rho_{target}, T_{Final})$$    Calculate Pressure Target Where $\rho_{target}$ = 100% SOC

FIG. 14

Step 3) Set Fill Time based on Hot Soak $T_{init}$ - $T_{ambient}$ using $P_{Target}$ from step 2)

Sets the Expected Outcome with Cold Soak Pressure Target and Hot soak Fill Speed $T_{init} = T_{ambient}$    Use ambient temperature $m_{init} = V \times \rho_{init}(T_{init}, P_{init})$    Calculate initial mass $m_{cv} = V \times \rho_{target}$    Set target SOC = 100%

$m_{add} = m_{cv} - m_{init}$    Calculate additional mass $u_{init} = u_{init}(T_{init}, P_{init})$    Calculate initial internal energy $h_{avg} = \dfrac{\Sigma m_{add} h_e(T, P)}{m_{add}}$    Estimate average enthalpy to be delivered $u_{adiabatic} = \dfrac{m_{init} u_{init} + m_{add} h_{avg}}{m_{cv}}$    Calculate adiabatic internal energy $T_{adiabatic} = T(\rho_{target}, P_{adiabatic}, u_{adiabatic})$    Calculate adiabatic temperature $MC = C + A \dfrac{U_{adiabatic}}{U_{init}} + g(1 - e^{-k\Delta t})^j$    Calcualte MC $T_{final} = \dfrac{m_{cv} C_v T_{adiabatic} + MCT_{init}}{(MC + m_{cv} C_v)}$    Calcualte $T_{Final}$ $P_{Target} = P(\rho_{target}, T_{Final})$    Calculate Resulting Pressure Target If $P_{target} > P_{TargetColdSoak}$ from Step 2), reduce $\rho_{target}$ by, for example, 1g/L

FIG. 15

| Fueling Methods (@ 70MPa) using -20C max pre-cooling | Type 3 Fill Time | Type 3 SOC | Type 4 Fill Time | Type 4 SOC | Station Cost | Station Reliability | Station Design Flexibility |
|---|---|---|---|---|---|---|---|
| Non-Comm J2601 Type B (-20C) | X | ○ | X | △ | △ | △ | X |
| Non-Comm using MC Method (-20C max but variable) | X | ○ | X | △ | ○ | ○ | ○ ** |
| Full-Comm J2601 Type B (-20C) | ◉ | ◉ | ○* | ◉ | △ | △ | X |
| Full-Comm using MC Method (-20C max but variable) | ◉ | ◉ | ○* | ◉ | ○ | ○ | ○ ** |
| ID Fill with MC Method (-20C max but variable) | ◉ | ◉ | ○* | ◉ | ○ | ○ | ○ ** |

\* Majority of tank systems
\*\* Station through put improves since customer can still fuel if pre-cooling capability falls outside the tolerance allowed in J2601. Cost improves since pre-cooling can be down-sized and operated at optimal temperature.

X = No Good    △ = OK (accpetable)    ○ = Good    ◉ = Excellent

FIG. 22

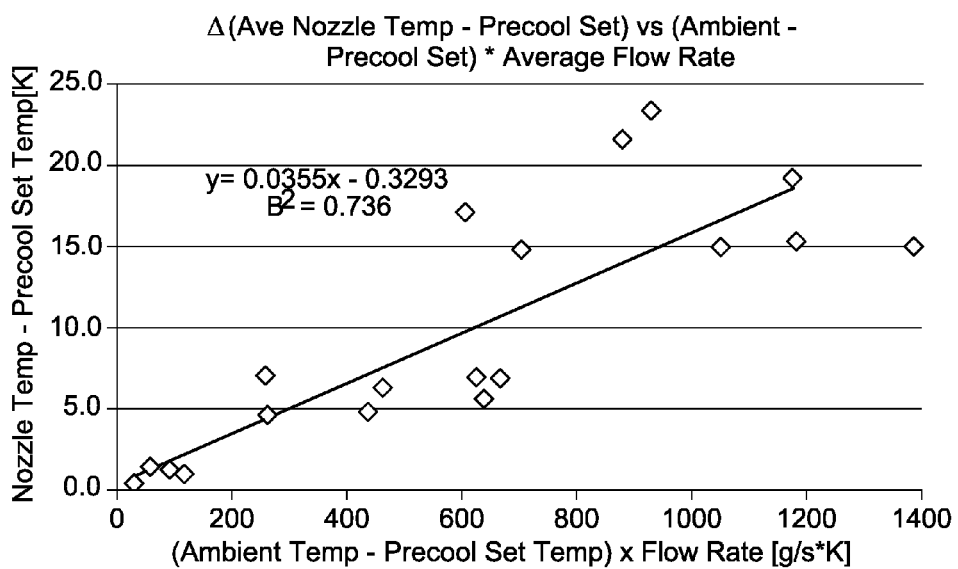

FIG. 23

Internal Energy of Hydrogen u(kJ/kg) = u(T(K),P(MPaa)) = [(-0.000000251102*P$^2$ + 0.00003270544*P + 0.020635744157)*T + (0.000110237178*P$^2$ + -0.014948338423*P + -0.706955972653)]/(2 * 1.00794)*1000

Enthalpy of Hydrogen h(kJ/kg) = h(T(K), P(MPaa)) =(4.92522E-15*P^5 - 0.0000000000016076*P^4 + 0.000000000214858)*P^3 - 0.0000000146189*P^2 + 0.000000454324*P^1 - 0.00000987705)*T^3+(0.00000000055184*P^4 - 0.000000141472*P^3 + 0.0000132881*P^2 - 0.000497343*P^1 + 0.0108438)*T^2+(0.00000000202796*P^5 - 0.000000664561*P^4 + 0.0000901478*P^3 - 0.00639724*P^2 + 0.225139*P^1 + 10.4372)*T+(-0.000000255167*P^5 + 0.0000852825*P^4 - 0.0119306*P^3 + 0.894471*P^2 - 27.6592*P^1 + 112.034)

Temperature of Hydrogen T(K) = T(u(kJ/kg), P(MPaa)) = (0.000001148*P$^2$ - 0.000148149*P + 0.0976624642)*u + (-0.0047605417*P$^2$ + 0.6412591317*P + 34.3729762461)

Density of Hydrogen = $\rho$ (kg/m^3) = $\rho$ (T(K), P(MPaa)) = P*1000/((8.314/(2*1.00794))*T*((5.15401806214819E-28*(1.8*T)^4 - 1.3150180571689E-24*(1.8*T)^3 + 1.27273435029312E-21*(1.8*T)^2 - 5.55685616698696E 19*(1.8*T) + 9.24572639059417E-17)*(P*0.145037743897283*1000)^4 + (-1.9122168897314E-23*(1.8*T)^4 + 4.91138876984723E-20*(1.8*T)^3 - 4.79768947207089E-17*(1.8*T)^2 + 2.12330577989168E-14*(1.8*T) - 3.60842277195044E-12)*(P*0.145037743897283*1000)^3 + (2.35758137570084E-19*(1.8*T)^4 - 6.11164262901718E-16*(1.8*T)^3+6.04725560888185E-13*(1.8*T)^2 -2.72588547111097E-10*(1.8*T) + 4.75813030824455E-08)*(P*0.145037743897283*1000)^2 + (-4.85408615612733E-16*(1.8*T)^4 + 1.2130030793229E-12*(1.8*T)^3 - 1.10759228185334E-09*(1.8*T)^2 + 3.92998672260481E-07*(1.8*T) + 1.92718769514065E-06)*(P*0.145037743897283*1000) + (-5.93033800788672E-14*(1.8*T)^4 + 1.44179866941074E-10*(1.8*T)^3 - 1.30532114392034E-07*(1.8*T)^2 + 0.0000516720636738832*(1.8*T) + 0.992795943835443)))

FIG. 24

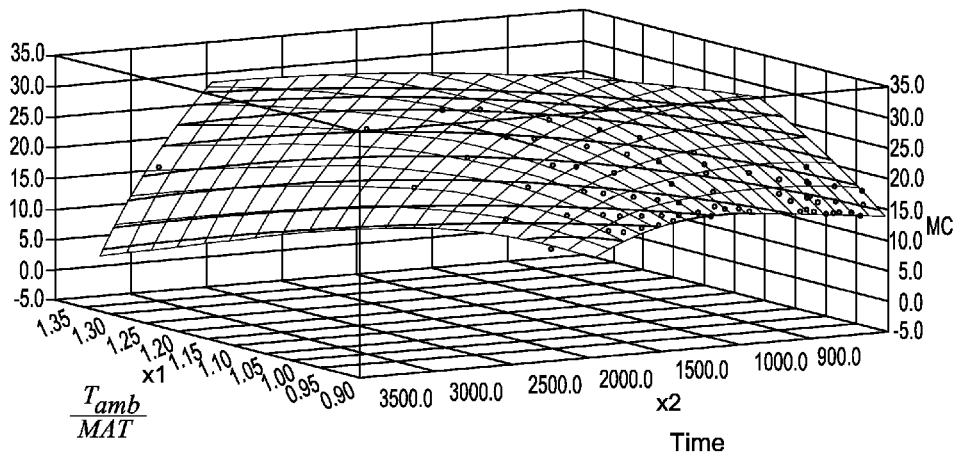
FIG. 27

$$\mathbf{MAE} = \alpha + \mathbf{k} + \frac{\mathbf{l}}{MAT} + \frac{\mathbf{m}}{MAT^2} + \frac{\mathbf{n}}{MAT^3} + \frac{\mathbf{p}}{MAT^4} + \frac{\mathbf{q}}{MAT^5} + \frac{\mathbf{r}}{t_{final}} + \frac{\mathbf{s}}{t_{final}^2} + \frac{\mathbf{v}}{t_{final}^3} + \frac{\mathbf{y}}{t_{final}^4} + \frac{\mathbf{z}}{t_{final}^5}$$

where
MAE = end of the Mass Ave. Enthalpy
MAT = Mass Ave. Pre - cooling Temp.
$t_{final}$ = total time needed to fill from 2MPa to $P_{final}$
α = adjustment factor to account for variability in RR

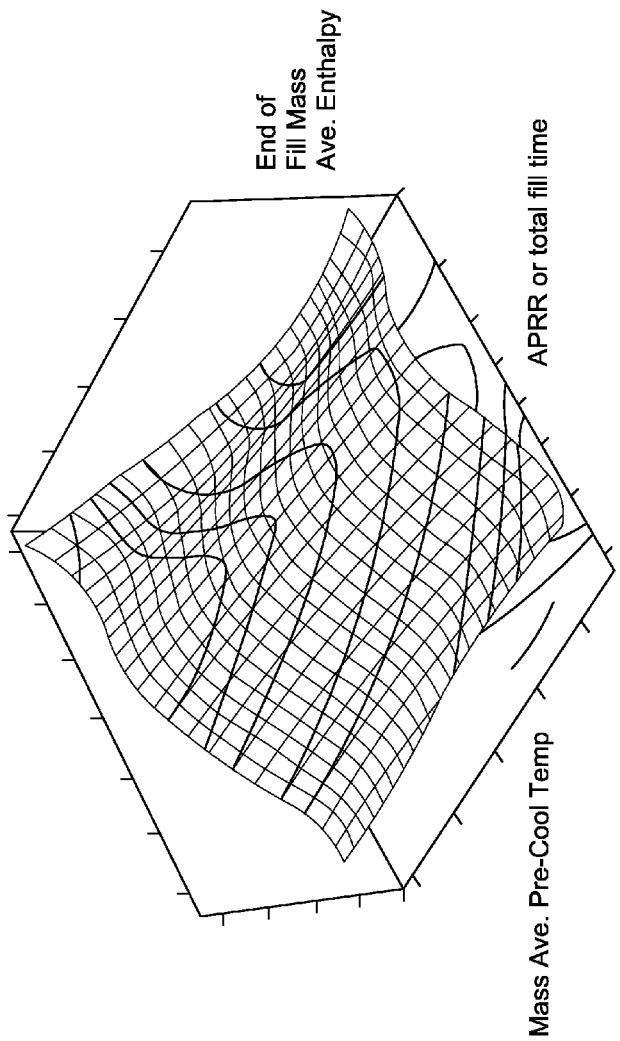

FIG. 28

$$RR_{(i)} = \frac{P_{final} - P_{(i)}}{t_{final(i)}\left(\dfrac{P_{final} - P_{initial}}{P_{final} - P_{min}}\right) - t_{(i)}}$$

| Constant | Definition | Units |
|---|---|---|
| a, b, c, d, e, f, g, h, i, j | Constant in the MC Equation: $$MC = a + b\frac{T_{amb}}{MAT_{(i)}} + c(\Delta t(i)) + d\left(\frac{T_{amb}}{MAT_{(i)}}\right)^2 + e(\Delta t(i))^2 + f(\Delta t(i))\left(\frac{T_{amb}}{MAT_{(i)}}\right)$$ $$+ g\left(\frac{T_{amb}}{MAT_{(i)}}\right)^3 + h(\Delta t(i))^3 + i\left(\frac{T_{amb}}{MAT_{(i)}}\right)(\Delta t(i))^2 + j\left(\frac{T_{amb}}{MAT_{(i)}}\right)^2(\Delta t(i))$$ | N/A |
| k, l, m, n, p, q, r, s, v, y, z | Constant in the Enthalpy Map Equation: $$h_{ave\_EM(J)} = \alpha(i) + k + \frac{l}{MAT_{(i)}} + \frac{m}{MAT_{(i)}^2} + \frac{n}{MAT_{(i)}^3} + \frac{p}{MAT_{(i)}^4} + \frac{q}{MAT_{(i)}^5}$$ $$+ \frac{r}{t_{fin(j)}} + \frac{s}{t_{fin(j)}^2} + \frac{v}{t_{fin(j)}^3} + \frac{y}{t_{fin(j)}^4} + \frac{z}{t_{fin(j)}^5}$$ | N/A |
| $P_{final}$ | Ending fill pressure for RR control. It represents the maximum dispenser filling pressure | MPa |
| $T_{final}$ | Target temperature for end of fill in MC control calculations | Kelvin |
| $t_{min(hot)}$ | This is the minimum fill time which the MC equation is based on. The $\Delta t$ term in the MC equation is the time elapsed beyond $t_{min}$. The total fill time is thus defined as the sum of $t_{min}$ and $\Delta t$. | sec |
| AC, BC, GC, KC, JC | $$MC_{cold(i)} = AC + BC \times \ln\sqrt{\frac{U_{adiabatic-cold(i)}}{U_{init(cold)}}} + GC\left(1 - e^{-KC \times \Delta t_{cold(i)}}\right)^{JC}$$ | N/A |
| $P_{max}$ | a predetermined maximum gas pressure permitted within tank. | MPa |
| $t_{min(cold)}$ | This is the minimum fill time which the cold tank MC equation is based on. | sec |
| $\rho_{SOC-comm-end}$ | Target density for communications (IRDA) end of fill comparison. (typically set to 99% SOC) | kg/m$^3$ |
| $\rho_{SOC-MC-end}$ | Maximum density for MC end of fill comparison when communication is present between tank temperature sensor and dispenser. (typically set to 115% SOC). | kg/m$^3$ |
| $\rho_{SOC-MC-end-non-comm}$ | Maximum density for MC end of fill comparison when communication is not present between tank temperature sensor and dispenser (typically set at 100% SOC). | kg/m$^3$ |

FIG. 38

Variables which vary with initial fill conditions, but stay fixed throughout the filling process

| Variable | Definition | Units |
|---|---|---|
| $T_{amb}$ | Ambient temperature measured by the dispenser | Kelvin |
| $P_{initial}$ | Initial measured pressure of the gas in the tank before fill commences | MPa |
| $T_{init(hot)}$ | Initial assumed temperature of the gas in the tank before fill commences | Kelvin |
| $V_{hot}$ | Volume of hot tank used to calculate initial mass $m_{init(hot)}$ | m³ |
| $m_{cv(hot)}$ | Final mass in the hot tank @ 100% SOC | kg |
| $m_{init(hot)}$ | Initial calculated mass in the hot tank before fill commences | kg |
| $m_{add(hot)}$ | Calculated mass to be added to hot tank during the fill to achieve 100% SOC. | kg |
| $\rho_{init(hot)}$ | Initial calculated density of the gas in the hot tank before fill commences | kg/m³ |
| $u_{init(hot)}$ | Initial specific internal energy of the gas in the tank before fill commences | kJ/kg |
| $U_{init(hot)}$ | Initial internal energy of the gas in the tank before fill commences | kJ |
| $MAT_{expected}$ | The expected mass average pre-cooling temperature of the gas at end of fill. This value is used only in the beginning of the fill and should be set as accurately as possible based on current conditions. | Kelvin |
| $TS$ | Tank size indicator used to indicate which tank to use for RR control ( 4 means 4kg tank, 7 means 7kg tank) | N/A |
| $M_{Temp}$ | a temporary variable used for calculation of $T_{int(cold)}$ | K |
| $C_{Temp}$ | a temporary variable used for calculation of $T_{int(cold)}$ | K |
| $T_{int(cold)}$ | Initial assumed temperature of the gas in the cold tank before the fill commences | K |
| $V_{cold}$ | Volume of cold tank used to calculate initial mass $m_{init(cold)}$ | m³ |
| $m_{cv(cold)}$ | Final mass in the cold tank at 100% SOC | kg |
| $\rho_{init(cold)}$ | Initial calculated density of the gas in the cold tank before fill commences | kg/m³ |
| $m_{init(cold)}$ | Initial calculated mass in the cold tank before fill commences. | kg |
| $m_{add(cold)}$ | Calculated mass to be added to cold tank during the fill to achieve 100% SOC | kg |
| $u_{init(cold)}$ | Initial specific internal energy of the gas in the cold tank before fill commences | kJ/kg |
| $U_{init(cold)}$ | Initial internal energy of the gas in the cold tank before fill commences | kJ |
| $P_{min}$ | minimum gas pressure in tank | MPa |
| $\Delta t_{cold(i)}$ | The time term in the cold MC equation. It is defined as the current fill time beyond $t_{min}$ | sec |
| $h_{(i)}$ | Enthalpy of the gas calculated as a function of $P_{(i)}$ and $T_{(i)}$ | kJ/kg |
| $h_{ave(i)}$ | Mass average enthalpy of the gas calculated as a function of $h_{(i)}$ and $\Delta m_{(i)}$ | kJ/kg |
| $U_{adiabatic\text{-}cold(i)}$ | The adiabatic internal energy of the gas in the cold tank. This is the internal energy which would exist under adiabatic conditions(i.e. no heat transfer from the gas to tank walls) | kJ/kg |
| $u_{adiabatic\text{-}cold(i)}$ | The specific adiabatic internal energy of the gas in the cold tank. This is the internal energy which would exist under adiabatic conditions(i.e. no heat transfer from gas to tank walls) | kJ/kg |
| $T_{adiabatic\text{-}cold(i)}$ | The adiabatic Temperature of the gas in the cold tank. This is the temperature which would exist under adiabatic conditions ( i.e. no heat transfer from gas to the tank walls) | Kelvin |
| $Cv_{cold(i)}$ | Specific Heat Capacity of hydrogen at constant volume calculated for cold tank as a function of $P_{(i)}$ and $T_{adiabatic\text{-}cold(i)}$ | kJ/kgK |

FIG. 39

Variables which can vary every time step calculation cycle (denoted with (i), where i represents the cycle number, or with (j), where j represents the iteration number)

| Variable | Definition | Units |
|---|---|---|
| $t_{(i)}$ | Time of the current calculations step, defined as the time since the fill commenced (seconds) | sec |
| $t_{final(i)}$ | The total time required to fill from 2MPa to $P_{final}$ | sec |
| $t_{fin(j)}$ | An estimation of $t_{final(i)}$ used in the iteration calculations. Once the iterations have converged, $t_{final(i)}$ is set to $t_{fin(j)}$ | sec |
| $\Delta t_{hot(j)}$ | The time term in the MC equation. It is defined as the final fill time beyond $t_{min}$ | sec |
| $\Delta m_{(i)}$ | Change in mass or mass added from previous time step measurement | g |
| $T_{(i)}$ | Temperature of the gas measured at the dispenser | Kelvin |
| $P_{(i)}$ | Pressure of the gas measured at the dispenser | MPa |
| $T_{0ave(i)}$ | Mass average temperature of the gas measured from the beginning of the fill(t=0) | Kelvin |
| $T_{30ave(i)}$ | Mass average temperature of the gas measured beginning after 30 seconds (t=30) | Kelvin |
| $MAT_{(i)}$ | The mass average pre-cooling temperature which is used in the MC Equation and Enthalpy Map Equation | Kelvin |
| $\alpha_{(i)}$ | Adjustment factor to the Enthalpy Map Equation to account for variability in the pressure ramp rate during the fill | N/A |
| $\beta_{(i)}$ | A temporary variable used in calculating $\alpha_{(i)}$ | N/A |
| $h_{ave\_EM(j)}$ | Estimated mass average enthalpy at the end of the fill based on the Enthalpy Map Equation | kJ/kg |
| $u_{adiabatc-hot(j)}$ | The specific adiabatic internal energy of the gas in the hot tank. This is the internal energy which would exist under adiabatic conditions (i.e. no heat transfer from the gas to the tank walls) | kJ/kg |
| $T_{adiabatc-hot(j)}$ | The adiabatic temperature of the gas in the hot tank. This is the temperature which would exist under adiabatic conditions(i.e. no heat transfer from the gas to the tank walls) | Kelvin |
| $C_{v(i)}$ | Specific Heat Capacity of Hydrogen at constant volume | kJ/kgK |
| $MC_{hot(j)}$ | MC calculated for the hot tank by the hot tank MC equation | kJ/K |
| $MC_{req(j)}$ | MC required to achieve the target final gas temperature $T_{final}$ based on initial conditions and the enthalpy put into the tank. | kJ/K |
| $MC_{diff(j)}$ | The difference between the required MC ($MC_{req(j)}$) and the actual MC ($MC_{hot(j)}$). The target is for $MC_{diff(j)}$ to be zero. | kJ/K |
| $RR_{(i)}$ | Calculated Pressure Ramp Rate setting for time step i | MPa/sec |
| $RR_{min}$ | Minimum Calculated Pressure Ramp Rate for all time steps t=0 to t=$t_{(i)}$ | MPa/sec |
| $MC_{cold(i)}$ | MC calculated for the cold tank using the MC equation $$MC_{cold(i)} = AC + BC \times \ln\sqrt{\frac{U_{adiabatic-cold(i)}}{U_{init(cold)}}} + GC(1-e^{-KC \times \Delta cold(i)})^{JC}$$ | kJ/K |
| $T_{cold(i)}$ | Temperature of the gas calculated for the cold tank | K |
| $\rho_{SOC-MC(i)}$ | Calculated density of the gas in the cold tank using $P_{(i)}$ and $T_{cold(i)}$ | Kg/m³ |
| $T_{comm(i)}$ | Temperature of the gas measured in the tank | K |
| $\rho_{SOC-comm(i)}$ | Calculated density of the gas in the cold tank using $P_{(i)}$ and $T_{cold(i)}$ | Kg/m³ |

FIG. 40

METHOD AND SYSTEM FOR TANK REFILLING USING ACTIVE FUELING SPEED CONTROL

PRIORITY STATEMENT

This application claims priority pursuant to 35 U.S.C. §119(e) from U.S. Provisional Patent Application No. 61/833,134, filed on Jun. 10, 2013, the content of which is incorporated by reference in its entirety; this application is a continuation-in-part of U.S. patent application Ser. No. 13/832,311, filed on Mar. 15, 2013, the content of which is incorporated by reference in its entirety, which is a continuation-in-part of U.S. patent application Ser. No. 12/982,966, filed on Dec. 31, 2010, the content of which is incorporated by reference in its entirety, which claims priority pursuant to 35 U.S.C. §119(e) from U.S. Provisional Patent Application Nos. 61/332,919 and 61/326,375, the contents of which are incorporated by reference, in their entirety; this application is a continuation-in-part of U.S. patent application Ser. No. 13/843,537, filed on Mar. 15, 2013, the content of which is incorporated by reference in its entirety, which is a continuation-in-part of U.S. patent application Ser. No. 12/982,966, filed on Dec. 31, 2010, the content of which is incorporated by reference in its entirety, which claims priority pursuant to 35 U.S.C. §119(e) from U.S. Provisional Patent Application Nos. 61/332,919 and 61/326,375, the contents of which are incorporated by reference, in their entirety.

BACKGROUND

The safety and convenience of hydrogen tank refueling are recognized as important considerations in determining the ultimate success of hydrogen fueled vehicles in the marketplace. Under current safety guidelines, the refueling of compressed hydrogen tanks are to be conducted in a manner that prevents the tank from overheating (temperatures exceeding 85° C.) during refueling and/or from overfilling the tank to a point at which the pressure could exceed 125% of normal working pressure (NWP) at any time. Because of the number of unknown parameters associated with conventional hydrogen tank refueling procedures, the refueling operations tend to be somewhat conservative, thereby trading performance and efficiency, particularly with respect to end of fill density (SOC %) and/or unnecessary levels of pre-cooling, for an increased safety margin. A SOC of 100%, for example, corresponds to a tank at NWP and 15° C.

This tradeoff is especially significant in non-communication fueling operations in which the parametric assumptions are even more conservative. Because the hydrogen station does not have information about the tank that it is filling, very conservative assumptions need to be made for the system in order to encompass the range of possible tank configurations and initial tank conditions to avoid exceeding the system safety limits. In SAE TIR J2601, the disclosure of which is incorporated herein by reference, in its entirety, these conservative assumptions are incorporated into a series of lookup tables for hydrogen tank filling. Working from parameters including the tank volume, starting pressure, ambient temperature and station pre-cooling set point, the lookup tables are then used for determining a pressure ramp rate and final target pressure. While application of these lookup tables tends to provide for safe refilling under virtually all conditions and for virtually all tank systems, given the conservative nature of the associated assumptions, the resulting hydrogen tank filling operation may take longer, achieve lower final fill pressures and/or require lower hydrogen station pre-cooling temperatures than necessary to fill a particular tank system.

An additional limitation of the refilling procedures defined by SAE TIR J2601 is the lack of any method or procedure for a hydrogen tank filling station to compensate or adjust for situations in which its actual operating conditions fall outside of the allowed tolerances. For example, if the pre-cooling temperature is above the design set point as the result of multiple consecutive refills, the lookup tables defined in SAE TIR J2601 cannot be used. Efforts to avoid this out of specification condition can lead to an overdesigned hydrogen tank filling station (excessive cooling for ensuring that the pre-cooling target temperature is maintained), thereby driving up station cost.

Conversely, failing to ensure that the pre-cooling target temperature is maintained can inconvenience customers that are unable to refill their tanks in a timely manner (as a result of delays waiting for the pre-cooling temperature to come into specification), thereby reducing customer satisfaction, station revenue and/or repeat business. Further, operating a station with a constant pre-cooling temperature regardless of current ambient conditions results in excessive energy usage and reduced well-to-wheel energy efficiency. In order to reduce energy use, a hydrogen tank filling station should be operated at the highest possible pre-cooling temperature that provides both customer-acceptable refueling times and a satisfactory safety margin.

BRIEF DESCRIPTION

The modified MC Method as detailed infra provides a new tank filling model based on the total heat capacity of the hydrogen fueling system and an advanced algorithm based on that model for improving the performance of hydrogen filling stations under a broad range of operating conditions. This algorithm, as applied stepwise in the second modified MC Method, can be used to enhance fueling performance pursuant to SAE J2601 through the use of additional thermodynamic information about the tank system. The modified MC Method works at a tank system Normal Working Pressure (NWP) and with a compressed hydrogen tank system. Utilizing the modified MC Method permits hydrogen filling stations to improve their fill speed and fill quality (SOC %), while enabling lower cost hydrogen stations to meet those needs.

The method includes determining a fill time ($t_{final}$) predicted to produce a gas final temperature ($T_{final}$) at a final pressure ($P_{final}$). The method further includes delivering gas to the compressed gas tank at a pressure ramp rate (RR) that achieves the final pressure ($P_{final}$) at a conclusion of the fill time ($t_{final}$). The gas is delivered to the compressed gas tank using a dispenser.

According to another aspect, a controller configured to control a hydrogen filling station is provided. The controller includes an input receiver and a fueling speed controller. The input receiver is configured to continuously receive measured values of a pressure, a temperature, and a flow rate of hydrogen dispensed to a gas tank from a temperature sensor, a pressure sensor, and a mass flow meter provided in a dispenser of the hydrogen gas filling station. The fueling speed controller is configured to calculate a mass average pre-cooling temperature of the hydrogen gas. The fueling speed controller is further configured to calculate an estimated end of fill mass average enthalpy of the gas dispensed to the tank based on at least the mass average pre-cooling temperature while the hydrogen is being dispensed to the gas tank by the dispenser of the hydrogen filling station. The fueling speed ($t_{final}$) controller is additionally configured to calculate a fill time ($t_{final}$) based on the estimated end of fill mass average enthalpy while the hydrogen is being dispensed to the gas tank by the dispenser of the hydrogen filling station. The fueling speed controller is also configured to calculate a pressure ramp rate (RR) that achieves a final pressure ($P_{final}$) based on the fill time ($t_{final}$) while the hydrogen is being dispensed to the gas tank by the dispenser of the hydrogen filling station. The fueling speed controller is additionally configured to determine a fueling speed based on the pressure ramp rate RR while the hydrogen is being dispensed to the gas tank by the dispenser of the hydrogen filling station. Further, the fueling speed controller is configured to control the dispenser of the hydrogen filling station to adjust a fueling speed while the hydrogen is being dispensed to the gas tank by the dispenser of the hydrogen filling station.

According to yet another aspect, a hydrogen filling station is provided. The hydrogen filling station includes a dispenser for providing hydrogen to a vehicle gas tank and a hydrogen station controller. The hydrogen station controller includes an input receiver and a fueling speed controller. The input receiver is configured to continuously receive measured values of a pressure, a temperature, and a flow rate of hydrogen dispensed to the gas tank from a temperature sensor, a pressure sensor, and a mass flow meter provided in the dispenser of the hydrogen gas filling station. The fueling speed controller is configured to calculate a mass average pre-cooling temperature of the hydrogen gas. The fueling speed controller is further configured to calculate an estimated end of fill mass average enthalpy of the gas dispensed to the tank based on at least the mass average pre-cooling temperature while the hydrogen is being dispensed to the gas tank by the dispenser of the hydrogen filling station. The fueling speed controller is additionally configured to calculate a fill time ($t_{final}$) based on the estimated end of fill mass average enthalpy while the hydrogen is being dispensed to the gas tank by the dispenser of the hydrogen filling station. The fueling speed controller is also configured to calculate a pressure ramp rate (RR) that achieves a final pressure ($P_{final}$) based on the fill time ($t_{final}$) while the hydrogen is being dispensed to the gas tank by the dispenser of the hydrogen filling station. The fueling speed controller is additionally configured to determine a fueling speed based on the pressure ramp rate RR while the hydrogen is being dispensed to the gas tank by the dispenser of the hydrogen filling station. Further, the fueling speed controller is configured to control the dispenser of the hydrogen filling station to adjust a fueling speed while the hydrogen is being dispensed to the gas tank by the dispenser of the hydrogen filling station.

BRIEF DESCRIPTION OF THE DRAWINGS

Example embodiments described below will be more clearly understood when the detailed description is considered in conjunction with the accompanying drawings, in which:

FIG. 14 illustrates the MC Method second step—determining the pressure target based on using a colder than ambient soak assumption in accordance with an embodiment of the present application.

FIG. 15 illustrates the MC Method third step, using the pressure target from the second step in determining the expected result and, if in excess of the target pressure, reducing the target density and recalculating in an iterative manner to match the pressure target at the final temperature in accordance with an embodiment of the present application.

FIG. 22 illustrates a comparison of fueling methods showing the impact of adding the MC Method to existing fueling protocols in accordance with an embodiment of the present application.

FIG. 23 illustrates a relationship between nozzle temperature deviation from pre-cooling temperature, flow rate, pre-cooling temperature, and ambient temperature measured during fill testing. This relationship is, of course, dependent on the specific implementation of components for a given fueling station or test stand in accordance with an embodiment of the present application.

FIG. 24 illustrates equations of a curve fit to the NIST Hydrogen Property Database for hydrogen gas utilized for determining internal energy (given temperature and pressure), enthalpy (given temperature and pressure), temperature (given internal energy and pressure), and density (given temperature and pressure) of hydrogen gas in accordance with an embodiment of the present application.

FIG. 27 shows an MC equation of the second modified MC method that accounts for dispenser component heat transfer, and an exemplary graphic depiction based on the MC equation in accordance with an embodiment of the present application.

FIG. 28 shows an end of fill mass average enthalpy (MAE) map equation of the second modified MC method and an exemplary graphic depiction based on the end of fill mass average enthalpy equation in accordance with an embodiment of the present application.

FIGS. 38-40 are a table that defines constants and variables used in the equations of the second modified MC Method in accordance with an embodiment of the present application.

It should be noted that these Figures are intended to illustrate the general characteristics of methods, structure and/or materials utilized in the example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

The goal of the methods and systems detailed in this disclosure are to provide and utilize both a filling model and an associated algorithm that can be used by a hydrogen tank filling station or, indeed, any gas tank filling operation, to improve the accuracy of the end-of-fill temperature and pressure for a range of hydrogen tanks and a range of ambient and operating conditions. Implementation of the methods and systems detailed below during hydrogen tank refueling events can improve the efficiency, accuracy and/or safety of the refueling operation by avoiding overfilling and avoiding overheating the hydrogen tank.

Accurately estimating the end-of-fill temperature of a refueling event is difficult, which is why communication refueling has been developed, where temperature and pressure information is directly transmitted to the hydrogen tank filling station via one or more communication device(s) including, for example, the Infrared Data Association (IRDA) interface detailed in SAE TIR J2799, the disclosure of which is incorporated herein by reference, in its entirety. The corresponding lack of such temperature and pressure information is the reason that non-communication fueling protocols require a large margin of safety, particularly given the additional unknown parameters including, for example, the tank type, the tank size, the aspect ratio, the number of tanks, hot or cold soak status.

Although full-communication fueling can be used to provide the tank parametric data to the hydrogen tank filling station, full-communication fueling adds more cost and complexity to both the station and the vehicle, and raises additional concerns, particularly with regard to the use of in-tank sensors. Accordingly, there remains a need for a method that provides for sufficiently accurate predictions regarding the temperature of the hydrogen in the tank during refueling without requiring full-communication protocols and hardware.

In order to provide an accurate prediction of the temperature of the gas, both the amount of energy that has been transferred to the tank and the quantity of heat that has been transferred from the gas to the wall of the tank are estimated. Many studies have been conducted in trying to understand and quantify the end-of-fill temperature.

Figure 1:
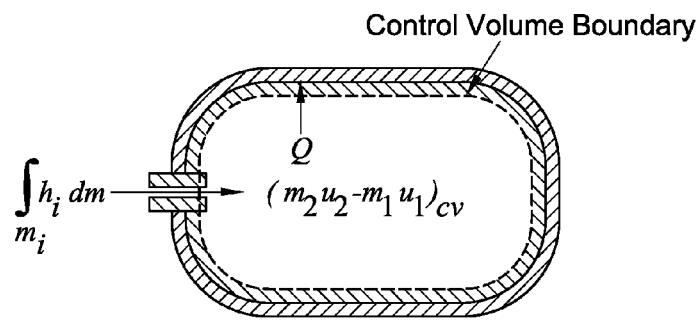
FIG. 1 illustrates the modeling of a hydrogen storage tank during refueling as an open system with an unsteady flow control volume model in accordance with an embodiment of the present application.
Figure 2:
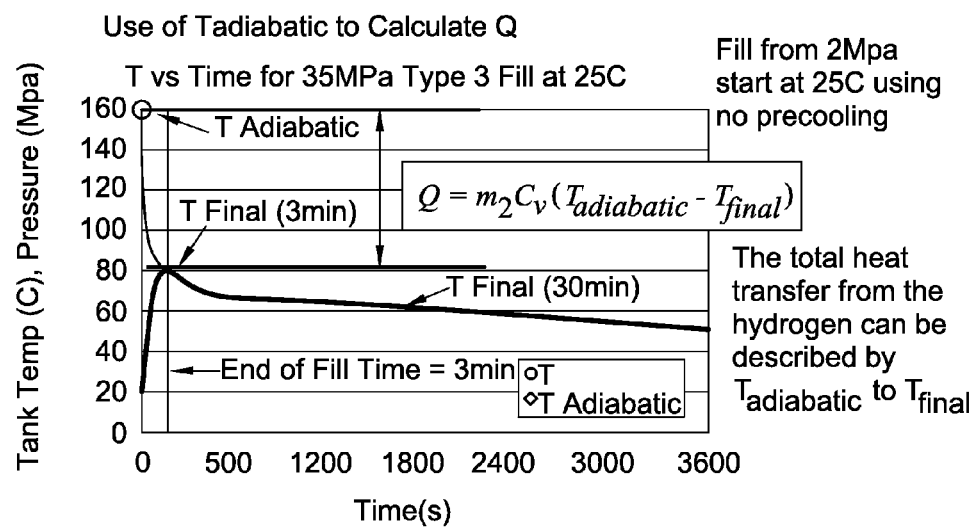
FIG. 2 illustrates a temperature versus time curve for a hydrogen tank refueling procedure, reflecting use of the adiabatic temperature in calculating the heat transfer with the heat transferred from the hydrogen being described by Equation [5] infra in accordance with an embodiment of the present application.
Figure 3:
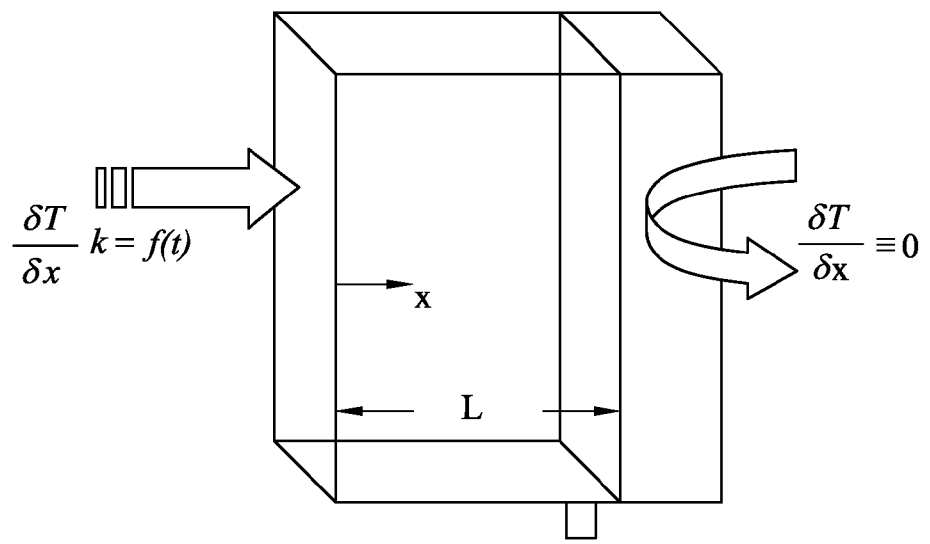
FIG. 3 illustrates a constant heat flux model showing temperature distribution dependent on time with adiabatic boundary condition with a conservative assumption of no heat transfer from the outside of the tank so that the actual final temperature in the tank is expected to be slightly lower than the value calculated in light of this assumption in accordance with an embodiment of the present application.

By modeling a hydrogen tank as an open system in unsteady flow, as illustrated in FIG. 1, it is possible to estimate the amount of energy that has been transferred to a tank by measuring the enthalpy of the incoming hydrogen stream and monitoring the temperature of the tank. For the purposes of this disclosure, the control volume is defined as the boundary between the gas and the tank liner with heat being transferred through the boundary of the control volume and into the liner of the tank. The total heat transfer in and out of the system, Q, is reflected in Equations [1] and [2].

$$\int_{m_e} h_e \, dm - \int_{m_i} h_i \, dm + \Delta E_{system}, \quad [1]$$

and setting $m_e = 0$ and $W = 0$ $$Q = -\int_{m_i} h_i \, dm + (m_2 u_2 - m_1 u_1)_{cv} \quad [2]$$

where,
Q=total heat transfer in and out of the system (kJ) (Heat transfer out of the system is negative by convention)
W=work done to the system (kJ)
$m_e$=mass exiting the system (kg)
$h_e$=enthalpy of the fluid exiting the system (kJ/kg)
$m_i$=mass entering the system (kg)
$h_i$=enthalpy of the fluid entering the system (kJ/kg)
$m_1$=mass of the fluid in the control volume at the initial state (kg)
$m_2$=mass of the fluid in the control volume at the final state (kg)
$u_1$=internal energy of the fluid in the control volume at the final state (kJ/kg)
$u_2$=internal energy of the fluid in the control volume at the initial state (kJ/kg)
cv designates the state of the control volume The enthalpy can be determined by measuring the temperature and pressure of the hydrogen in the flow stream, preferably at a point close to or at the tank inlet, with the mass flow into the tank being measured or calculated from initial and final conditions. To estimate the final temperature of the gas during or after a refueling procedure, the actual heat transfer, Q, from the gas into the tank wall should be estimated. Because Equation [2] only gives information for the internal energy state of the tank a tool, such as the National Institute of Standards and Technology (NIST) Thermophysical Property Database, is used to look up the temperature from the internal energy properties of the target gas, e.g., hydrogen. A curve fit to the NIST data used here for internal energy is illustrated in FIG. 2. The difference between the adiabatic internal energy and the measured internal energy ($u_2$ at measured temp and pressure) is the quantity of heat that is transferred from the control volume, and can be determined from test data.

$$u_{adiabatic} = m_1 u_1 + \int_{m_i} h_i \, dm \quad [3]$$

$$m_2 = m_1 + \int_{m_i} dm = m_1 + m_i \quad [4]$$

$$Q = m_2(u_{adiabatic} - u_2) \quad [5]$$
$$= m_{cv}(u_{adiabatic} - u_2)$$
$$= m_{cv} C_c (T_{adiabatic} - T_{final})$$

where
$U_{adiabatic}$=adiabatic internal energy—if there was no heat transferred from the system (kJ/kg)
$m_2=m_{cv}$=end-of-fill mass of hydrogen in the control volume (kg)
$T_{adiabatic}$=adiabatic temperature—if there was no heat transfer from the system (K)
$T_{final}$=hydrogen temperature at the end of the fill (K)
$C_v$=Specific heat capacity of hydrogen at constant volume (kJ/kgK)

FIG. 2 illustrates a Temperature v. Time curve for a hydrogen tank refueling procedure in which the adiabatic temperature, $T_{adiabatic}$, is used in calculating the heat transfer. The heat transferred from the hydrogen can be described by Equation [5] as detailed above. This provides a tool for analyzing actual test data to determine the amount of heat that has been transferred from the hydrogen gas out of the control volume, or into the structure of the tank. Note that the adiabatic internal energy is based only on initial conditions of the tank (initial mass of hydrogen and initial temperature) and the conditions of the hydrogen delivered from the station (enthalpy and fill mass). There is no dimension of time in the adiabatic condition, and so it is an appropriate reference for results for all time periods. If a reliable method to predict the heat transfer can be found, then it should be possible to directly calculate the final state of the hydrogen in the tank.

To calculate the end-of-fill gas temperature ($T_{final}$), it is necessary to estimate the amount of heat that is absorbed by the tank wall. One method of calculating the total heat transfer is to integrate the temperature distribution over the tank volume at the end of a vehicle refueling procedure. In 2003, General Dynamics conducted a series of tests aimed at understanding the relationship between final tank temperature and filling time with the results being reported in Eihusen, J. A., "Application of Plastic-Lined Composite Pressure Vessels For Hydrogen Storage," World Hydrogen Energy Conference, 2004 (Eihusen), the disclosure of which is incorporated herein by reference, in its entirety. As detailed in Eihusen, a series of filling tests were conducted while measuring the temperature of the gas and of various locations in the hydrogen tank wall.

Figure 4:
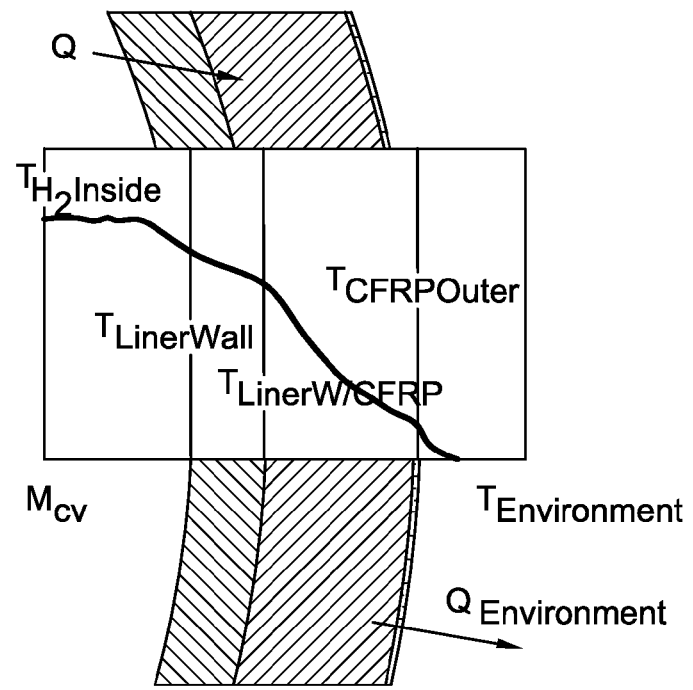
FIG. 4 illustrates a temperature distribution of a section of a composite tank immediately after a vehicle refueling in accordance with an embodiment of the present application.

These results indicated that during a refueling operation, the heat transfer process was a process in which the temperature of the outer surface of the tank did not rise, indicating that no appreciable quantity of heat was being transferred through the tank wall. Based on these results, General Dynamics proposed a heat transfer model for predicting the temperature distribution within the tank wall which was based on a Green's Function solution to the general heat equation with a constant heat flux on the inside surface and an adiabatic boundary on the outside surface. See Equation [6]. A constant heat flux model showing temperature distribution dependent on time with an adiabatic boundary condition is illustrated in FIG. 4. Note that the assumption of no heat transfer from the outside of the tank is conservative, meaning that the actual final temperature in the tank can tend to be somewhat lower than the final temperature calculated using this assumption.

$$T(x, t) = \frac{q_0 L}{k} \left\{ \left( \frac{\alpha t}{L^2} + \frac{1}{2}\left(\frac{x}{L}\right)^2 - \frac{x}{L} + \frac{1}{3} - \frac{2}{\pi^2} \sum_{m=1}^{100} \frac{1}{m^2}\left[\cos\left(m\pi\frac{x}{L}\right)\right] e^{-m^2\pi^2 \frac{\alpha t}{L^2}} \right) \right\} + T_0 \quad [6]$$

where $T(x,t)$=Temperature at liner depth=x, time=t
$q_0$=Normalized heat flux of the liner (determined from testing)
L=Thickness of the liner
k=Thermal conductivity of the liner
$\alpha$=Thermal diffusivity of the liner
$T_0$=Initial temperature of the liner Inherent in this approach is the assumption that given an initial set of conditions (hydrogen tank temperature, fuel gas temperature and pressure) the fueling temperature result and the temperature distribution result is purely dependent on time. The amount of heat transferred to the liner during a refueling procedure could be estimated by integrating the temperature distribution over the volume of the liner. General Dynamics found that for the given set of tests, this model predicted the final tank temperature within 3K. The assumption of a constant heat flux (or of temperature dependence only on time) is, however, both interesting and problematic. Different initial conditions (temperature of the tank, initial fill mass of the tank, temperature and/or pressure of the incoming gas) can produce different temperature gradients, and hence a different average heat flux. Further, the heat flux would depend on the conditions of the boundary layer between the gas and the wall—a change in the velocity, density, or temperature of gas flow over the wall resulting from forced and/or free convection inside the tank would result in a corresponding change in the heat transfer. As these conditions do tend to vary during the actual tank filling procedure, the heat flux can also tend to vary over the course of the filling procedure.

Furthermore, hydrogen refueling tests by the Japan Automobile Research Institute (JARI) as reported in Hirotani, R., et al., JARI, "Thermal Behavior in Hydrogen Storage Tank for Fuel Cell Vehicle on Fast Filling," World Hydrogen Energy Conference, 2006, the disclosure of which is incorporated herein by reference, in its entirety, revealed a significant temperature distribution within the gas itself, up to a 30K difference throughout the tank, which would influence the heat flux. The presence of such temperature distributions further complicates the analysis of data as well because it renders it difficult, if not impossible, to know precisely how accurately a particular temperature measurement taken inside the tank represents the bulk properties of the tank.

Relative to the bulk temperature, if the thermocouple is measuring a temperature that is warmer or cooler than the average bulk temperature, the calculated values can obviously be less accurate. Although it is customary to assume that temperature measurements taken at or near the centerline of the tank can represent the average (bulk) gas temperature, the magnitude of the error(s) associated with this assumption are unknown in practice. Data taken during the development of the MC formula fueling control method and system disclosed in U.S. patent application Ser. No. 12/982,966 showed unexplained errors of ±5K between the thermocouple output and the expected bulk gas temperature. Modeling efforts by the SAE TIR J2601 committee similarly reflected errors of up to 9K between the modeled temperature and the measured data despite the use of thermocouples that have an accuracy of approximately ±1K. These real world complications to the temperature gradient modeling make it difficult in practice to apply a heat transfer model for directly estimating the temperature distribution in order to calculate the end-of-fill temperature (with reliance on one or more temperature signal(s) during communication fueling operations introducing a degree of uncertainty).

One objective of the JARI testing was to analyze the impact of utilizing different refueling patterns while still keeping the same overall fueling time. An interesting result of the JARI testing indicated that, given the same initial conditions and a set filling time, the temperature of the gas at the end-of-filling is similar, regardless of the particular filling pattern used in conducting the filling operation.

Analysis presented by St. Croix Research to the SAE TIR J2601 Committee, Powars, C., "70-MPa Hydrogen Tank Filling Model and Test Data Observations—SAE TIR J2601 Modeling Sub-Team Meeting, Sep. 15, 2008," St Croix Research, 2008, the disclosure of which is incorporated herein by reference, in its entirety, also shows that the outer tank temperature does not rise significantly during a vehicle refueling.

While complex heat transfer models and analysis were previously proposed to explain the results of these tests, the innovative approach described herein is based on analyzing tank refueling processes using a simple lumped heat capacity model, the development of which is described in more detail below and further illustrated in the associated figures. The utility and applicability of this novel solution can be confirmed by using the JARI, General Dynamics, SAE and St. Croix Research results to show that the simplified model based on lumped heat capacitance detailed herein models and predicts the heat transfer characteristics of the system with sufficient accuracy. Additional testing and analysis of fueling data was conducted and the results further verified that this new method of using this lumped heat capacitance model is sufficient for accurately describing the thermodynamics of hydrogen tank refueling systems and improving the associated refueling processes.

Figure 5:
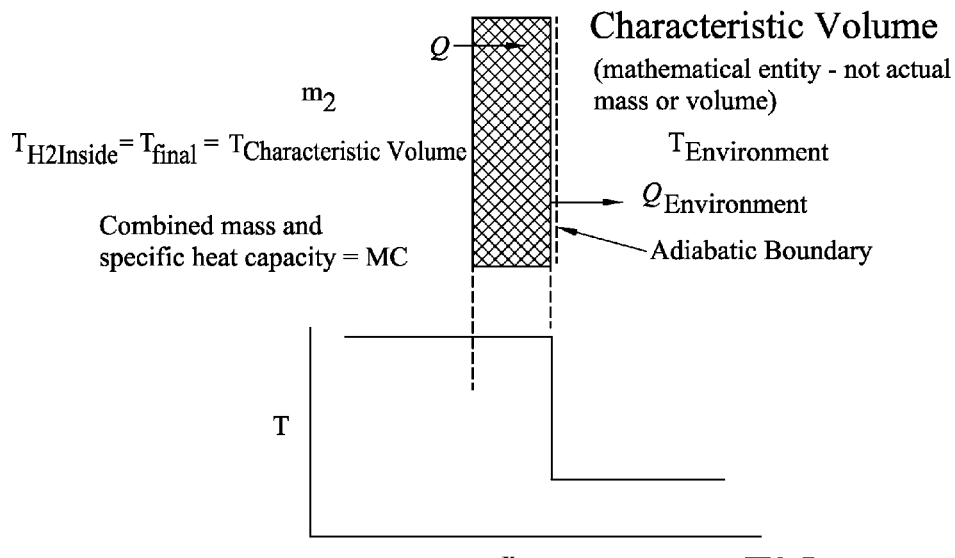
FIG. 5 illustrates a simplified representation of a hydrogen tank having an imaginary characteristic volume of combined mass and specific heat capacity MC, with adiabatic external boundary in accordance with an embodiment of the present application.

Consider a tank that has just completed a vehicle refueling in a short period of time. As illustrated in FIG. 5, the inside of the tank is much hotter than the outside of the tank, due to the conversion of pressure energy to sensible energy of the high pressure hydrogen that was just recently injected into the tank. Calculating the actual temperature distribution is difficult because 1) there is a temperature distribution between the hydrogen in the tank and the liner due to boundary conditions, 2) there is a temperature distribution through the liner, contact resistances between layers, 3) there is a temperature distribution through the various layers of the tank and 4) there is a temperature distribution between the outside of the tank and the environment due to the outer boundary conditions. And as discussed previously, there may also be a temperature distribution within the hydrogen in the tank itself on the order of 30K. Each layer has a different specific heat capacity that might also be dependent on temperature, and each layer is composed of a different mass. Given all of these complexities, it is exceedingly difficult, if not impossible, to calculate the precise temperature distributions through the wall of the tank.

The biggest difficulty in considering a heat transfer model based on a precise calculation of the temperature distribution in the wall of a hydrogen tank is that it requires a solution to the temperature distribution for the entire time domain of a refueling event, a solution which is difficult to achieve in practice. Accordingly, the method utilizes a combined mass and specific heat capacitance model, as shown in FIG. 5, which illustrates a simplified section of a tank wall having an imaginary characteristic volume defined by its mass (M) and specific heat capacity (C) and an adiabatic external boundary. The temperature of the characteristic volume can be the same as the temperature of the gas, for example, hydrogen.

This section of the tank wall, the characteristic volume, can have a combined mass and specific heat capacity, MC (kJ/K). Note that the characteristic volume and the associated MC are mathematical constructions only. Given knowledge of a tank design and the materials used in the tank construction, it is possible to provide a reasonable estimation of the MC value. In the method disclosed herein, however, there is no need to calculate the exact mass and specific heat capacity of the tank because the characteristic volume simply acts as a heat sink, allowing its characteristics to be used in predicting the thermal behavior of the tank system.

In applying the method the temperature of the characteristic volume is set to be equal to the temperature of the hydrogen in the tank at the end of the vehicle fill. This means that the characteristic volume has both high thermal conductivity and high convective heat transfer coefficient. In addition, $Q_{Environment}=0$, meaning that no heat is transferred out of the characteristic volume during the fueling (adiabatic boundary). As discussed supra, there is very little heat transfer to the environment during the refueling operation, allowing this component of the heat transfer to be ignored. In an illustrative example, the heat transfer equation is solved for the target or preferred end-of-fill condition of, for example, a fill time of 2 or 3 minutes, plus some adjustment for longer fill times as deemed necessary. For the purposes of this disclosure, a target fill time of 3 minutes has been used, but the method can be easily utilized for longer or shorter fill times.

When applying a characteristic volume in this manner, the heat that is transferred from the hydrogen mass, $m_{cv}$, into the characteristic volume can be described by the temperature rise during the fueling of the characteristic volume with a combined mass and specific heat capacity of MC.

$$Q = MC(T_{final} - T_{initial}) \quad [7]$$

where

MC=Combined Mass and Specific Heat Capacity of the Characteristic Volume (kJ/K)

$T_{final}$=Temperature at the finish of the refueling (K)

$T_{initial}$=Temperature at the beginning of the refueling (K)

By applying an energy balance across the boundary of the control volume, and combining Equation [5] (energy transferred from the hydrogen) with Equation [7] (energy transferred to the characteristic volume) results in:

$$Q = m_{cv}(u_{adiabatic} - U_{final}) \text{ energy transferred from the hydrogen control volume} \quad [5]$$

$$Q = MC(T_{final} - T_{initial}) \text{ energy transferred to the characteristic volume} \quad [7]$$

$$MC = \frac{m_{cv}(u_{adiabatic} - u_{final})}{(T_{final} - T_{init})} \quad [8]$$

Figure 6:
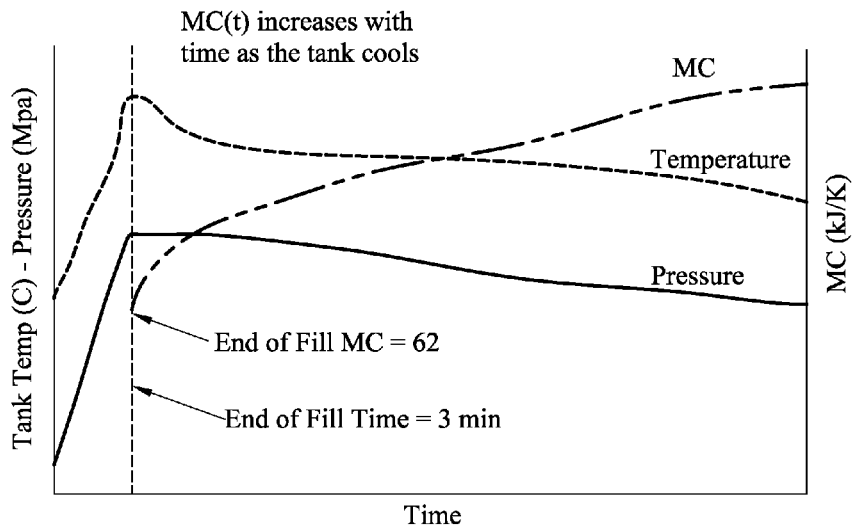
FIG. 6 illustrates a typical vehicle fill in 3 minutes with a Type 3 tank that produces an end-of-fill MC value of 62 that then tends to increase as the tank cools in accordance with an embodiment of the present application.

MC can then be determined directly from test data for a particular refueling procedure by using Equation [8], which is the ratio of the heat transferred from the hydrogen to the temperature change of the characteristic volume. For Equations [7] and [8], $T_{init}=T_{initial}$. The temperature, pressure and MC behavior associated with a 3-minute fill of a Type 3 tank is illustrated in FIG. 6. As reflected in the graph, the MC is 62 at the end-of-fill point, but then increases over time as the tank cools. This trend of MC over time can, in turn, be used in predicting the result of longer filling procedures. Once an MC is known for a given set of initial conditions, it can be used for directly calculating the final temperature of refueling event.

$$Q = m_{cv}(u_{adiabatic} - u_{final}) \quad [5]$$

$$Q = m_{cv}C_v(T_{adiabatic} - T_{final}) \text{ another identity of Equation [5]} \quad [9]$$

$$Q = MC(T_{final} - T_{initial}) \quad [7]$$

Combining Equations [9] and [7] we get:

$$T_{final} = \frac{m_{cv}C_vT_{adiabatic} + MCT_{init}}{MC + m_{cv}C_v}, \quad [10]$$

combining Equations [7] and [9]
where
$C_v$=specific heat capacity of hydrogen at constant volume, kJ/(kgK)

Equation [10] can then be used to calculate the expected final temperature of a hydrogen tank refueling just as a fill has started. The MC parameter and $m_{cv}$ (the end-of-fill mass in the control volume) are transmitted to the station. In a nonlimiting example, the MC parameter and $m_{cv}$ are transmitted by RFID, through the SAE TIR J2799 IRDA interface, or via an identification number that corresponds to entries in a database that is readily accessible to the hydrogen tank filling station. The hydrogen tank filling station can calculate $T_{adiabatic}$ from $m_{cv}$ and parameters including 1) the initial pressure of the tank receiving the hydrogen (e.g., the vehicle's tank), 2) the initial temperature of the tank receiving the hydrogen (assuming ambient conditions plus some differences due to the possibility of a hot or cold tank as discussed in SAE TIR J2601) and 3) the enthalpy of the delivered hydrogen, which is a function of the expected average temperature and pressure of the delivered hydrogen (further description is given in the Appendix provided in FIG. 24).

Certain characteristics of the MC Method make it particularly useful for gas delivery systems. For example, a particular tank configuration can have a characteristic curve of MC v. fill time from which adjustments can be made to compensate for a range of initial conditions. Utilizing the MC model avoids the need to address all of the intricacies of the temperature distribution of the wall of the tank, especially over a time scale associated with typical hydrogen tank refueling procedures, e.g., two to three minutes or more.

MC is not a direct physical constant such as the mass and the specific heat capacity of the tank and liner material but rather it is a composite value, similar to an overall heat transfer coefficient, that encompasses heat transferred to tank valve assemblies and piping as well as heat transferred to the hydrogen comprising the initial gas volume inside the tank being filled. Systems with slower heat transfer characteristics (convection or conduction) can tend to result in lower values of MC (such as Type 4 tanks) while systems with faster heat transfer characteristics (convection or conduction) can tend to result in higher values of MC (such as Type 3 tanks). Although MC is a function of a number of different parameters including, for example, time, fill conditions, tank materials, tank configuration, etc., for a given tank, fill time and set of fill conditions, MC can be constant. The trend in the MC value over both time and under different fill conditions can be predicted and, in turn, utilized for adjusting the hydrogen tank filling procedures to improve efficiency while maintaining desired safety margins.

Based on observations of several sets of test data coupled with the use of multiple linear regression for evaluating the significance of various parameters, many possible physical models were considered for describing the MC v. time curve and also describing the changes in initial conditions that were tested. In a non-limiting example, one model is represented by Equation [11], as shown below:

$$MC(U, t) = C + A \ln\left(\sqrt{\frac{U_{adiabatic}}{U_{initial}}}\right) + g(1 - e^{-k\Delta t})^j \quad [11]$$

or, in an alternative non-limiting example, Equation [11]', as shown below:

$$MC(U, t) = C + A\left(\frac{U_{adiabatic}}{U_{initial}}\right) + g(1 - e^{-k\Delta t})^j \quad [11']$$

where

C, A, g, k and j are constants derived from characterization testing $U_{adiabatic}$ is the adiabatic internal energy=$m_{cv} u_{adiabtic}$ $U_{initial}$ is the initial energy=$m_{initial} u_{initial}$ $\Delta t$ is the difference in time between the normally defined end-of-fill time (e.g., 3 minutes) and the end-of-fill time that achieves the desired final temperature In the context of Equation [11], C is a constant that represents a minimum heat capacity of, for example, a 2- or 3-minute fill, A is a constant representing an adjustment to the MC corresponding to the initial fill conditions and pre-cooling amount and constants g, k, and j are, if necessary, utilized within the MC Method to provide the ability to adjust the resulting MC by extending the fill time beyond 2 or 3 minutes, so that $T_{final}$ can be optimized around a desired temperature. However, it is to be understood that those skilled in the art will appreciate that there are many possible models that can be developed to predict the trend of MC with time, internal energy, pre-cooling temperature, etc. The MC Method is not intended to, and does not attempt to, perfectly describe the physics but instead provides an analytical engineering tool that can be used for predicting the temperature outcome of a particular filling procedure by approximating the equivalent heat mass of the system.

Figures 7, 8:
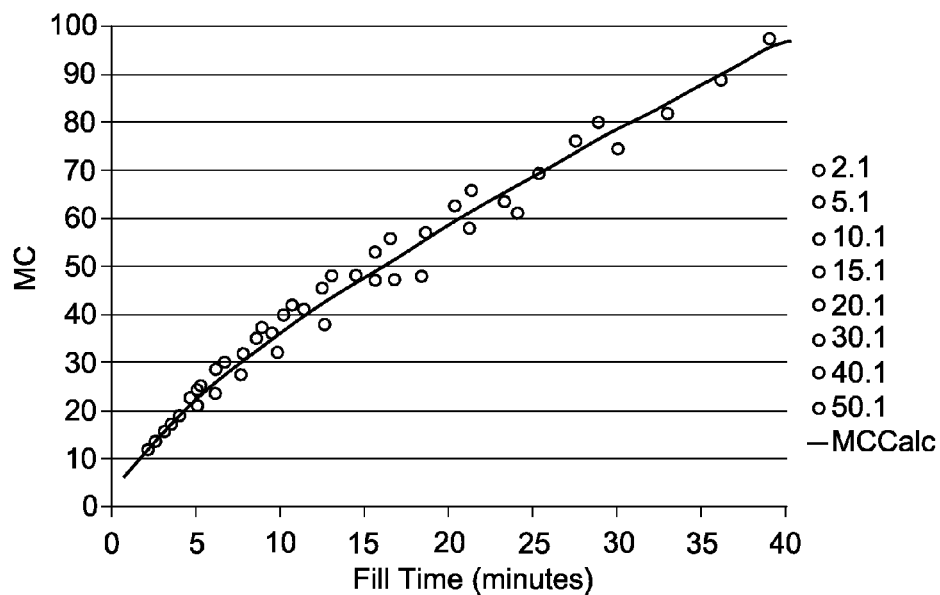
FIG. 7 illustrates MC v. fill time for a "default" SAE TIR J2601-70 MPa Type 4 tank in accordance with an embodiment of the present application.
FIG. 8 illustrates a potential Test Matrix for tank characterization in accordance with an embodiment of the present application.

One way to check a new model is to verify that the model is capable of describing or predicting phenomena documented in previous literature. The Society of Automotive Engineers (SAE) conducted several sets of hydrogen tank fill testing at Powertech during the development of SAE TIR J2601, in support of, and to test the modeling efforts that were being conducted to build the refueling tables in SAE TIR J2601. By using the tables provided in SAE TIR J2601 as a set of test fills and plotting the MC of each fill versus the fill time using Equation [8], the results fall in a distinct pattern as illustrated in FIG. 7.

This result is encouraging for several reasons, including but not limited to 1) because the MC Method describes the actual results of the SAE TIR J2601 tests quite well, suggesting that the model accurately represents the physics of hydrogen tank filling, and 2) because the entire set of tables in SAE TIR J2601 can be approximated using this single equation. This result indicates that the equation utilized in the MC Method can be used to describe the MC v. Time over a wide range of conditions, and can be used in place of the several sets of tables defined in SAE TIR J2601, which require interpolation between the listed data to find the appropriate pressure ramp rate and end of fill pressure target. Because the MC Method can adjust the fill time to match a desired final tank temperature, it can be used for any station configuration. This releases the fill protocol from reliance on the rigid "Type A, B, C, D" station type designations of SAE TIR J2601, because the resulting fill temperatures can be derived for a wide range of station conditions. Indeed, by using the coefficients of the MC v. time curve utilized in the MC Method, a hydrogen tank filling station can directly calculate the expected end-of-fill temperature ($T_{final}$) using Equation [10].

As will be appreciated by those skilled in the art, using the SAE TIR J2601 tables to calculate a characteristic MC curve provides a characteristic curve that corresponds to a "default SAE TIR J2601 tank." Accordingly, when this MC curve is used in Equation [10], the fill results are substantially the same as those represented in the SAE TIR J2601 tables. The MC Method, however, is intended to provide for fill times that are both shorter than predicted from the SAE TIR J2601 tables and provide for improved fill quality. In order to achieve this result, the MC Method incorporates the specific characterized MC curve corresponding to a specific tank.

A set of fill tests were conducted at Powertech during Feb. 1-6, 2010 and Aug. 23-30, 2010 in order to characterize a 171L Type 3-35 MPa tank, an approximately 109L Type 4-70 MPa tank, and the same Type 4-70 MPa tank filled to 50 MPa, and a 34 L Type 3-70 MPa tank. Each tank was tested using pre-cooled and non-pre-cooled gas, at 25° C. ambient, and 2 MPa starting pressure or ½ tank starting pressure. Each tank was filled in approximately 1 to 3 minutes at the given conditions and data recorded for 1 hour following. Each tank was then defueled and allowed to soak at the ambient temperature until the next test the following day.

Figure 9A:
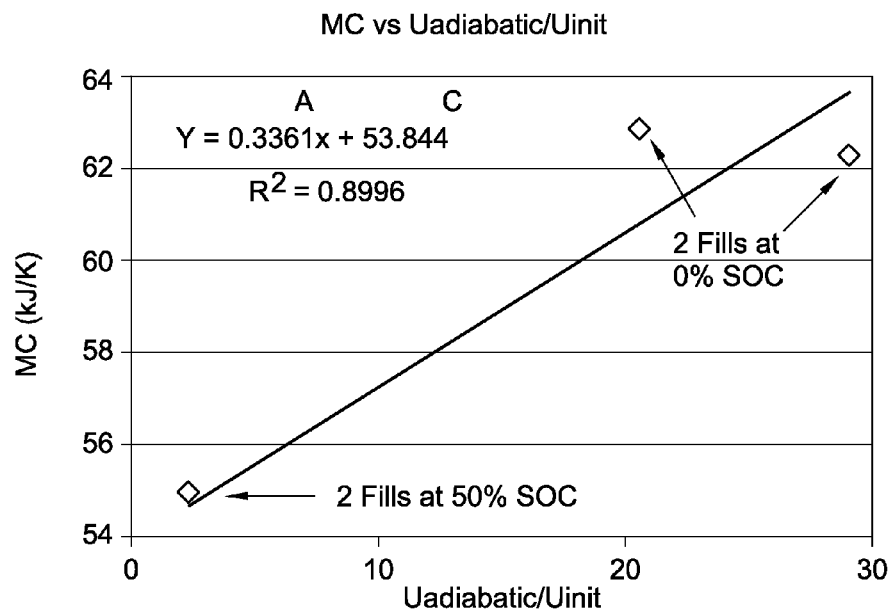
FIGS. 9A and 9B illustrate MC v. $U_{adiabatic}/U_{init}$ for fills of a Type 3 tank from which the coefficients A and C can be determined for both longer fill times, using a linear approximation, and shorter fill times, using a logarithmic approximation in accordance with an embodiment of the present application.
Figure 9B:
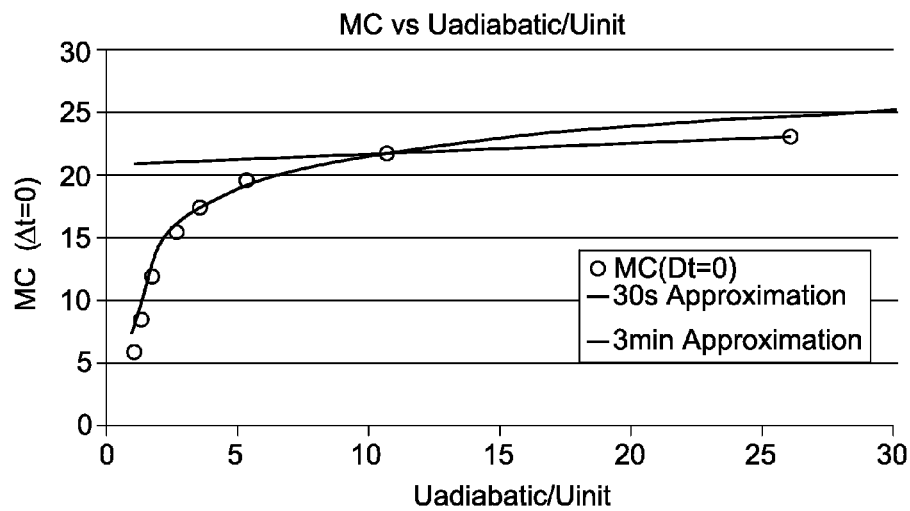
Figure 10:
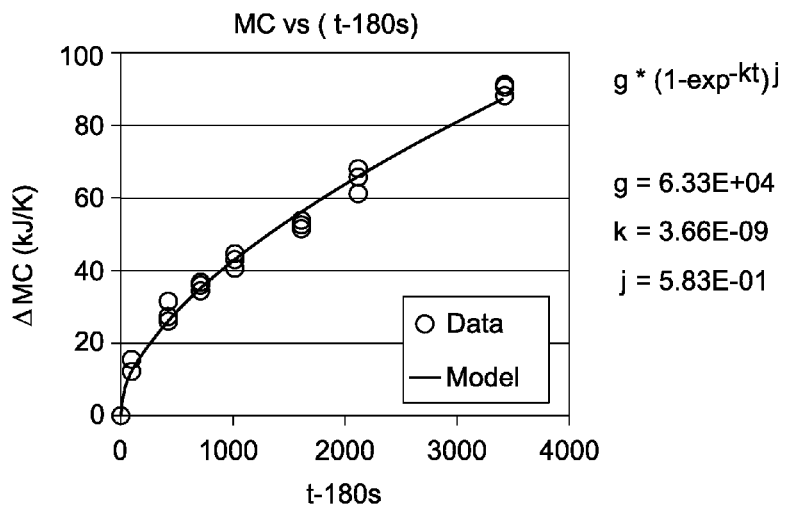
FIG. 10 illustrates ΔMC v. time for fill times having a duration of more than 3 minutes from which the coefficients g, k, and j can be determined for describing the behavior of MC for fill times in excess of 3 minutes in accordance with an embodiment of the present application.

Using Equation [8], the MC v. time was plotted for each fill, as shown in FIG. 6. All of the tank fills follow a similar pattern of MC v. Fill Time as shown in FIG. 7. The resulting curve corresponds to the tank characteristic(s) for a given tank under a given set of conditions. To find the coefficients used in Equation [11], the MC for each end-of-fill at 3 minutes was plotted against the adiabatic internal energy divided by the initial internal energy, as shown in FIG. 9. The slope and intercept of the linear best fit line give the coefficient A and the constant C respectively. The ΔMC v. Δtime, that is ($MC_{(t-180s)}$−$MC_{(180s)}$) v. (t−180s), is then plotted as shown in FIG. 10, and a best fit model is used to determine the coefficients g, k and j. These coefficients can then be used to describe how much heat is absorbed by the tank in the time beyond the typical fill time and are particularly useful under conditions in which the ambient temperature is too warm and/or the pre-cooling temperature is too warm to achieve an end-of-fill temperature of less than 85° C. with a refueling time of 3 minutes or less.

Figure 11:
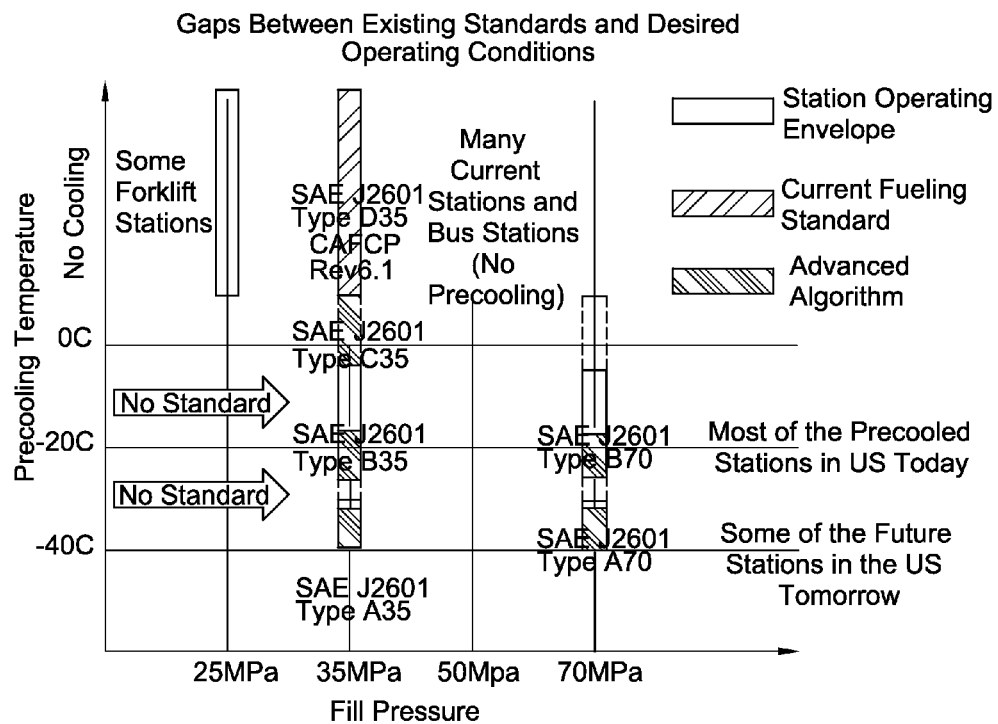
FIG. 11 illustrates a comparison of the hydrogen station operating envelopes to the existing refueling standards, showing several gaps in the coverage of existing or anticipated operating regimes in accordance with an embodiment of the present application.

To use the MC parameters for improving the performance of a hydrogen tank filling station, a fueling protocol needed be developed. A fueling protocol should provide safe, high state of charge (SOC) fills, for a broad range of ambient conditions and initial fill conditions. Comparing the current fueling standards with the actual operating ranges of existing hydrogen stations, as illustrated in FIG. 11, it is clear that the current refueling standards do not satisfy a broad range of station fuel delivery operating conditions. Further, should a vehicle manufacturer or modifier introduce a tank designed to operate at another pressure of, for example, 50 MPa, the fueling standard(s) would have to be rewritten to accommodate this modification.

In order to fully utilize the MC Method at an actual fueling station, the MC parameters must be communicated to or determined by the station in some manner. This data collection could be achieved in a number of ways. In a non-limiting example, RFID, or even the IRDA interface defined in SAE J2799, may be used to transmit the MC parameters from the vehicle to the station. There is a working group within the California Fuel Cell Partnership that is developing a Hydrogen Vehicle Authorization System (HVAS) to be used for confirming that a vehicle is authorized to fuel (OEM vehicle or a conversion that meets safety requirements). The HVAS specifications and device are still under development but it is a candidate for communicating the MC parameters to the station, either directly through the device or, alternatively, by matching the identified vehicle to a database from which these parameters could be retrieved.

Figure 12:
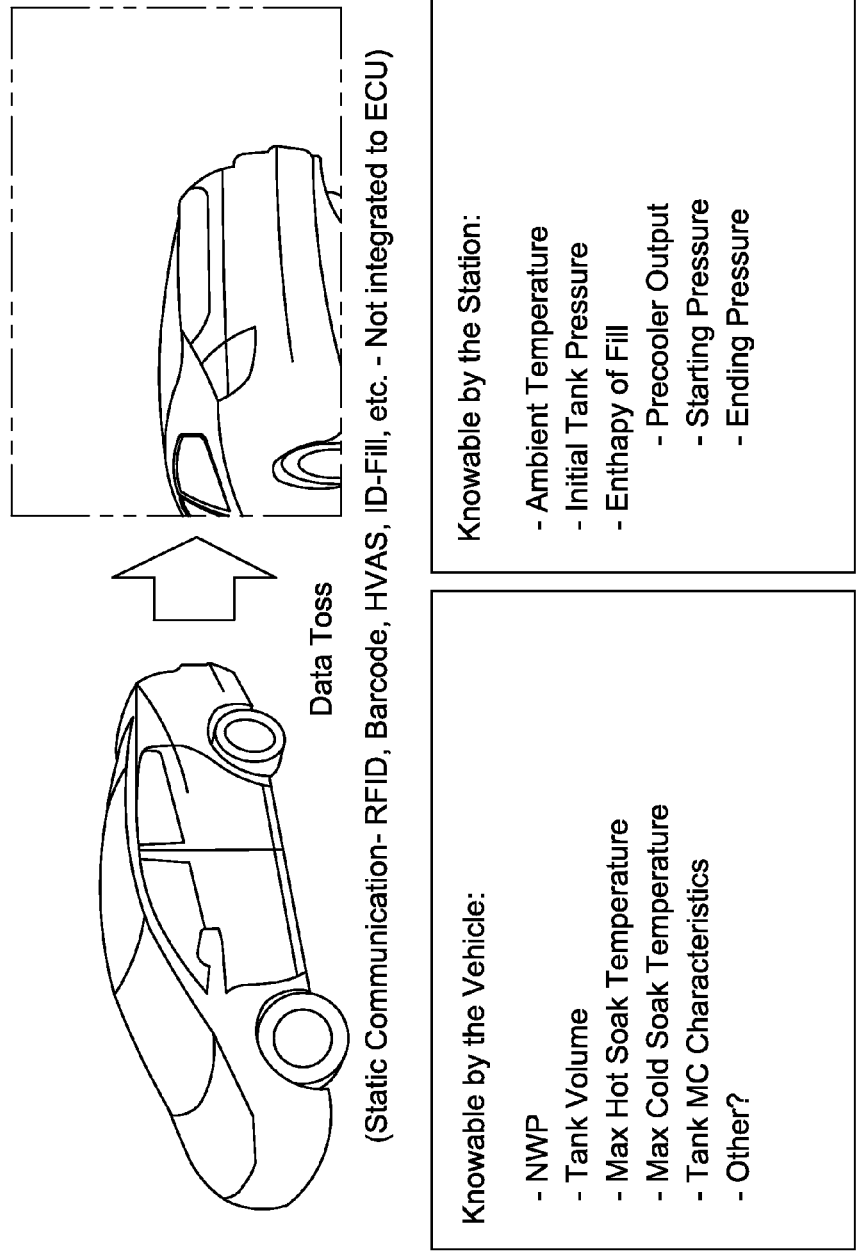
FIG. 12 illustrates information required for fully utilizing the MC Method for determining a fueling protocol under a given set of conditions in accordance with an embodiment of the present application.

FIG. 12 shows both the vehicle side and station side information that may be used to fuel a vehicle based on the MC Method. The station can have access to both the vehicle side information through, for example, HVAS and station side information through direct measurement. The process the station goes through to determine the appropriate fueling speed and end-of-fill pressure target is very similar to that used in building the lookup tables in SAE TIR J2601. The difference is that the assumptions utilized in J2601 are worst case, and based on boundary condition tanks, whereas in conjunction with the MC Method, the station is given some basic parametric data and tailored assumptions for filling the particular vehicle.

The MC Method can also readily accommodate the communication of specific modification to the fill protocol preferred or specified by the OEM. For example, if an OEM imposes or suggests a maximum fill rate, develops a tank system in which the maximum temperature can exceed 85° C. or allows fueling to 103% SOC (if inside of the Maximum Allowable Working Pressure (MAWP)), parameters related to the OEM's design or operating limits and/or preferences can be provided to the hydrogen tank fueling station for modifying the fill protocol accordingly. This flexibility puts additional control of the outcome of the vehicle refueling squarely into the hands of the OEM, so that fill stations utilizing the MC Method can adapt the fill protocol to accommodate the particular vehicle and thereby permit a broader range of OEM designs.

In an embodiment, when applying the MC Method, the fueling process can include two discrete steps. In the first step, parametric data is used to determine an appropriate fueling fill rate, i.e., one that does not overheat the gas in the tank. During the second step, the fueling fill rate is used to determine a target end-of-fill pressure that can keep the system pressure within the target pressure ranges. These two steps are explained below in more detail. In order to determine the appropriate fueling rate for the projected fill operation, the hydrogen tank filling station takes into consideration both the capabilities of the vehicle tank system and its own capabilities to deliver the fuel under the current conditions.

The limits of refueling, as defined in SAE TIR J2601 and TIR J2579 are 85° C. and 125% of the NWP for average gas temperature and pressure, respectively. In an illustrative example, the station makes an assumption about the average gas temperature inside the tank, based on measuring the ambient air temperature and optionally adding a margin for a hot soak condition (e.g., the vehicle has been parked in an environment that is hotter than ambient, such as a hot garage or parking lot). The station also determines the approximate initial SOC of the vehicle, using the temperature assumption and by dispensing a small amount of fuel to the tank to equilibrate the hose pressure to the tank pressure. Based on the tank pressure and vehicle side information, the station can estimate how much hydrogen (mass) must be delivered to the vehicle to achieve the desired SOC and, utilizing an estimate of its pre-cooling capability, the station can calculate the average enthalpy that can be delivered to the vehicle's tank system during the fill operation. Working from this information, the station can then determine how quickly to fill the vehicle while maintaining the requisite safety margin.

As explained supra, the primary MC parameter is based on a target fueling time with additional parameters being used to account for the initial SOC and/or fueling times that exceed the target fueling time. Starting with these targets, the station analyses an initial fill protocol to determine if the fill can be successfully completed, i.e., end-of-fill temperature within specification. If it is determined that the initial fill protocol cannot be successfully completed, an iterative process is initiated to determine an appropriate fueling time. For example, if the fueling operation can be conducted in the target time without exceeding any temperature limits, the station can initiate fueling.

Figure 13:
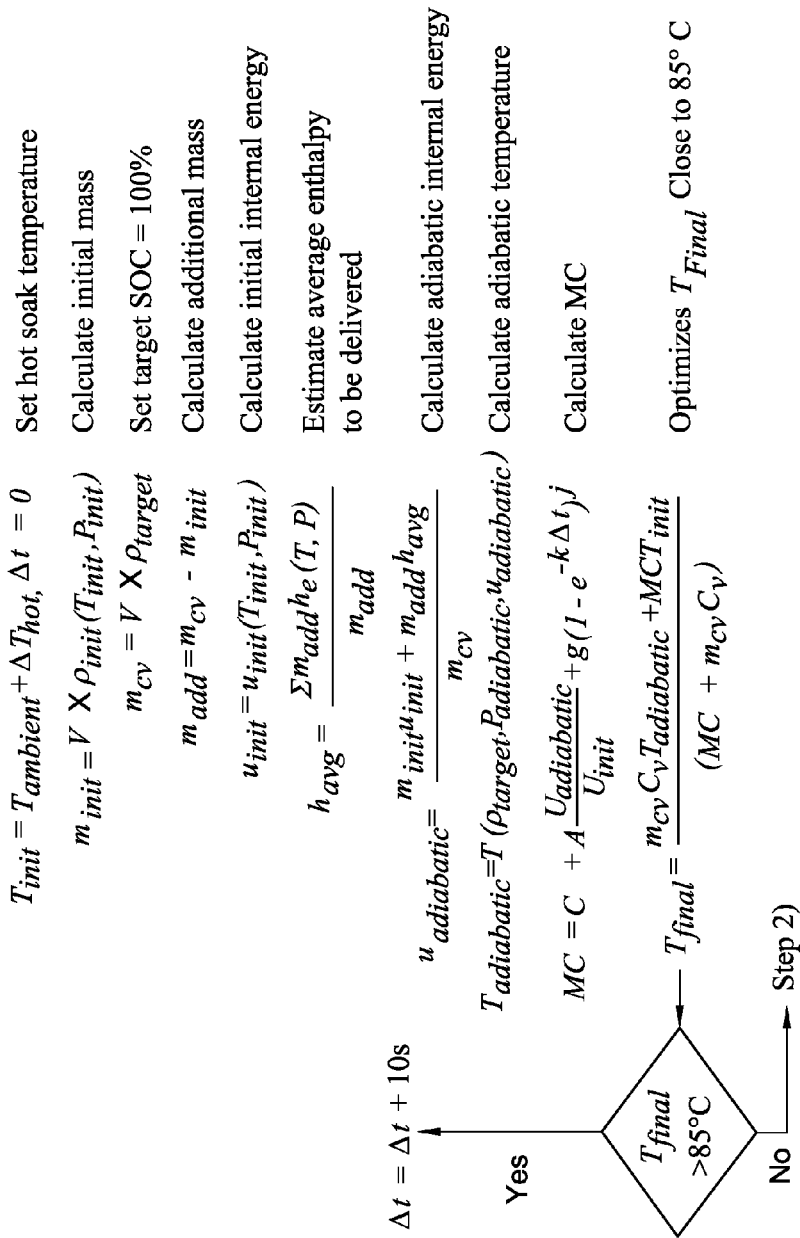
FIG. 13 illustrates the MC Method first step—determining the fueling time based on a higher than ambient temperature soak condition in accordance with an embodiment of the present application.

If, however, the initial fill protocol would cause a temperature limit to be exceeded, the projected fueling time can be increased by some increment (e.g., 0.1, 1, 5, 10 seconds, etc.) and the new MC value can be calculated. This incremental increase of the fueling time can continue until a fueling time is identified that results in end-of-fill conditions that are within specification, e.g., the end-of-fill gas temperature is less than 85° C. This process is shown in FIG. 13. The output of this Step 1 is the $T_{final(Hot\ Soak\ Bound)}$ and the fueling or fill time. In an embodiment, the appropriate fueling time can be continuously calculated throughout the fill procedure based on the actual enthalpy delivered to the vehicle. Accordingly, even though the fueling time calculated at the beginning of the fill should be a good approximation, the fueling time (or rate of pressure rise during the fill) can be adjusted as necessary utilizing a feedback loop based on the actual fill conditions as they occur.

For the dispenser to make the assumption that the upper bound of gas temperature inside the tank is ambient T plus a ΔT hot soak, it must know that the vehicle has not been refueled in the recent past. If it cannot know this information, then it should make a more conservative assumption, and determine the fueling speed based on an empty or nearly empty tank. Then, even if the vehicle was recently refueled, the fueling speed does not overheat the tank.

If the recent fueling history of the vehicle can be determined, a less conservative fueling speed can be utilized, potentially shortening the fueling time considerably. There are a number of approaches that can be utilized for determining the recent fueling history of the vehicle. A non-limiting example is for the HVAS RFID tag to be time stamped each time the vehicle is fueled. The dispenser can then read this time stamp each time the vehicle is fueled and determine whether to use a conservative fueling speed if the time stamp indicates a recent refueling, or a less conservative fueling speed based on the actual starting pressure in the tank if the time stamp indicates refueling has not occurred recently.

Once the appropriate fueling time has been determined, the next step of the MC Method is to determine when, or at what pressure, to stop the fill operation. The process used by the station in this second step is similar to that used in the first step except that the station assumes the gas temperature inside the tank at the beginning of the fill is below the ambient temperature, i.e., a cold soak condition, which includes the possibility that the tank has been soaked in an air conditioned garage, or that the ambient temperature is rising and the internal gas temperature lags the ambient. There is also the factor of driving that may be considered in which the gas temperature inside the tank has been reduced as a result of the decrease in pressure as the hydrogen was consumed. The MC Method can be used to estimate the average temperature of the MC and hydrogen gas during defueling using Equation [12]

$$u_{adiabatic}(t) = \frac{U(T_{ColdSoak}, P_{NWP}) - m_{add}(t) h_{exit}}{m_{initCold}} \quad [12]$$

where $m_{add}$=mass exiting the hydrogen tank in time t
$m_{add}$=$m_{cv}$-$m_{initCold}$=mass to be added during the vehicle refueling calculated in the MC Method to achieve 100% SOC
$h_{exit}$=average enthalpy of the hydrogen exiting the tank
$m_{initCold}$=mass in the tank just before refueling
t=time it would take to empty the tank from $P_{NWP}$ to the starting fill pressure $P_{init}$ $$t = \frac{m_{add}}{\dot{m}} \quad [13]$$

where $\dot{m}$=flow rate of hydrogen during defueling (g/s)
$T_{coldSoak}$=assumed temperature of the vehicle tank before defueling $$T_{ColdSoak} = T_{ambient} - \Delta T_{Cold} \quad [14]$$

And combined with Equation [11] where $T_{adiabatic}$ is determined by a curve fit to NIST data as before, then $T_{final}$ is the average temperature of the MC and the gas in the tank.

$$T_{FinalDefuelCold} = \frac{m_{cv} C_v T_{AdiabaticCold} + MC(t) T_{ColdSoak}}{MC + m_{cv} C_v} \quad [15]$$

The appropriate $\Delta T_{cold}$ parameter, and the defueling mass flow rate $\dot{m}$, can typically be determined by the OEM and can be provided as part of the vehicle side information transferred through HVAS or otherwise made available to the filling station.

Once the initial conditions have been determined, the station can calculate how much mass must be added to the tank to reach the target density of 100% SOC. If the station has an accurate flow meter, it can simply integrate the mass flow during the fill and stop when the target mass has been achieved, however, the application of a flowmeter in this capacity might have its own challenges. A second option is to calculate a pressure target utilizing the same set of equations as in Step 1. $T_{final}$ can be calculated based on the fueling time of Step 1, and then the $P_{target}$ value can be calculated based on the pressure that, in conjunction with $T_{final}$, provides a 100% SOC target density.

This process can be more easily understood by utilizing the equations shown in FIG. 14. It is important to note that the pressure target can be continuously calculated throughout the fill procedure based on the actual enthalpy delivered to the vehicle. Accordingly, even though the pressure target calculated at the beginning of the fill should be a very good approximation, the pressure target utilized in stopping the fill can be adjusted as necessary based on the actual fill conditions as they occur. The output of this Step 2 is the $P_{Target}$.

In the case of a fill with communications, the initial temperature can be measured directly by the station. Because this initial temperature is a settled temperature, i.e., a temperature not subject to the dynamic changes associated with vehicle fueling, it is typically reliable. In such cases, the $T_{init}$ is simply the measured initial temperature and the hot soak and cold soak assumptions detailed above need not be considered.

During the fill testing conducted during development of the MC Method, a "Target $T_{final}$" value was calculated in order to evaluate any errors between the expected result and the actual result. This "Target $T_{final}$" is shown in FIGS. 16-18 and FIG. 20 to demonstrate the accuracy of the MC Method. In a normal "ID-Fill," Step 3 is unnecessary—the station does not need to calculate an expected result as the fill protocol is fully defined by Step 1 and Step 2.

Using the fill rate from Step 1, and the Pressure Target from Step 2, the expected $T_{final}$ can be calculated. Because the Pressure Target calculated in Step 2 is usually lower than the Pressure Target that was assumed in Step 1, the resulting fill can tend to exhibit a slightly lower SOC % which, in turn, indicates that the gas density target needs to be reduced to match the Pressure Target at a higher $T_{final}$ than was calculated in Step 2. Because a change in additional mass of hydrogen added affects the $T_{adiabatic}$, for greater precision it is necessary to complete the outlined calculations in order to determine the expected $T_{final}$ and SOC % target.

The utility and flexibility of the MC Method provides many opportunities for customization and refinement to encompass, for example, fueling times of less than 3 minutes for tanks that start filling at high SOC.

To confirm the MC parameters calculated according to the procedures defined supra, and to confirm the accuracy of using these parameters in the filling algorithm detailed supra, a fifth fueling test was conducted for each of the previously tested tanks using conditions of ambient temperature, initial fill amount, and pre-cooling temperature that were different than the conditions used in characterizing the tank. Using the algorithms discussed supra and illustrated in FIG. 13, the expected final temperature $T_{final}$ was calculated for fills conducted at 35 MPa, 50 MPa and 70 MPa. For the Hot Soak margin of safety to overheat, $T_{init}$=Ambient Temp+7.5° C. was used, for the Cold Soak margin of safety to overfill, $T_{init}$=Ambient Temp−10° C. was used. For the target $T_{final}$, $T_{init}$=Ambient Temp was used in the algorithm illustrated in FIG. 15.

Figure 16:
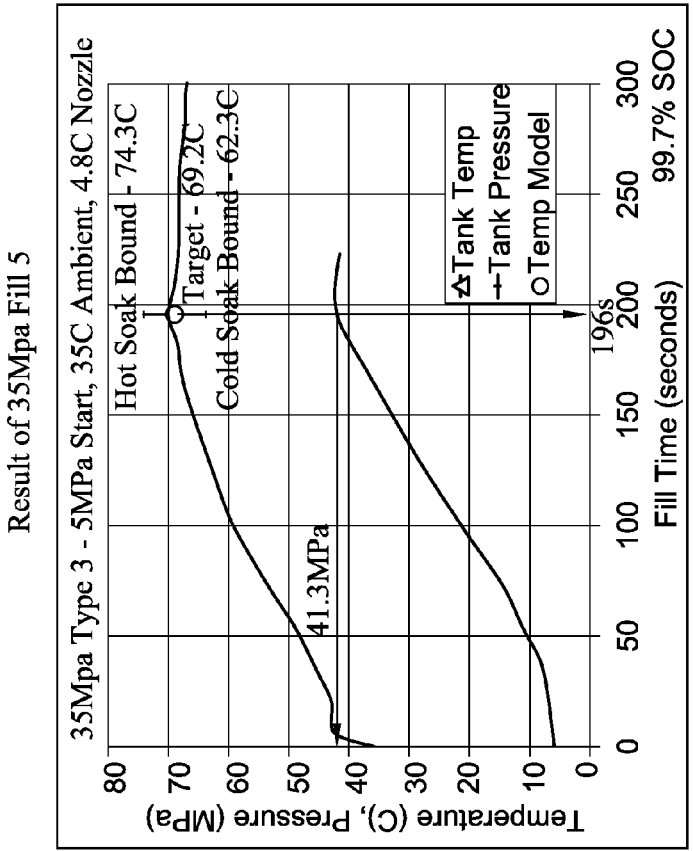
FIG. 16 illustrates the results obtained from a 35 MPa Type 3 Tank Fill under a 35° C. ambient with 5° C. Pre-cooled Hydrogen and 5 MPa Start Pressure. $T_{final}$ target is 69.2° C., bounded by Hot Soak at 74.3° C. and Cold Soak at 62.3° C. in accordance with an embodiment of the present application.

The results of a 35 MPa Type 3 Tank Confirmation Test are illustrated in FIG. 16. Although the original targets were set for delivering 0° C. gas, the hydrogen filling station being used for the evaluation was actually delivering nearly 5° C. gas, which would be outside of the SAE TIR J2601 tolerance of 0° C.±2.5° C. for a Type C station. This demonstrates one of the practical challenges of defining a tight tolerance on the pre-cooling temperature—it is actually difficult to achieve and/or maintain, even in test conditions. In light of the noted capabilities of the hydrogen filling station, the targets were adjusted for using 4.8° C. as the temperature of the delivered gas, the 35 MPa tank fill actual temperature measurement was within 1K of the calculated $T_{final}$. Further, although fill completion was targeted for 180 seconds, the actual fill was finished at 196 seconds. As a practical measure, in order to achieve an optimum fill time the Hot Soak Bound should be set at 85° C., however, because the test was predicated on a 3-minute fill target, the Hot Soak Bound is less than 85° C. The MC Method algorithm can be further refined to improve performance for fill times of less than 3 minutes.

Figure 17:
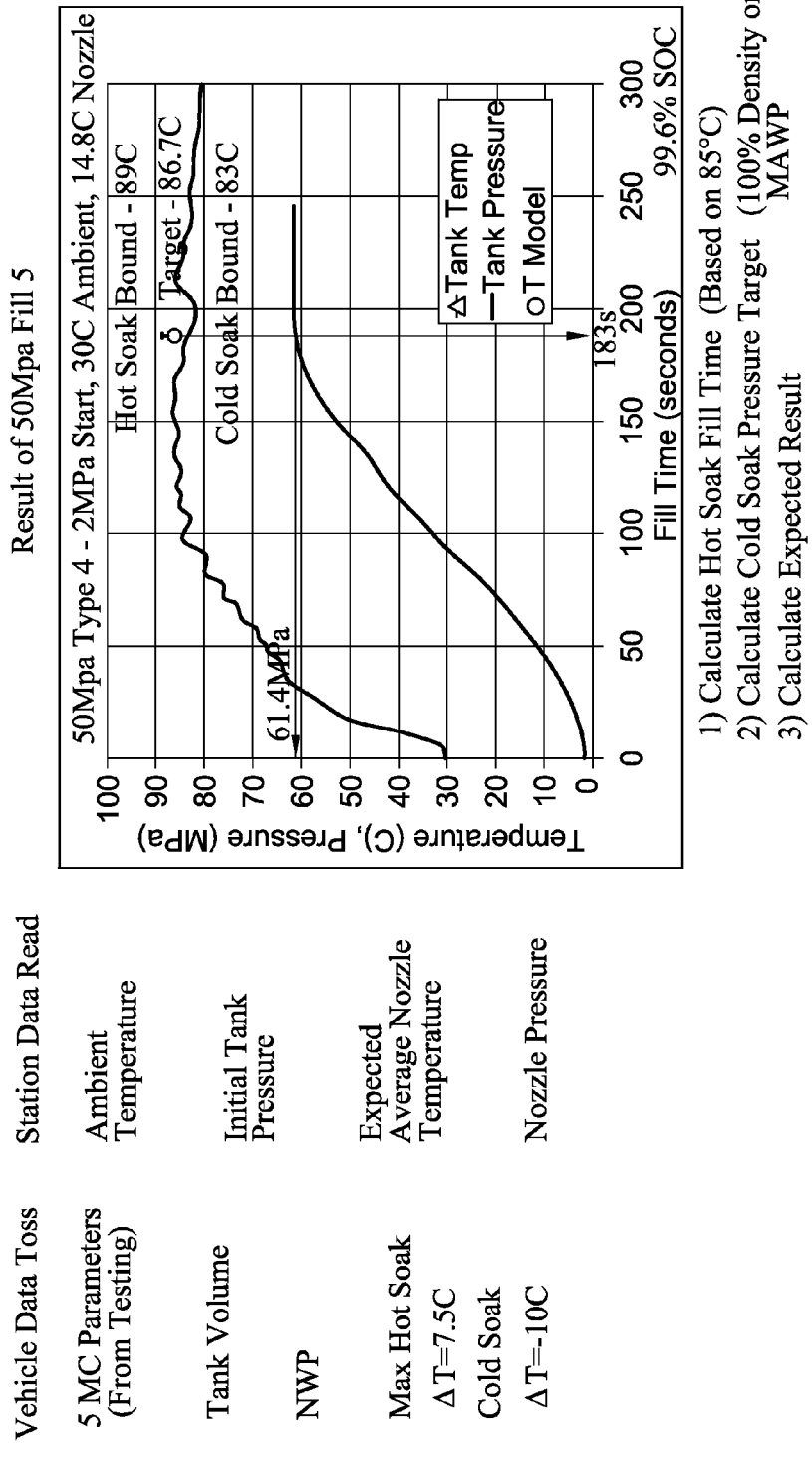
FIG. 17 illustrates the result of 50 MPa Type 4 Tank Fill from 30° C. Ambient with −15° C. Pre-cooled Hydrogen and 2 MPa Start Pressure. $T_{final}$ target is 86.7° C., bounded by Hot Soak at 89.0° C. and Cold Soak at 83.0° C. Note that the target pre-cooling temperature was −20° C., which verified the difficulty in practice of keeping a specified pre-cooling temperature in accordance with an embodiment of the present application.

The results of a 70 MPa Type 4 Tank Filled to 50 MPa Confirmation Test are illustrated in FIG. 17. In this instance, although the pre-cooler was set for −20° C., it was determined that the pre-cooler was actually delivering −14.8° C. gas on average. This result once again reflects the actual difficulty of meeting SAE TIR J2601 tolerances of −20° C.+/−2.5° C. for a Type B station. In light of the observed performance, the temperature targets were adjusted to reflect what −15° C. pre-cooling targets would have been, given the same conditions otherwise. Although this rendered the Hot Soak bound high at 89° C., this deviation is a relic of the pre-cooling temperature being out of specification.

Also noted were changes in temperature in the tank measured after the end-of-fill. These post-fill deviations represent a practical source of error in temperature measurements in a hydrogen tank that may result from, for example, thermocouple placement, temperature gradients within the tank and/or time lag. Given these errors, however, the actual fill result was still remarkably close to the target, further validating the model. Additionally, 85° C. was not utilized as a stop point in these fills, thereby allowing the tanks to reach temperatures slightly above 85° C. These minor temperature deviations were not considered problematic because transient temperatures above 85° C. are generally known and allowed pursuant to SAE J2579, the disclosure of which is incorporated by reference, in its entirety.

Figure 18:
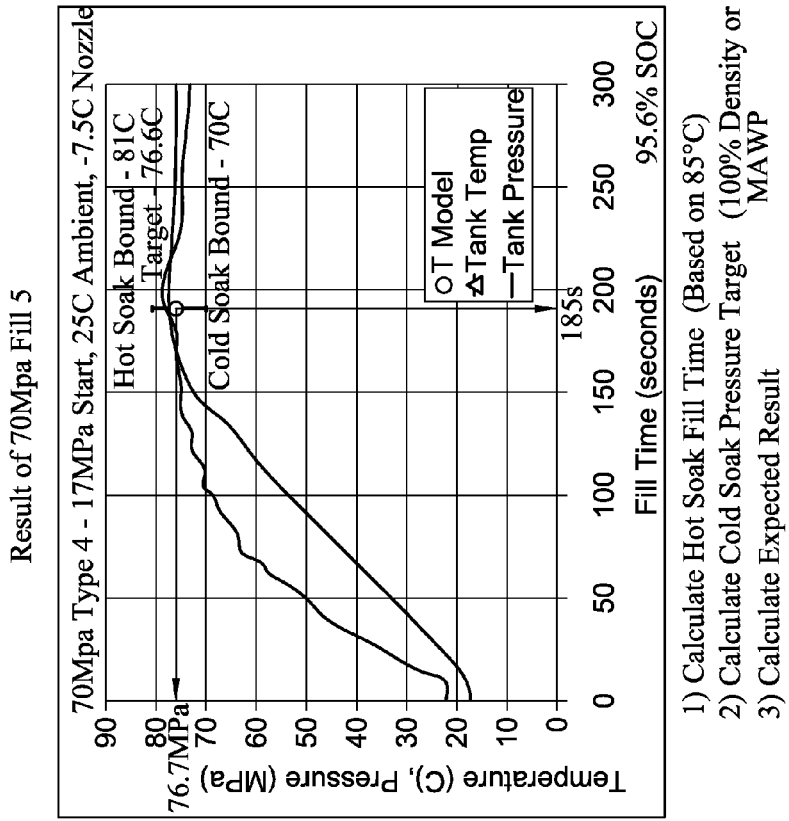
FIG. 18 illustrates 70 MPa Type 4 Tank Test from 25° C. Ambient at 17 MPa Start Pressure with −7.5° C. Pre-cooling. $T_{final}$ target is 76.6° C., bounded by Hot Soak at 81.0° C. and Cold Soak at 70.0° C. in accordance with an embodiment of the present application.

The results of a 70 MPa Type 4 Tank Confirmation Test are illustrated in FIG. 18. As reflected in the illustrated data, the 70 MPa tank test temperature result was an essentially perfect match for the calculated $T_{final}$ Target.

Figure 19:
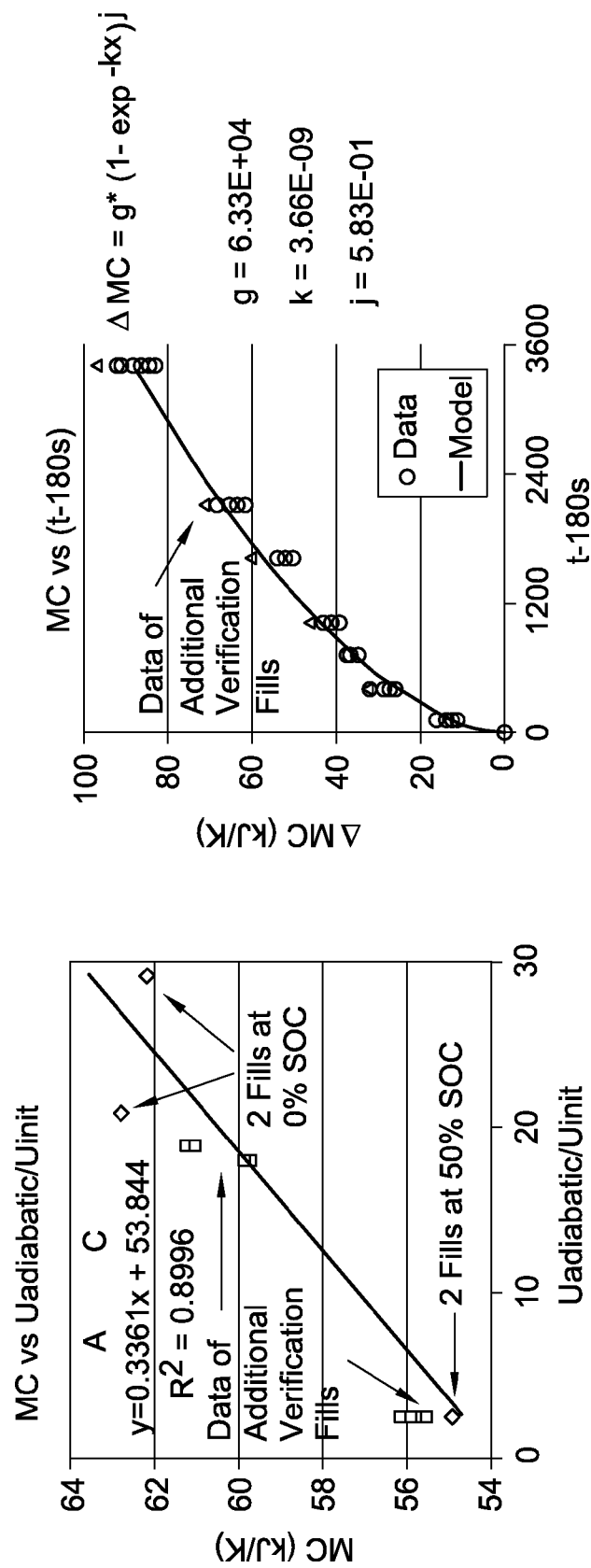
FIG. 19 illustrates Calculation of the Constants of the MC Equation (Equation [11]) for the Type 3 Tank shows that the data generated during verification filling under different conditions compliments the data that was used to generate the constants originally. The model is robust to different conditions in accordance with an embodiment of the present application.

Comparing the data obtained from the 4 test fills used to generate the constants of Equation [11] to the data generated in the fifth verification fill and additional verification fills, the results reinforce the concept that the MC is characteristic for the tank and can be used to predict the fueling result. This is demonstrated in the graphs illustrated in FIG. 19 in which the data generated during the Type 3 Tank confirmation tests detailed above is consistent with the data used in determining appropriate values for the various constants utilized in Equation [11]. These results demonstrate that the MC Method is sufficiently robust to be applied confidently across a range of tank configurations and operating conditions.

Figure 20:
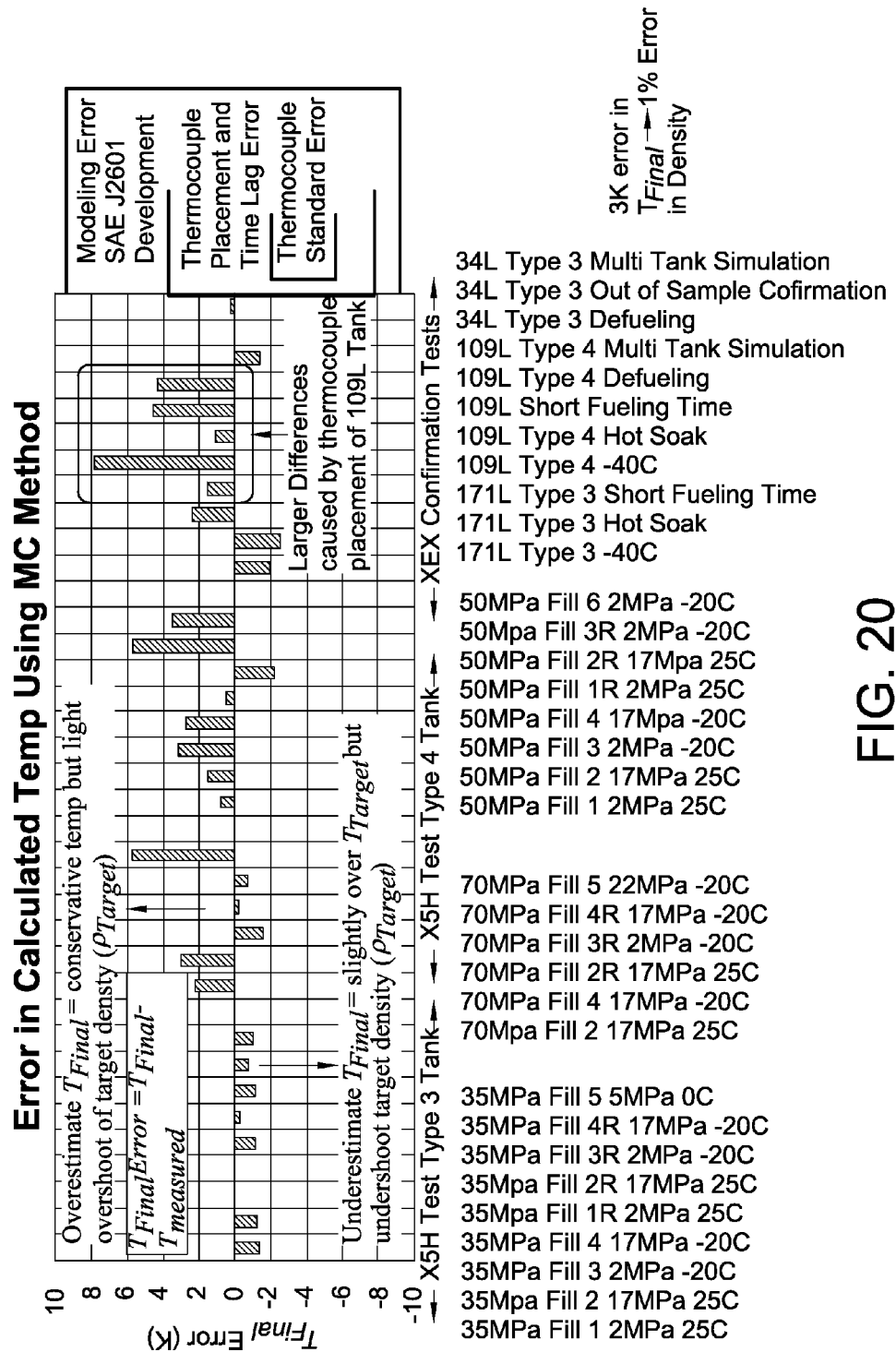
FIG. 20 illustrates Error between $T_{final}$ as calculated by the MC Method and the actual measured final temperature at the end of the fill in accordance with an embodiment of the present application.

Looking at the error from all of the fills conducted, as illustrated in FIG. 20, it is apparent that the MC Method yields very accurate results for Type 3 and Type 4 tanks, typically falling within a range consistent with that expected from variations in thermocouple placement and/or time lag errors. As shown in FIG. 20, the MC Method Model error is the difference between $T_{final}$ as calculated by the MC Method, and the actual final temperature result measured at the end of the fill procedure. The actual pre-cooling temperature of the station was used as the input to the enthalpy calculation rather than the pre-cooler set point, for the reasons described supra. Known or suspected sources of error include, for example:
errors of the calculation in average enthalpy used,
calculation in mass of hydrogen delivered,
measurement of ambient temperature,
measurement of initial tank pressure,
measurement of final tank pressure,
measurement of final tank temperature (thermocouple placement, lag, standard error),
calculation of the MC from the best-fit coefficients, and
difference between actual fill time and expected fill time (due to station bank switching, flow differences, etc.),
heat transfer in or out of the hydrogen stream after the station enthalpy measurement, and/or
differences in the actual tank temperature from the assumed ambient temperature (hot spots, cold spots, etc.)

Given all of these possible sources of error, it is remarkable that the data generated during testing suggests that a lumped heat capacity model can achieve a standard deviation of errors of 0.6K for Type 3 Tanks and 2.4K for Type 4 Tanks. The "Definition Error" as shown in FIG. 20 removes the error in calculating enthalpy, calculating mass, and calculating MC coefficients by using the test data to determine the actual heat transfer, the actual average enthalpy of the fill, and the actual MC value, and using those to calculate $T_{final}$. This removes substantially all of the errors and approximations attributable to the calculations of the MC Method itself, leaving only the measurement errors as the source of error. This has a standard deviation of 0.3K for the Type 3 tank and 1.3K for the Type 4 tank. The remaining portion of the errors is likely a result of measurement errors, thermocouple lag and/or differences between the assumed and actual conditions (such as cold spots in the tank after defueling). It was noted that as the pace of the testing increased the magnitude of the errors also tended to increase, possibly as the result of differences between the assumed and actual conditions including, for example, residual cold spots remaining from the defueling operations conducted between filling tests.

A sensitivity analysis of the MC Method to variations in input errors was conducted to examine the correspondence between known levels of input errors and the resulting output errors. As reflected in the data presented in FIG. 21, the MC Method was relatively resistant to input errors with Type 3 tanks being more sensitive to variations in the initial temperature measurements while Type 4 tanks are more sensitive to variations in the temperature measurement of the flow stream at the station. 10K errors in the initial temperature measurement leads to 6K errors in $T_{final}$ for both Type 3 and Type 4 tanks. 10K errors in the hydrogen temperature measurement at the station (used for the average enthalpy approximation) lead to $T_{final}$ error of 6K for Type 3 tanks and 8K for Type 4 tanks. 10% errors in the calculated MC coefficients lead to errors of around 3K (and 3K represents approximately a 1% error in the density of hydrogen). These results demonstrate that the MC Method has significant robustness to accurately describe vehicle fueling over a range of conditions and suppress the effect of input errors.

As detailed above, utilizing the MC Method for refining Fueling Protocols can improve fueling performance. Although an ID Fill fueling protocol was discussed supra, the MC Method may also be applied to conventional non-communication fueling operations, as well as full communication fueling operations, as currently defined in SAE TIR J2601. A comparison of fueling methods is shown in FIG. 22, which highlights the benefits that could be expected to flow from incorporating the MC Method into all three types of fueling (i.e., ID Fill, Non-Communication and Full-Communication). These benefits are further elaborated upon in the discussion provided infra.

In an ID Fill configuration, the fueling process is better adapted to the tank that is being fueled, thus tending to provide reduced fueling time and increased SOC within the bounds of the uncertainties of the initial conditions of the tank and the measurements at the station. The fueling process is also better adapted to the station's real time capabilities, thereby increasing operational flexibility and avoiding the rigid, preset, tightly bounded temperature requirements corresponding to the various station types as defined in SAE TIR J2601. The MC Method allows the filling process to self-adjust to the current fueling capabilities of the station, thereby providing the potential for simpler, more flexible and less costly hydrogen filling stations. The flexibility of the MC Method allows a hydrogen filling station to be "tuned" to the current operating environment which, in turn, may allow for increased pre-cooling temperatures while still maintaining generally acceptable fueling times under most conditions. The ability to run at higher pre-cooling temperatures can improve station efficiency, lower costs and maintain customer satisfaction.

Fueling processes incorporating the MC Method as detailed supra could eliminate the need for the look-up tables currently utilized for non-communication fueling in accord with SAE TIR J2601, resulting in the same benefits as outlined above. The non-communication fueling operations could include calculations of the MC Parameters of the boundary condition tanks utilized in building the non-communication look-up tables. When operating at the Type A (−40° C.) or Type B (−20° C.) pre-cooling temperatures, the resulting range of fueling rates and pressure targets would be expected to be substantially the same, if not identical, to those defined in the look-up tables.

The flexibility of the MC Method in addressing variations in temperature and pressure would reduce or eliminate the need for rigid definitions of Station Types as currently applied and would allow each station to operate more efficiently for its current environment, and to dispense fuel at improved rates, regardless of its pre-cooling temperature. Conversely, non-communication processes as defined in SAE TIR J2601 must operate within very tight pre-cooling tolerances, and if it falls outside them, cannot dispense fuel (resulting in unhappy customers) until its margins are back within the specified range(s).

The MC Method fueling process can also be utilized with full communication fueling, resulting in a number of benefits. SAE TIR J2601 currently defines two types of communication fueling including 1) a Default method in which fueling rates are the same as the non-communication fueling rates defined in the look-up tables and 2) an Alt Method in which a more aggressive fueling rate can be utilized in those instances in which a vehicle Temperature Signal can be utilized in a feedback loop to regulate the fueling rate in order to suppress or avoid an overheat condition. With the MC Method, the fueling rate is determined at the beginning of the fill, just as described above, and is also checked during the fill based on the actual enthalpy of hydrogen delivered during the fill. With communications fueling, the initial and transient conditions can be more tightly defined, giving even better results. Incorporation of the MC Method would mean that the Default and Alt Methods would no longer be needed—a single communications fueling protocol could be defined and it would be adapted for the vehicle being fueled and the fueling conditions.

From a safety standpoint, the MC Method allows an additional cross check on the Temperature Signal received from the vehicle. Because the station can calculate the expected temperature from the MC parameters and delivered enthalpy, it can cross reference this with the temperature signal from the vehicle. The temperature signal at the beginning of the fill procedure is generally constant so by using the actual measured initial temperature and the characteristic MC parameters, the vehicle fueling protocol can be fully defined, and higher quality fill results can be achieved (as reflected in both SOC and fill time).

The MC Method Fueling Protocol can be utilized comprehensively by the station, for Identification Fueling, Non-Communication Fueling and Full Communication Fueling, resulting in a fill protocol that is better adapted to the current capabilities of both the vehicle and the hydrogen filling station and takes into account the current operating environment to achieve higher quality fills.

Figure 21:
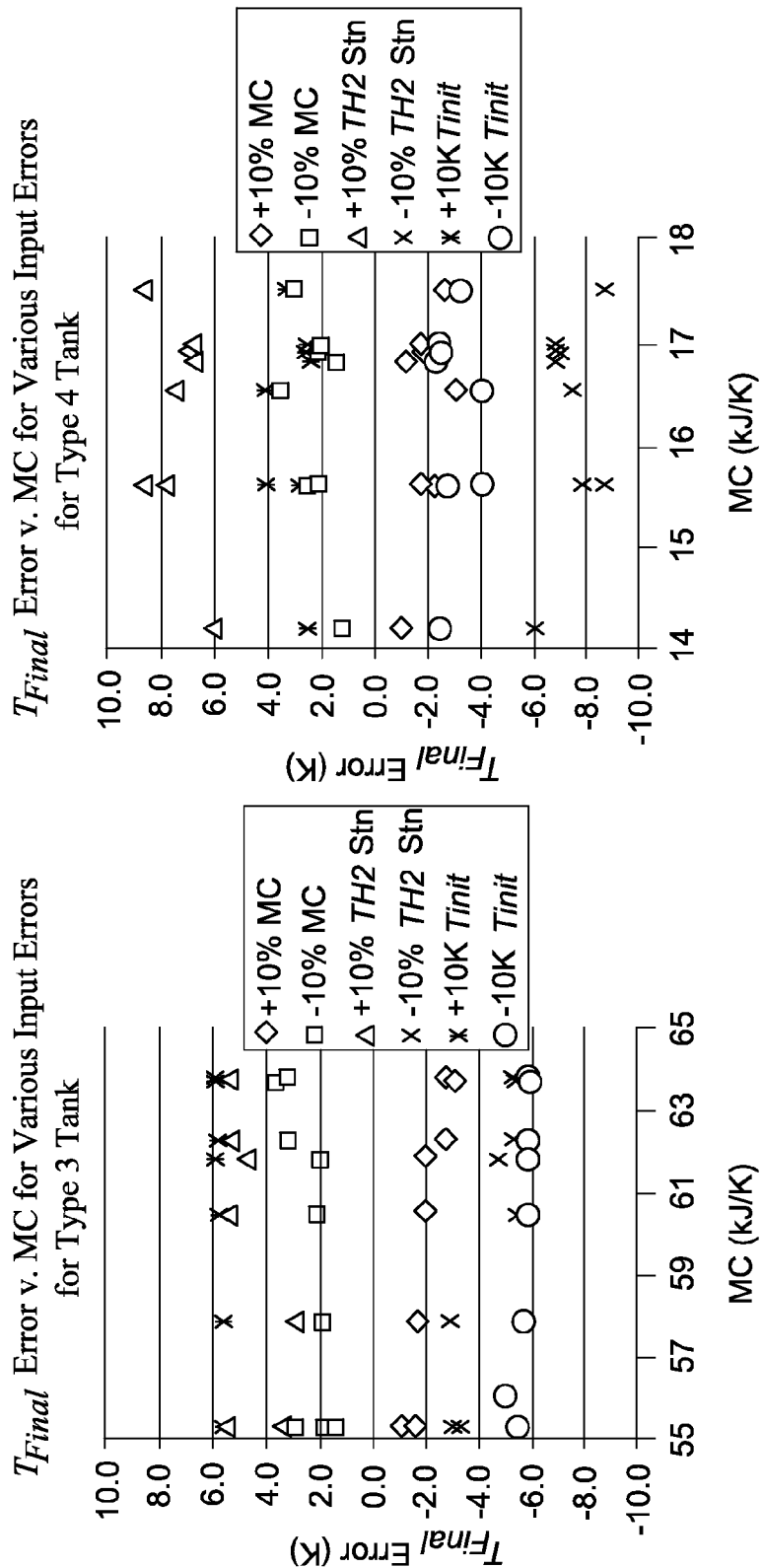
FIG. 21 illustrates a Sensitivity Analysis of Type 3 and Type 4 Tanks to Input Errors Using the MC Method in accordance with an embodiment of the present application.

An aspect of using the MC Method is the accurate prediction of the mass average enthalpy that can be delivered to the tank during a refueling procedure or event. As shown in FIG. 21, a 10K error in the mass average temperature can result in a 6K to 8K error in $T_{final}$, so it is important to accurately predict the enthalpy of the upcoming fill. In connection with the MC Method testing, a Runge-Kutta approximation was developed for average hydrogen enthalpy at the nozzle from stations using pre-cooling as illustrated below in Equation [16].

$$\bar{h} = \frac{1}{4}\left[\left(h\left(T_{precooling}, (P_{StationInit})\right) + h\left(T_{precooling}, \left(P_{StationInit} + \frac{P_{StationFinal} - P_{StationInit}}{4}\right)\right)\right) + \right.$$

$$\frac{\left(h\left(T_{precooling}, \left(P_{StationInit} + \frac{P_{StationFinal} - P_{StationInit}}{4}\right)\right) + h\left(T_{precooling}, \left(P_{StationInit} + 2\frac{P_{StationFinal} - P_{StationInit}}{4}\right)\right)\right)}{2} +$$

$$\frac{\left(h\left(T_{precooling}, \left(P_{StationInit} + 2\frac{P_{StationFinal} - P_{StationInit}}{4}\right)\right) + h\left(T_{precooling}, \left(P_{StationInit} + 3\frac{P_{StationFinal} - P_{StationInit}}{4}\right)\right)\right)}{2} +$$

$$\left[\frac{\left(h\left(T_{precooling}, \left(P_{StationInit} + 3\frac{P_{StationFinal} - P_{StationInit}}{4}\right)\right) + h\left(T_{precooling}, \left(P_{StationInit} + 4\frac{P_{StationFinal} - P_{StationInit}}{4}\right)\right)\right)}{2}\right]$$

where $T_{precooling}$ = Expected Precooling Temperature $P_{StationInit} = P_{Init} + \Delta P_{StationInit}$ = Initial Hydrogen Tank Pressure + Initial Station Pressure Drop $P_{StationFinal} = P_{Final} + \Delta P_{StationFinal}$ = Final Hydrogen Tank Pressure + Final Station Pressure Drop During testing, it was found that $\Delta P_{stationInit}$ = 5 MPa if the initial tank pressure was 2 MPa, 2 MPa if the initial tank pressure was 17 MPa, and 1 MPa at higher initial pressures. $\Delta P_{stationFinal}$ was assumed to be 1 MPa in all cases. Therefore, the algorithm may be modified to reflect, more accurately, the conditions and performance of a particular station. In an illustrative example, the station builder or operator may modify the algorithm to more accurately reflect the conditions and performance of the station.

During several test fills, deviations were noted between the pre-cooler output temperature and the actual temperature delivered at the nozzle. These deviations tended to follow a relationship with mass flow rate and pre-cooling level as illustrated in FIG. 23. In general, the higher flow rates and/or larger differences between the pre-cooling and ambient temperatures can be reflected in greater temperature deviations between the nozzle temperature and the pre-cooler set temperature. Therefore, such factors can be taken into account in the MC Method. In a non-limiting example, each station builder or operator may determine this relationship(s) for the range of expected operating conditions and parameters in order to select an appropriate pre-cooling level that can typically provide customer friendly refueling times. This flexibility is one of the benefits of the MC Method—it allows the station to calculate the appropriate fill time for a particular pre-cooling temperature based on the conditions of that fill and the capabilities of the tank itself.

The algorithms utilized in practicing the MC Method are provided below. As the vehicle approaches the hydrogen filling station, the vehicle provides the station, via RFID, IRDA or other communication method, parametric data for a MC Method fill procedure. The parametric data can include, for example:

NWP

Tank Volume (or the station can calculate it with a pressure pulse)

Hot Soak Assumption

Cold Soak Assumption

Constants of MC Equation

Other parameters as desired (Max Temp Allowed, Fastest Fill Rate Allowed, Max $\rho_{Target}$ Allowed, etc.)

Even if none of the parameters are communicated, the station can use the MC Method to conduct the fill by utilizing default Constants of the MC Equation as derived from SAE TIR J2601, and the default Hot Soak, Cold Soak assumptions of SAE TIR J2601.

Step 1—Calculate the Fueling Time Using Hot Soak Assumption $T_{init} = T_{ambient} + \Delta T_{hot}$ $\Delta t = 0$ $m_{init} = V \times \rho_{initial}(T_{initial}, P_{initial})$ $m_{cv} = V \times \rho_{target}$ $m_{add} = m_{cv} - m_{initial}$ $u_{initial} = u_{initial}(T_{initial}, P_{initial})$ $h_{average} = \frac{\sum m_{add} h_i(T, P)}{m_{add}}$ $u_{adiabatic} = \frac{m_{initial} u_{initial} + m_{add} h_{average}}{m_{cv}}$ $T_{adiabatic} = T(\rho_{target}, P_{adiabatic}, u_{adiabatic})$ $MC = C + A\frac{U_{adiabatic}}{U_{init}} + g(1 - e^{-k\Delta t})^j$ $T_{final} = \frac{m_{cv} C_v T_{Adiabatic} + MCT_{initial}}{(MC + m_{cv} C_v)}$ If $T_{final} > 85°$ C. (or other user specific limit), $\Delta t = \Delta t + 10s$ Iterate from the top of Step 1

As a practical measure, $P_{adiabatic}$ can be assumed to be the MAWP with only a very small error, since internal energy has a very weak relationship with pressure.

Step 2—Calculate the Pressure Target Using Cold Soak Assumption $T_{init} = T_{ambient} - \Delta T_{cold}$ $m_{init} = V \times \rho_{initial}(T_{initial}, P_{initial})$ $m_{add} = m_{cv} - m_{initial}$ $u_{initial} = u_{initial}(T_{initial}, P_{initial})$ $h_{average} = \frac{\sum m_{add} h_i(T, P)}{m_{add}}$ $u_{adiabatic} = \frac{m_{initial} u_{initial} + m_{add} h_{average}}{m_{cv}}$ $T_{adiabatic} = T(\rho_{target}, P_{adiabatic}, u_{adiabatic})$ $MC = C + A\frac{U_{adiabatic}}{U_{init}} + g(1 - e^{-k\Delta t})^j$ $T_{final} = \frac{m_{cv} C_v T_{Adiabatic} + MCT_{initial}}{(MC + m_{cv} C_v)}$ $P_{Target} = P(\rho_{target}, T_{Final})$ and $\rho_{target} = 100\%$ SOC $CPRR = \frac{P_{Target} - P_{Init}}{180s + \Delta t}$ Step 3 (if Necessary)—Calculate the Expected Result $T_{init} = T_{ambient}$ $m_{init} = V \times \rho_{initial}(T_{initial}, P_{initial})$ $m_{cv} = V \times P_{Target}$ -continued $$m_{add} = m_{cv} - m_{initial}$$

$$u_{initial} = u_{initial}(T_{initial}, P_{initial})$$

$$h_{average} = \frac{\sum m_{add} h_i(T, P)}{m_{add}}$$

$$u_{adiabatic} = \frac{m_{initial} u_{initial} + m_{add} h_{average}}{m_{cv}}$$

$$T_{adiabatic} = T(\rho_{target}, P_{adiabatic}, u_{adiabatic})$$

$$MC = C + A \frac{U_{adiabatic}}{U_{init}} + g(1 - e^{-k\Delta t})^j$$

$$T_{final} = \frac{m_{cv} C_v T_{Adiabatic} + MC T_{Initial}}{(MC + m_{cv} C_v)}$$

$$P_{Target} = P(\rho_{target}, T_{final})$$

If $P_{Target} > P_{TargetColdSoak}$, $P_{Target} = P_{Target} - 0.001$ g/L
Iterate From the Top of Step 3

A hydrogen station can maintain a database of MC parameters that have been communicated to the station, and use the lowest performing MC parameter, tank volume, and lowest initial SOC % historically observed, to set the pre-cooling temperature for the system in order to achieve a fast fueling rate given ambient temperature. In this way a station can keep the pre-cooling temperature set at an economically optimal level.

As described above, the MC Method calculates the appropriate fueling rate or speed based on the mass average enthalpy of the hydrogen fill, with the mass average enthalpy estimated prior to the fill being conducted. Particularly, according to the above-described MC Method, the station or dispenser makes an assumption about the average gas temperature inside the tank based on a measurement of the ambient air temperature (and an optionally added margin for a hot soak condition). The station also determines the approximate initial SOC of the vehicle, using the assumed average gas temperature inside the tank and by dispensing a small amount of fuel to the tank to equilibrate the hose pressure to the tank pressure. Based on the tank pressure and vehicle side information, the station estimates how much hydrogen (mass) should be delivered to the vehicle to achieve the desired SOC and, utilizing an estimate of its pre-cooling capability, the station calculates the average enthalpy that can be delivered to the vehicle's tank system during the fill operation. Working from this information, the station then determines how quickly to fill the vehicle (i.e., the fueling speed) while maintaining the requisite safety margin.

According to another aspect, the MC Method may be modified (modified MC Method) to employ active/dynamic fueling speed control in which the hydrogen station or dispenser continuously calculates the mass average enthalpy dispensed to the vehicle tank during the fill based on real-time measured conditions, and uses the continuously calculated mass average enthalpy to adjust the fueling speed. More particularly, the modified MC Method adjusts the fueling speed based on a pressure ramp rate such that the gas temperature inside the tank does not exceed a target temperature, i.e., the 85° C. safety limit established in SAE J2601. Like the above-described MC Method, the modified MC Method active fueling speed control controls the fueling speed based on the mass average enthalpy. However, whereas the above-described MC Method estimates the mass average enthalpy of the hydrogen fill prior to the fill being performed, the modified MC Method active fueling speed control continuously calculates the mass average enthalpy of the dispensed hydrogen based on real-time measured conditions during the hydrogen fill. The fueling speed is then adjusted during the hydrogen fill based on the pressure ramp rate, which is continuously determined based on the continuously calculated values of the mass average enthalpy, as is described below.

Enthalpy can be determined by measuring the temperature and pressure of the hydrogen in the flow stream. The mass average enthalpy is determined as the sum of the determined enthalpy multiplied by the hydrogen mass dispensed to the vehicle tank over each of a plurality of predetermined time periods. As detailed below, by continuously measuring the temperature and pressure of the hydrogen in the flow stream, and using the continuously measured temperature and pressure to continuously calculate the mass average enthalpy, the fueling speed can be actively determined and adjusted during the hydrogen fill to optimize the hydrogen fill.

Figure 25:
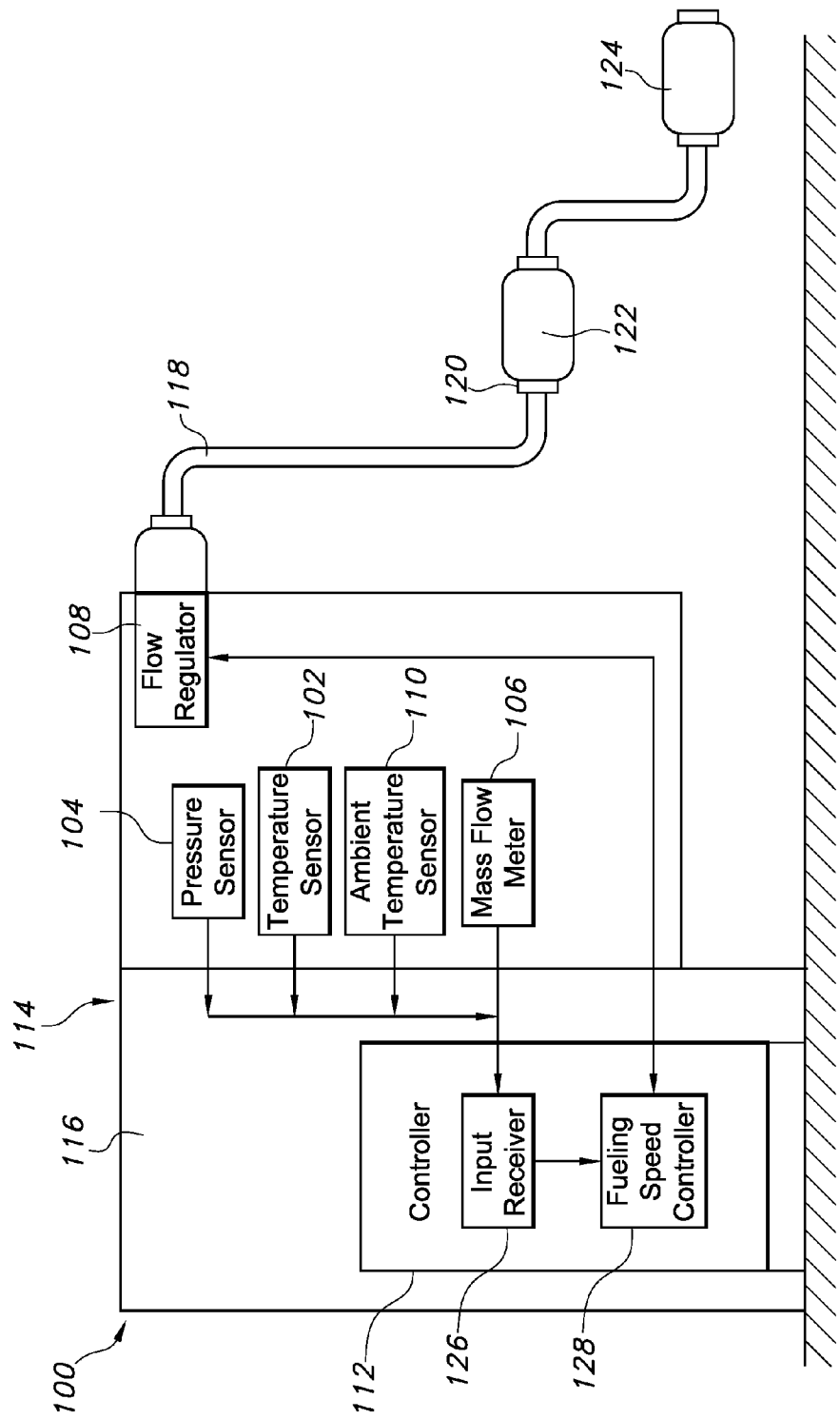
FIG. 25 schematically illustrates a hydrogen station and a controller which controls the hydrogen station in accordance with an embodiment of the present application.

With reference to FIG. 25, to continuously determine the mass average enthalpy a hydrogen station 100 is provided with a temperature sensor 102, a pressure sensor 104, a mass flow meter 106, a hydrogen flow regulator 108, and an ambient temperature sensor 110, all of which communicate with a hydrogen station controller 112 (controller 112). The hydrogen station 100 also includes a dispenser 114 which includes a base 116 and a hose 118. The hose 118 is connected to and extends from the base 116, and includes a nozzle 120 at a distal end thereof. The nozzle 120 is configured to couple with a vehicle input receptacle 122 which communicates with a vehicle gas tank 124. Hydrogen gas is communicated from a source through the base 116 and hose 118 to the vehicle gas tank 124 during fueling.

The temperature sensor 102, pressure sensor 104, mass flow meter 106, hydrogen flow regulator 108, ambient temperature sensor 110, and controller 112 are used to control the operation of the hydrogen station 100. The temperature sensor 102, pressure sensor 104, mass flow meter 106, hydrogen flow regulator 108, and ambient temperature sensor 110 are generally known devices, and will therefore not be described in detail herein. The controller 112 may include one or more arithmetic processors, computers, or any other devices capable of receiving all of the herein-described measurement inputs, performing all of the herein-described calculations, and controlling the dispenser 114 to dispense hydrogen to the vehicle gas tank 124 as described herein.

To this end, the controller 112 may include an input receiver 126 and a fueling speed controller 128. The input receiver 126 communicates with, and continuously receives measurement values as inputs from, the temperature sensor 102, pressure sensor 104, mass flow meter 106, and ambient temperature sensor 110. The input receiver 126 continuously communicates these inputs to the fueling speed controller 128. The fueling speed controller 128 calculates the fueling speed in the manner described below, and controls the hydrogen flow regulator 108 to cause the dispenser 114 to dispense hydrogen at the calculated fueling speed. More specifically, the fueling speed controller 128 continuously receives the inputs from the input receiver 126, performs the necessary calculations to continuously calculate the mass average enthalpy, pressure ramp rate, and fueling speed, and continuously controls the hydrogen flow regulator 108 to cause the dispenser 114 to dispense hydrogen at the continuously determined fueling speed. It is to be appreciated that the controller 112 may be used to receive inputs and perform calculations related to all of the other calculations of the above-described MC Method and the modified MC Method.

Figure 26:
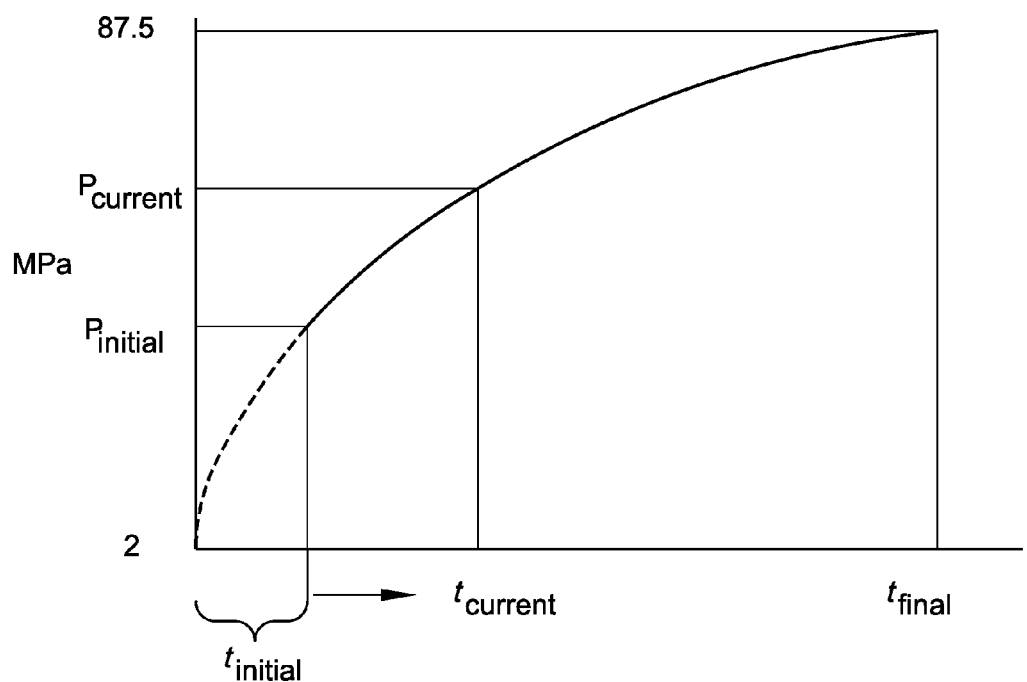
FIG. 26 illustrates a relationship between pressure and time during a fueling procedure in accordance with an embodiment of the present application.

With reference to the use of the mass average enthalpy to actively determine fueling speed in the modified MC Method, it is first noted that the fueling speed is actively determined and controlled based on a calculated upper boundary for Pressure v. Time. FIG. 26 shows a graph of Pressure v Time for a 70 MPa NWP tank. The upper boundary is defined by calculating the fastest Pressure v. Time profile based on the ambient temperature and a currently measured mass average enthalpy during the fill. For the 70 MPa NWP tank (target final temperature=85° C., target final pressure $P_{target}$=87.5 MPa), the pressure ramp rate RR is calculated using Equation [17], shown below:

$$RR = \frac{87.5 - P_{current}}{t_{final} - t_{current} - t_{initial}} \quad [17]$$

where $$t_{initial} = \frac{(P_{initial} - 2)}{\left(\frac{87.5 - 2}{t_{final}}\right)} = t_{final}\frac{(P_{initial} - 2)}{85.5}$$

combining the above equations yields:

$$RR = \frac{87.5 - P_{current}}{t_{final}\left(\frac{87.5 - P_{initial}}{85.5}\right) - t_{current}}$$

To make the equation applicable to tanks having different NWP, where 1.25×NWP=$P_{target}$:

$$RR = \frac{P_{target} - P_{current}}{t_{final}\left(\frac{P_{target} - P_{initial}}{P_{target} - 2}\right) - t_{current}}$$

During the hydrogen fill, the pressure and temperature of the hydrogen in the flow stream are continuously measured and used to continuously calculate the mass average enthalpy $h_{average}$. In turn, the continuously calculated mass average enthalpy $h_{average}$ is used to continuously calculate a total time to complete the hydrogen fill $t_{final}$, and the total time to complete the hydrogen fill $t_{final}$ is a variable used in calculating the pressure ramp rate RR (Equation [17]). With respect to calculating the mass average enthalpy $h_{average}$ and total time to complete the hydrogen fill $t_{final}$, Step 1 of the MC Method is modified by the modified MC Method as shown below.

$$T_{init} = T_{ambient} + \Delta T_{hot}$$

$$m_{init} = V \times \rho_{initial}(T_{initial}, P_{initial})$$

$$m_{cv} = V \times \rho_{target}$$

$$m_{add} = m_{cv} - m_{initial}$$

$$u_{initial} = u_{initial}(T_{initial}, P_{initial})$$

$$U_{initial} = u_{initial} \times m_{init}$$

$$h_{average} = \frac{\sum_{l}^{i} \Delta m_{(i)} \times h_{(i)}}{\sum_{l}^{i} \Delta m_{(i)}}$$

$$u_{adiabatic} = \frac{U_{initial} + m_{add} h_{average}}{m_{cv}}$$

$$U_{adiabatic} = u_{adiabatic} \times m_{cv}$$

-continued $$T_{adiabatic} = T(\rho_{target}, P_{adiabatic}, u_{adiabatic})$$

$$MC = m_{cv}C_v \frac{(T_{adiabatic} - T_{Final})}{(T_{Final} - T_{Initial})}$$

$$\Delta t = -\frac{1}{k}\ln\left(1 - \left[\frac{MC - A - B\ln\sqrt{\frac{U_{adiabatic}}{U_{initial}}}}{g}\right]^{\frac{1}{j}}\right)$$

If $\Delta t$<0, $t_{final}$=$t_{min}$, else $t_{final}$=$t_{min}$+$\Delta t$ where $t_{current}$=time measured since fill began $t_{final}$=time required to fill from 2 MPa to 87.5 MPa without gas temperature exceeding 85° C.

$t_{min}$=minimum fill time, which may be a predetermined value based on the equation for MC $h_{average}$=mass average enthalpy $m_{ads}$=mass added during the fill to achieve 100% SOC $\Delta m$=change in mass or mass added from previous time step measurement The above algorithm is continuously performed as the pressure and temperature values are continuously measured, so as to continuously calculate the mass average enthalpy $h_{average}$ and the total time to complete the hydrogen fill $t_{final}$. The continuously calculated total time to complete the hydrogen fill $t_{final}$ is then used to continuously calculate the pressure ramp rate RR (using Equation [17]). The fueling speed is then continuously determined and actively controlled based on the continuously calculated pressure ramp rate RR.

More specifically, the fueling speed is determined as a fueling speed which achieves a target pressure at a given future time, where the target pressure at the given future time is determined based on the calculated pressure ramp rate RR. Referencing the graph shown in FIG. 26, the target pressure at a given future time may be determined as a point on the Pressure vs. Time curve which is between $t_{current}$ and $t_{final}$. The fueling speed is then controlled such that the pressure will equal the target pressure at the given future time. The selection of the given future time is discussed in further detail below. More particularly, the hydrogen flow regulator 108 increases or decreases the mass flow rate of hydrogen in order to match the defined pressure ramp rate RR from the fueling speed controller 126.

It is reiterated that as the mass average enthalpy $h_{average}$ changes, $t_{final}$ changes, and that as $t_{final}$ changes, the pressure ramp rate RR changes. Moreover, as the pressure ramp rate RR changes, the target pressure at any given future time will also change. Accordingly, by continuously measuring temperature and pressure, and continuously calculating the mass average enthalpy $h_{average}$ during fueling, the fueling speed can be continuously determined and actively controlled during fueling to optimize the fueling procedure.

With respect to determining the given future time, it is to be appreciated that the continuous measurements and calculations may be iteratively performed at a plurality of predetermined time or pressure steps. For example, measurement of the temperature and pressure, and calculation of the mass average enthalpy $h_{average}$, the total time to complete the hydrogen fill $t_{final}$, the pressure ramp rate RR, and the fueling speed, may be iteratively carried out at predetermined time intervals (e.g., every x seconds). Alternatively, measurement of the temperature and pressure, and calculation of the mass average enthalpy $h_{average}$, the total time to complete the hydrogen fill $t_{final}$, the pressure ramp rate RR, and the fueling speed, may be iteratively carried out at predetermined pressure levels (e.g., every 1 MPa change). Accordingly, the given future time may be set as a next time step (or any other future time step).

As a further example, it can be assumed that measurement of the temperature and pressure, and calculation of the mass average enthalpy $h_{average}$, the total time to complete the hydrogen fill $t_{final}$, the pressure ramp rate RR, and the fueling speed, is iteratively carried out every 5 seconds. At the first time step (t=5 seconds), the calculated pressure ramp rate RR will be used to determine a target pressure at the second time step (t=10 seconds). In this regard, the target pressure $P_i$ at the given future time i, where i and i-1 reference discrete time steps at which measurement and calculation are iteratively performed, may be calculated using Equation [18], shown below:

$$P_i = P_{i-1} + (t_i - t_{i-1})RR_{i-1} \quad [18]$$

The fueling speed will then be determined and adjusted such that the measured pressure equals the target pressure at the second time step (t=10 seconds), inasmuch as is possible.

Accordingly, the fueling speed may be adjusted so as to achieve the target pressure at a next predetermined time step for measurement and calculation. It is to be appreciated that while the instant disclosure references continuous measurement and calculation, as used herein the term continuous may be considered to include iterative measurement and calculation, as well as non-iterative measurement and calculation. With respect to the non-iterative continuous measurement and calculation, a change in the measured temperature and pressure values may be used to trigger new calculation of the mass average enthalpy $h_{average}$, the total time to complete the hydrogen fill $t_{final}$, the pressure ramp rate RR, and the fueling speed.

With further reference to the calculation of the mass average enthalpy $h_{average}$, it is noted that it may take time for the gas to cool down at the beginning of the fill. The cooling of the gas may result in the calculated mass average enthalpy $h_{average}$ being high, which can yield a slow pressure ramp rate RR. Therefore, as a further modification of the above algorithm, an expected mass average enthalpy $h_{ave\_expected}$ may be used until the calculated mass average enthalpy $h_{average}$ drops below a predetermined mass average enthalpy threshold. Once the calculated mass average enthalpy $h_{average}$ drops below the predetermined mass average enthalpy threshold and is observed to be decreasing, then the mass average enthalpy $h_{average}$ may be calculated according to the above algorithm. This modification is reflected by the below algorithm:

$$h_{average} = \frac{\sum_{l}^{i} \Delta m_{(i)} \times h_{(i)}}{\sum_{l}^{i} \Delta m_{(i)}}$$

If $h_{average(i)} < h_{average(i-1)}$,
and $h_{average(i)} < h_{ave(expected)}$,
then $h_{average} = h_{average(i)}$;
else $h_{average} = h_{ave(expected)}$
where
$h_{average(i)}$=the mass average enthalpy calculated at a time step i
$h_{ave(expected)}$=predetermined mass average enthalpy threshold
$h_{average}$=value of mass average enthalpy used to calculate $t_{final}$ As an additional modification, a final mass average enthalpy at an end of the fill may be calculated based on a current calculated value of the mass average enthalpy $h_{average}$. The calculated final mass average enthalpy may then be used in Equation [17] to calculate the pressure ramp rate RR, so as to facilitate determination of the fueling speed, as described above. To calculate the final mass average enthalpy, a minimum mass average enthalpy is set according to the following algorithm When $h_{average(i)} > h_{average(i-1)}$
and $h_{average(i-1)} > h_{average(i-2)}$
then $h_{average\_min} = h_{average(i-2)}$ and $P_{min} = P_{(i-2)}$
where
$h_{average\_min}$ is a minimum mass average enthalpy
$P_{min}$ is a pressure associated with the minimum mass average enthalpy Once the mass average enthalpy is rising, the mass average enthalpy may be extrapolated from the current average enthalpy to the end of the fill (at $P_{final}=1.25 \times NWP$). Then, a weighted average of the extrapolated mass average enthalpy and the calculated mass average enthalpy is used to calculate the final mass average enthalpy. The extrapolated mass average enthalpy and the final mass average enthalpy are calculated according to the follow algorithm If $h_{average(i)} > h_{average(i-1)}$
and $h_{average(i-1)} > h_{average(i-2)}$
then $$h_{extrapolate(i)} = h_{average\_min} + \frac{(h_{average(i)} - h_{average\_min})(P_{final} - P_{min})}{(P_{(i)} - P_{min})}$$

$$h_{avefinal} = A h_{extrapolate(i)} + B h_{average(i)}$$

If $h_{average(i)} > h_{avefinal(i)}$,
Then $h_{avefinal(i)} = h_{average(i)}$
Where
$h_{avefinal}$=final mass average enthalpy
$h_{extrapolate}$=extrapolated mass average enthalpy
A=weighting factor for $h_{extrapolate}$
B=weighting factor for $h_{average(i)}$ This algorithm ensures that the estimated final mass average enthalpy is always greater than or equal to the calculated mass average enthalpy. The calculated final mass average enthalpy may then be used in Equation [17] to calculate the pressure ramp rate RR, so as to facilitate determination of the fueling speed, as described above.

With reference to the hydrogen station dispenser 100 shown in FIG. 25, the inputs to Equations [17] and [18], and the above algorithm, are provided by the temperature sensor 102, pressure sensor 104, mass flow meter 106, and ambient temperature sensor 110, which respectively measure the temperature of the hydrogen gas, the pressure of the hydrogen gas, the mass of hydrogen gas dispensed, and the ambient temperature. These values are continuously measured and output to the input receiver 126 of the controller 112. The input receiver 126 receives these values and communicates these values to the fueling speed controller 128. The fueling speed controller 128 then continuously calculates the mass average enthalpy $h_{average}$, the total time to complete the hydrogen fill $t_{final}$, the pressure ramp rate RR, and the fueling speed in manner discussed above. The fueling speed controller 128 then controls the hydrogen flow regulator 108 to cause the dispenser 114 to dispense hydrogen to the vehicle tank 124 at the determined fueling speed. This process is continuously (iteratively or non-iteratively) performed (e.g., at each of a plurality of time steps) during the hydrogen fill, such that the fueling speed is actively adjusted during the hydrogen fill.

By the above-described active fueling speed control, the fueling speed may be determined to optimize the hydrogen fill so as to, for example, reduce the time required for the hydrogen fill to complete while adhering to the relevant safety parameters (i.e., while keeping the hydrogen temperature below 85° C.). To this point, the estimation of the mass average enthalpy prior to the hydrogen fill (as in the above-described MC method) relies on the hydrogen station dispenser estimating its pre-cooling capability. However, the pre-cooling capability may be highly variable, and therefore may require a conservative estimation of mass average enthalpy leading to an overly conservative determination of fueling speed. The active fueling speed control of the modified MC Method has removed the need to estimate the pre-cooling capability, and therefore may determine a better fueling speed value than that obtained otherwise. Additionally, the active fueling speed control may provide a more accurate determination of the mass average enthalpy, which allows for further optimization of the fueling speed.

According to another aspect, the MC Method and the modified MC Method may be further modified in accordance with a second modified MC Method shown in FIGS. 27-40. Turning to FIG. 27, the second modified MC method uses a different MC equation, when compared to the MC equations of the MC Method and the modified MC method. The MC equation of the second modified MC Method accurately derives MC parameters in view of dispenser and vehicle component heat transfer. Particularly, the filling station 100 may include several components that may transfer heat to the gas delivered to tank 124. For example, with reference to FIG. 41, the following components of the dispenser 114 may transfer heat to the gas: a breakaway 119, the hose 118, the nozzle 120 Additionally, the following components of a vehicle tank system 130 may transfer heat to the gas: the vehicle input receptacle 122, tank system tubing 123, one or more valves 129, and manifolds (when present for multi-tank systems). The one or more valves 129 of the vehicle tank system 130 may include, but are not limited to, a check valve. Therefore, to account for component heat transfer directly in the MC equation, equation [11] may be modified as shown below in equation [19]:

$$MC = a + b\frac{T_{amb}}{MAT} + c(\Delta t) + d\left(\frac{T_{amb}}{MAT}\right)^2 + e(\Delta t)^2 + f(\Delta t)\left(\frac{T_{amb}}{MAT}\right) + \qquad [19]$$
$$g\left(\frac{T_{amb}}{MAT}\right)^3 + h(\Delta t)^3 + i\frac{T_{amb}}{MAT}(\Delta t)^2 + j\left(\frac{T_{amb}}{MAT}\right)^2(\Delta t)$$

where
a, b, c, d, e, f, g, h, i, and j are constants
$T_{amb}$ is an ambient temperature measured by the dispenser
$\Delta t$ is the final fill time beyond a minimum fill time By using equation [19], the error between actual MC and the result of the MC equation may be reduced to 4.5%. Further, equation [19] achieves an RMS error of 0.39 and an R-squared of 0.997. An exemplary graphic depiction of MC calculated in accordance with equation [19] of the second modified MC method is shown in FIG. 27.

Turning to FIG. 28, another difference between the second modified MC Method and the other MC methods discussed above is that the estimated end of fill mass average enthalpy (MAE) in the second modified MC method is calculated from the mass average pre-cooling temperature (MAT) and total fill time ($t_{final}$) using an enthalpy map equation. With more specific reference to the calculation of the estimated end of fill mass average enthalpy based on the mass average pre-cooling temperature and the total fill time, the enthalpy map equation used to derive the mass average enthalpy map plotted in FIG. 28 is shown below as equation [20]:

$$MAE = \alpha + k + \frac{l}{MAT} + \frac{m}{MAT^2} + \frac{n}{MAT^3} + \qquad [20]$$
$$\frac{p}{MAT^4} + \frac{q}{MAT^5} + \frac{r}{t_{final}} + \frac{s}{t_{final}^2} + \frac{v}{t_{final}^3} + \frac{y}{t_{final}^4} + \frac{z}{t_{final}^5}$$

where
MAE=end of fill Mass Average Enthalpy,
MAT=Mass Average Pre-cooling Temperature
$t_{final}$=total time needed to fill from 2 MPa to $P_{final}$
α=adjustment factor to account for variability in RR
k, l, m, n, p, q, r, s, v, y, z are constants The fit of equation [20] to the observed data has been observed to be excellent. By using equation [20], the average error between the actual end of fill mass average enthalpy and the result of the estimated end of fill mass average enthalpy equation may be reduced to 0.009%. Further, equation [20] achieves an RMS error of 0.385 and an R-squared of 0.99997. Therefore, while estimating the mass average enthalpy during a fill may be difficult, the enthalpy map equation [20] is an accurate way to estimate end of fill mass average enthalpy.

The above equations [19] and [20] are applied in the second modified MC Method to control fill of a fuel tank at a hydrogen dispenser.

Figure 29:
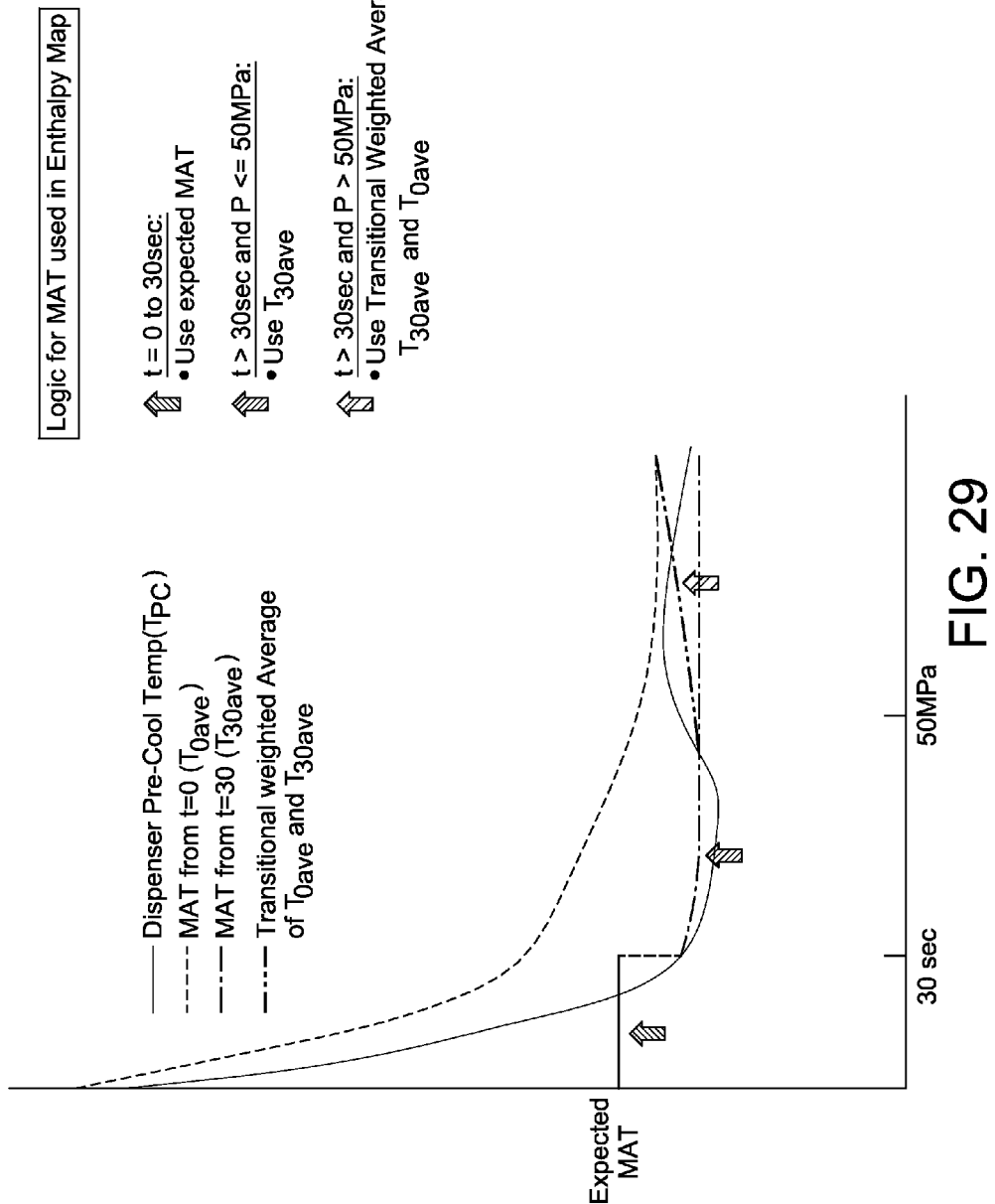
FIG. 29 illustrates the logic for calculating the mass average pre-cooling temperature of hydrogen gas of the second modified MC method in accordance with an embodiment of the present application.

Further, another difference between the second modified MC Method and the other MC methods discussed above is that the pressure ramp rate in the second modified MC Method is calculated based on mass average pre-cooling temperature, as is shown in FIG. 29.

Generally, according to the second modified MC Method, for the first 30 seconds of the fill, the filling station 100 uses an expected mass average pre-cooling temperature, which is based on what the mass average pre-cooling temperature is expected to be at the end of the full fill of tank 124. The expected mass average pre-cooling temperature ($MAT_{expected}$) is set by the manufacturer at the factory. After 30 seconds have elapsed from the start of the fill, the mass average pre-cooling temperature used by the filling station 100 is based on average calculations of the mass average pre-cooling temperature starting from different time periods in the fill. A first average mass average pre-cooling temperature calculation ($T_{0ave}$) is based on an average of the mass average pre-cooling temperature calculations starting at the beginning of the fill (from t=0). A second average mass average pre-cooling temperature calculation ($T_{30ave}$) is based on an average of the mass average pre-cooling temperature calculations starting at the beginning 30 seconds into the fill (from t=30).

Once 30 seconds has lapsed since the beginning of the fill, the filling station 100 uses the $T_{30ave}$ value as the mass average pre-cooling temperature when the pressure of the gas measured at the nozzle 120 of the dispenser 114 is less than or equal to 50 MPa. The dispenser uses a weighted average of the $T_{0ave}$ and the $T_{30ave}$, when the pressure of the gas measured at the nozzle 120 of the dispenser 114 is greater than 50 MPa. The weighting placed on the $T_{0ave}$ and the $T_{30ave}$ changes with rising pressure in tank 124, such that at a highest allowed dispenser pressure, the weighting is 100% on $T_{0ave}$. This relationship is shown in the graph of FIG. 29. The overall operation of the RR control and pressure ending control of the fill control in accordance with the second modified MC Method is illustrated in the flow chart of FIG. 30. FIGS. 31-37 provide additional details regarding the steps of FIG. 30. FIGS. 38-40 define constants and variables used in the equations of the second modified MC Method.

Figure 30:
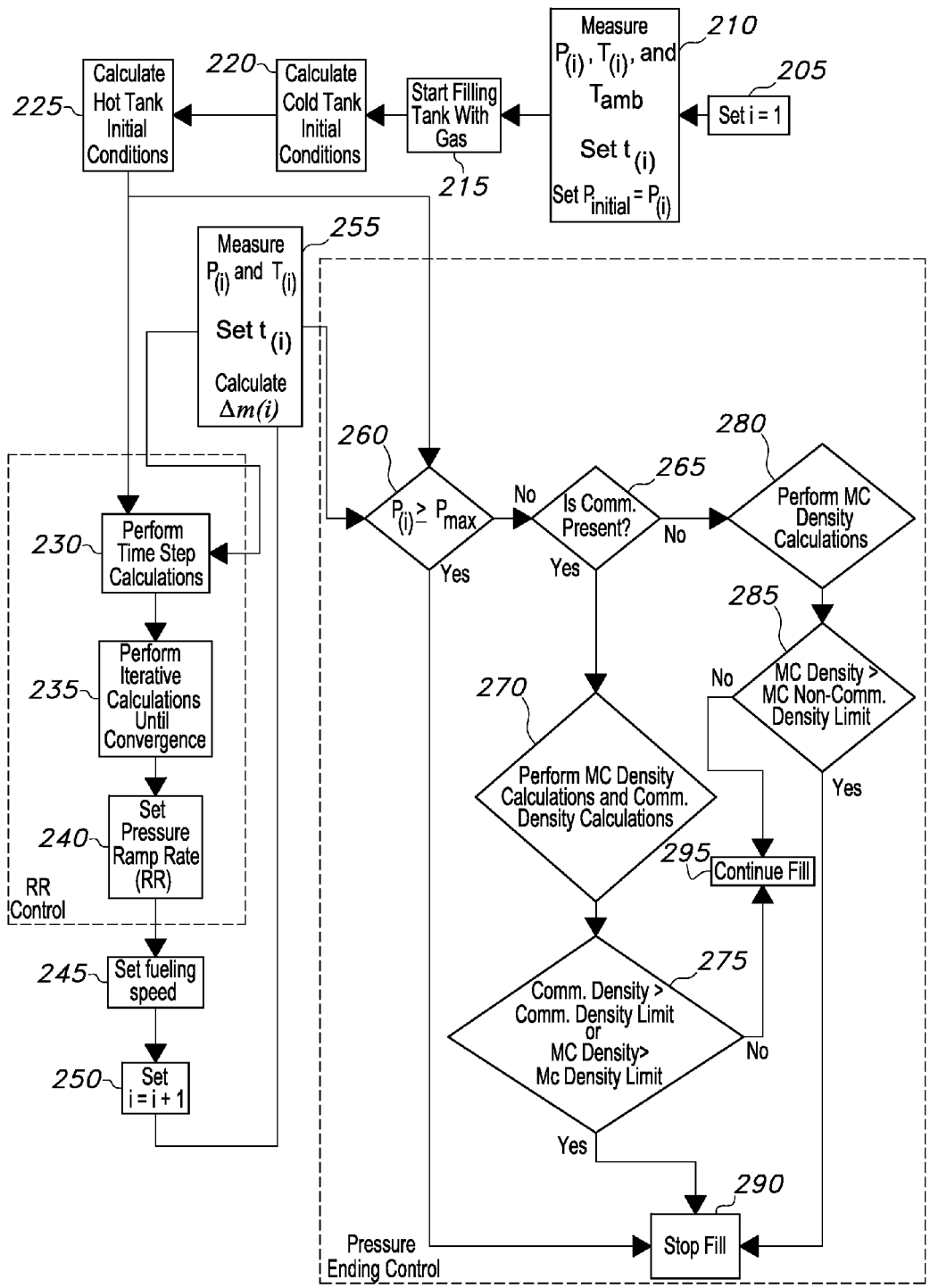
FIG. 30 is a flow chart illustrating the second modified MC method in accordance with an embodiment of the present application.
Figure 41:
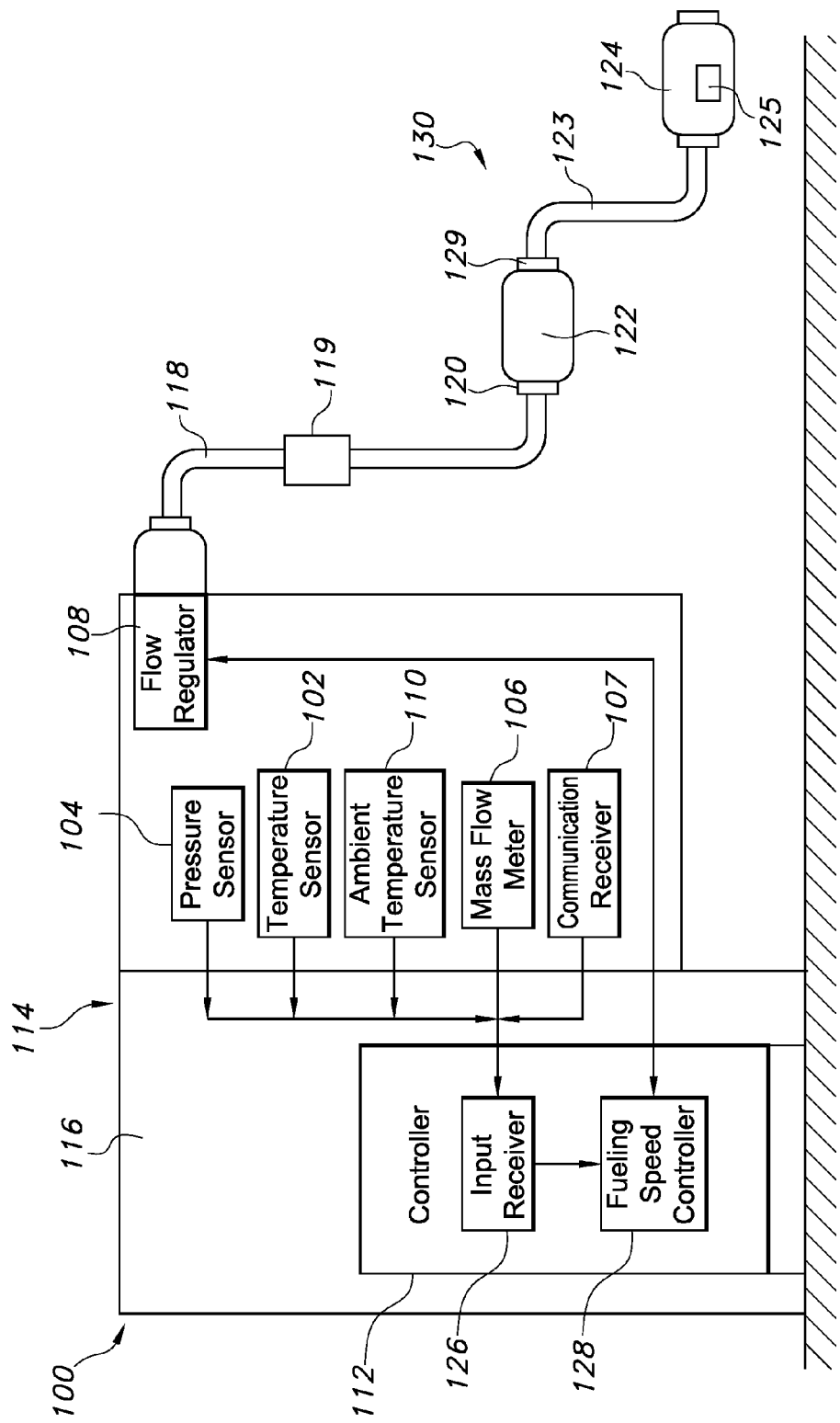
FIG. 41 is a dispenser having a controller that is programmed to perform the second modified MC Method of FIGS. 30-40 in accordance with an embodiment of the present application.

Turning to FIG. 30, the second modified MC Method, which continuously loops, begins by setting "i" equal to 1 at 205, where "i" is a time step counter. Following step 205, values for the $P_{(i)}$, $T_{(i)}$, and $T_{amb}$ variables are measured in step 210. With reference to FIG. 41, $P_{(i)}$ is the pressure of the gas measured by pressure sensor 104 at the nozzle 120 of dispenser 114 for the current time step "i". $T_{(i)}$ is the temperature of the gas measured by temperature sensor 102 at the nozzle 120 of dispenser 114 for the current time step "i". $T_{amb}$ is the ambient temperature of the air around dispenser 114 measured by ambient temperature sensor 110 of filling station 100. Further in step 210 of FIG. 30, $P_{initial}$ is set equal to $P_{(i)}$, and $t_{(i)}$ is set. $t_{(i)}$ is the length of time that has elapsed since the filling of tank 124 with gas commenced. In this embodiment, since gas is first delivered to the tank in the next step, 215, the fill is deemed to commence at step 215. Therefore, $t_{(i)}$ for time step 1, $t_{(1)}$, will have a value of 0. Along the same lines, $P_{initial}$ is the initial measured pressure of the gas in tank 124 before the fill commences. Accordingly, since the fill of tank 124 has yet to commence for the first time step in step 210, $P_{initial}$ is set equal to the pressure $P_{(i)}$ measured for the first time step, $P_{(1)}$.

Therefore, $P_{initial}$ is the pressure measured by pressure sensor 104 at the nozzle 120 of the dispenser 114 before the fill commences. Further, it is noted that $P_{initial}$ is also equal to the pressure of the gas in tank 124 before the fill commences, because a pressure drop is not present between the nozzle 120 of the dispenser 114 and tank 124 before the fill commences. However, a pressure drop is present between the nozzle 120 of the dispenser 114 and tank 124, when gas flows from dispenser 114 into tank 124 after the fill commences. Therefore, when gas is flowing from dispenser 114 into tank 124, a measurement of gas pressure taken at the nozzle 120 of the dispenser 114 will be higher than a measurement of gas pressure taken in tank 124.

In step 215, the filling of tank 124 with gas commences. Following step 215, the cold tank initial conditions are calculated and set in step 220. The term cold tank is defined in SAE J2601. A cold tank is a boundary tank (type 3 vessel) having a carbon fiber overwrap and an aluminum liner, where the tank temperature is colder than ambient before the fill commences. The aluminum liner in the cold tank increases the heat dissipation capability of the tank during the fill, when compared to the type 4 hot tank discussed below.

The cold tank initial conditions set in step 220 are the worst case conditions for overfilling a tank with gas, and are used in the pressure ending control steps 260-295 described below. The cold tank initial condition calculations are shown in FIG. 31, which is discussed in more detail below.

Figure 31:
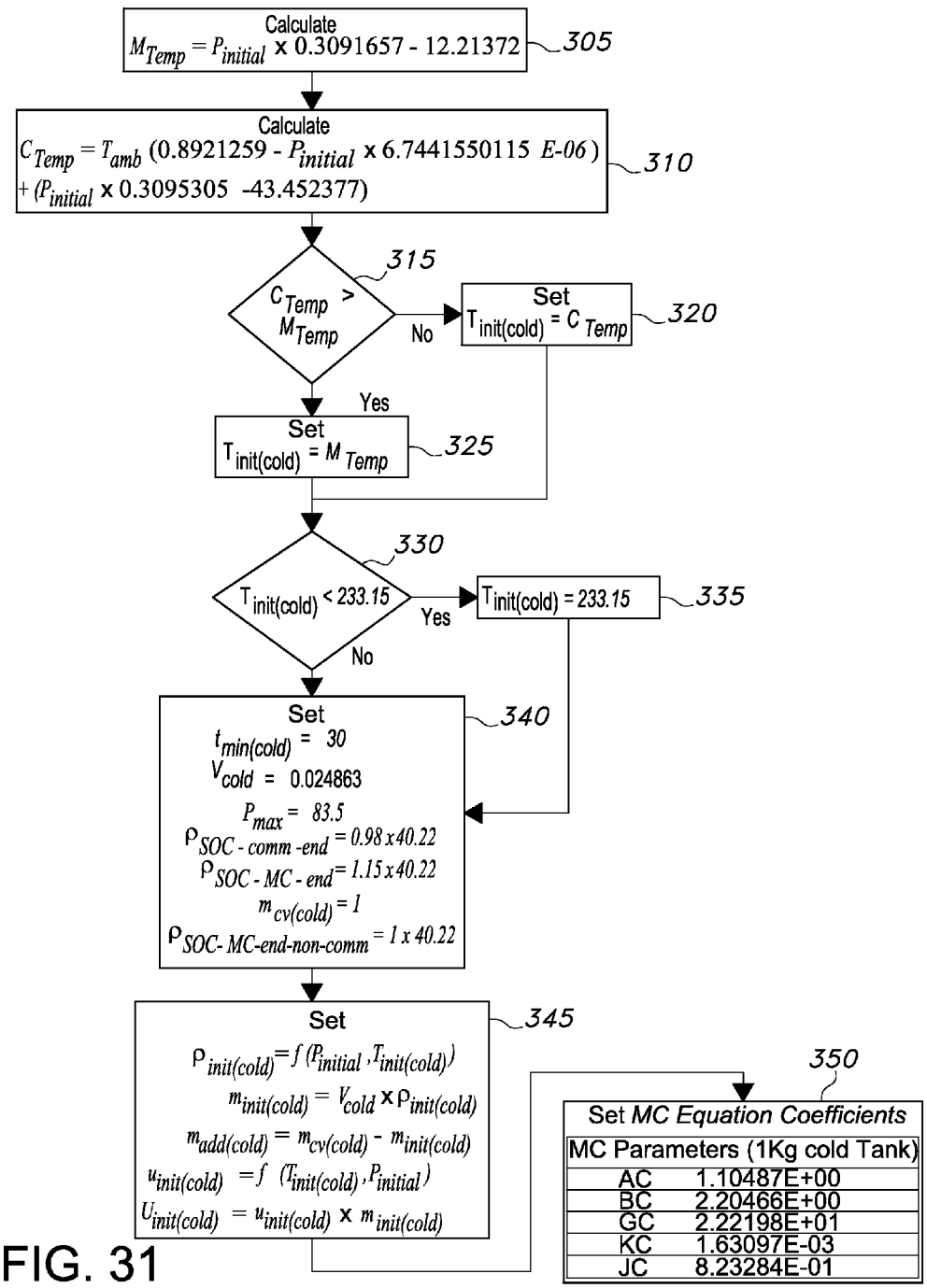
FIG. 31 is a flow chart illustrating the cold tank initial condition calculations of FIG. 30 for the second modified MC method in accordance with an embodiment of the present application.

Turning to FIG. 31, the detailed steps carried out while setting the cold tank initial conditions of step 220 are shown. The cold tank initial conditions are set by first calculating an $M_{Temp}$ in step 305 using $M_{Temp} = P_{initial} \times 0.3091657 - 12.21372$, where $M_{Temp}$ is a temporary variable used for the calculation of $T_{int(cold)}$. $T_{int(cold)}$ is the initial assumed temperature of the gas in tank 124 before the fill commences. Next, in step 310, $C_{Temp}$, a temporary variable used for the calculation of $T_{int(cold)}$ is calculated using the equation $C_{Temp} = T_{amb}(0.8921259 - P_{initial} \times 6.7441550115E-06) + (P_{initial} \times 0.3095305 - 43.452377)$. Following step 310, the $C_{Temp}$ and $M_{Temp}$ values are compared in step 315. The method progresses to step 325 when $C_{Temp}$ is greater than $M_{Temp}$. Otherwise, the method progresses to step 320 when $C_{Temp}$ is not greater than $M_{Temp}$.

In step 320, $T_{int(cold)}$ is set equal to $C_{Temp}$. Further, $T_{int(cold)}$ is set equal to $M_{Temp}$ in step 325. The method progresses to step 330 following either of steps 320 or 325. In step 330, $T_{int(cold)}$ is examined to see if it is less than 233.15K. If $T_{int(cold)}$ is less than 233.15K, the method progresses to step 335, where $T_{int(cold)}$ is set equal to 233.15K and then progresses to step 340. If $T_{int(cold)}$ is not less than 233.15K in step 330, the method proceeds to step 340.

In step 340, values used in the ending pressure control steps are set. More specifically, a minimum fill time is set ($t_{min(cold)}$), the volume of tank 124 is set ($V_{cold}$), the maximum pressure in tank 124 ($P_{max}$) is set, the MC density limit ($\rho_{SOC-MC-end}$) is set, the MC non-communication density limit ($\rho_{SOC-MC-end-non-comm}$) is set, the communication density limit ($\rho_{SOC-comm-end}$) is set, and the final mass of the tank 124 at 100% SOC ($m_{cv(cold)}$) is set based on a 1 kg tank at reference conditions. $V_{cold}$ is the volume of gas in a full 1 kg tank at reference conditions. $P_{max}$ is determined using the enthalpy map equation [20] such that hydrogen station 100 provides a full fill to tank 124 most of the time while achieving a fast fill of tank 124 all of the time. The $\rho_{SOC-MC-end}$, $\rho_{SOC-MC-end-non-comm}$, and $\rho_{SOC-comm-end}$ limits are set using the enthalpy map equation [20]. The $\rho_{SOC-comm-end}$ value is typically set to end the fill when the tank reaches 98% SOC. The $\rho_{SOC-comm-end}$ value may be set by the manufacturer of hydrogen station 100 by setting the communication density limit density value at 98% SOC to account for sensor errors during the fill. The $\rho_{SOC-MC-end}$ value is typically set to end the fill when the tank reaches 115% SOC. The $\rho_{SOC-MC-end}$ value may be set by the manufacturer of hydrogen station 100 by setting the MC density limit value at 115% SOC, based on a maximum tank pressure of 97.3 MPa and maximum tank temperature of 50° C. The $\rho_{SOC-MC-end-non-comm}$ value is typically set to end the fill when the tank reaches 100% SOC. The $\rho_{SOC-MC-end-non-comm}$ value may be set by the manufacturer of hydrogen station 100.

100% SOC is defined as the density of the gas in the tank at normal working pressure (NWP) at 15° C. The values set in step 340 are exemplary and not intended to be limiting. Accordingly, a person having ordinary skill in the art can choose to use different values than those listed in step 340 in order to prevent the gas in tank 124 from exceeding 85° C. in accordance with SAE J2601.

Further, in step 345, additional values used in the ending pressure control steps are set. More specifically, the initial calculated density of the gas in the cold tank 124 before fill commences ($\rho_{init(cold)}$) is set according to the equation $\rho_{init(cold)} = f(P_{initial}, T_{int(cold)})$. Further, the initial mass present in the cold tank 124 before the fill commences ($m_{init(cold)}$) is set according to the equation $m_{init(cold)} = V_{cold} \times \rho_{init(cold)}$. Additionally, the mass to be added to the cold tank 124 during the fill to achieve 100% SOC ($m_{add(cold)}$) is set according to the equation $m_{add(cold)} \times m_{cv(cold)} - m_{init(cold)}$. Also, the internal specific energy of the gas in the cold tank 124 before the fill commences ($u_{init(cold)}$) is set according to the equation $u_{init(cold)} = f(T_{init(cold)}, P_{initial})$. Lastly, the internal energy of the gas in the cold tank 124 before the fill commences ($U_{init(cold)}$) is set according to the equation $U_{init(cold)} = u_{init(cold)} \times m_{init(cold)}$. The values set in step 345 are exemplary and not intended to be limiting. Accordingly, a person having ordinary skill in the art can choose to use different values than those listed in step 345 in order to prevent the gas in tank 124 from exceeding 85° C. in accordance with SAE J2601.

Following step 345, the MC equation coefficients are set in step 350 for the MC equation [27] used in the ending pressure control steps 270 and 280. These MC equation coefficients were obtained using simulation results of a 1 kg type 3 tank, but could also be have been obtained using test result data. The MC equation coefficients of step 350 are exemplary and not intended to be limiting. Accordingly, a person having ordinary skill in the art can choose to use different MC equation coefficients than those listed in step 350.

Turning back to FIG. 30, following step 220, the hot tank initial conditions are calculated and set in step 225. The term hot tank is defined in SAE J2601. A hot tank is a boundary tank (type 4 vessel) having a carbon fiber overwrap and a plastic liner material, where the tank temperature is hotter than ambient before the fill commences. The plastic liner in the hot tank reduces the heat dissipation capability of the tank during the fill, when compared to the type 3 cold tank discussed above.

Hot tank initial conditions set in step 225 are the worst case conditions for overheating the gas in tank 124, are used in the RR control steps 230-240, discussed below. The hot tank initial condition calculations are shown in FIGS. 32A-C, which are discussed below.

Figure 32A:
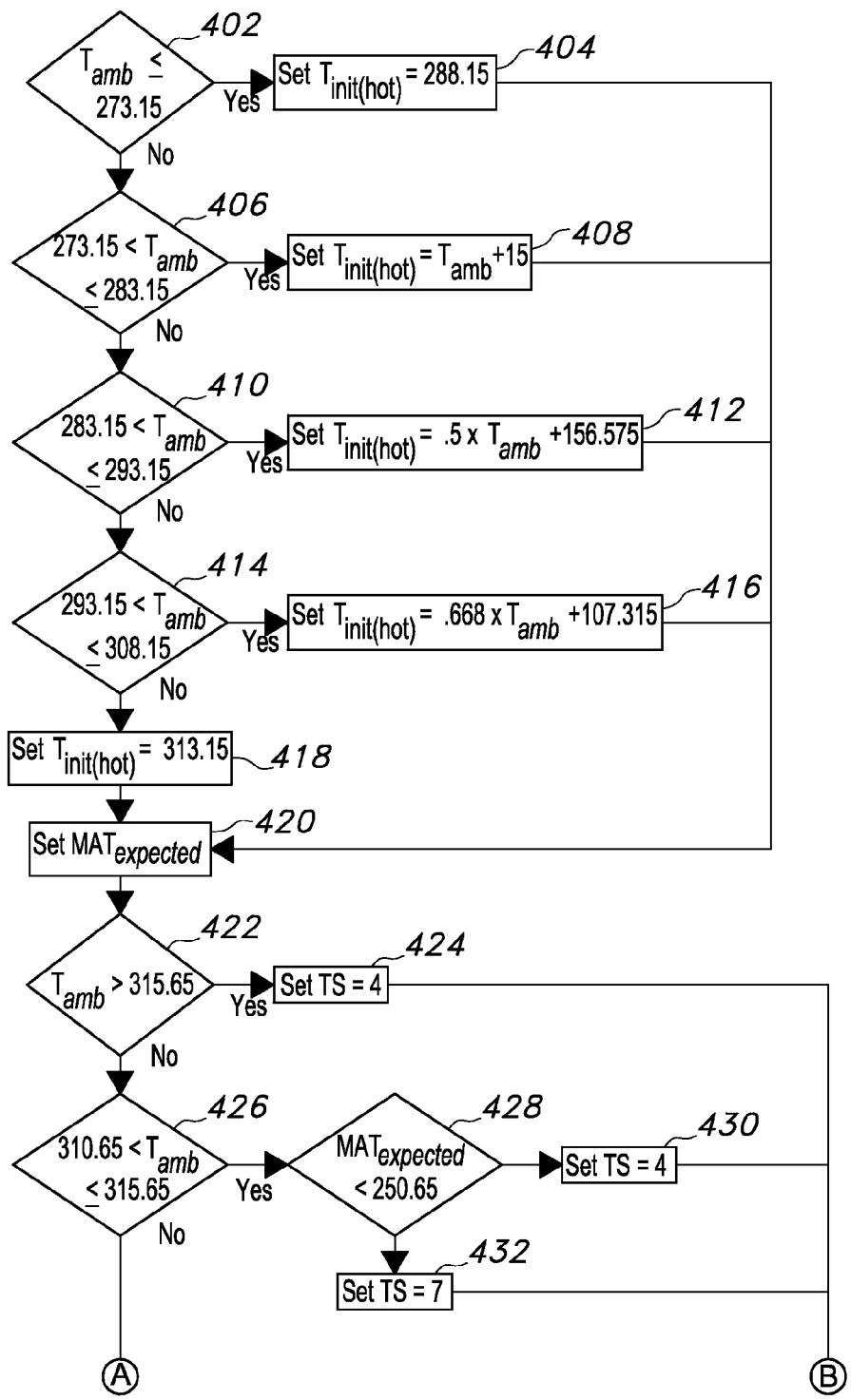
FIGS. 32A-C are a flow chart illustrating the hot tank initial condition calculations of FIG. 30 for the second modified MC method in accordance with an embodiment of the present application.
Figure 32B:
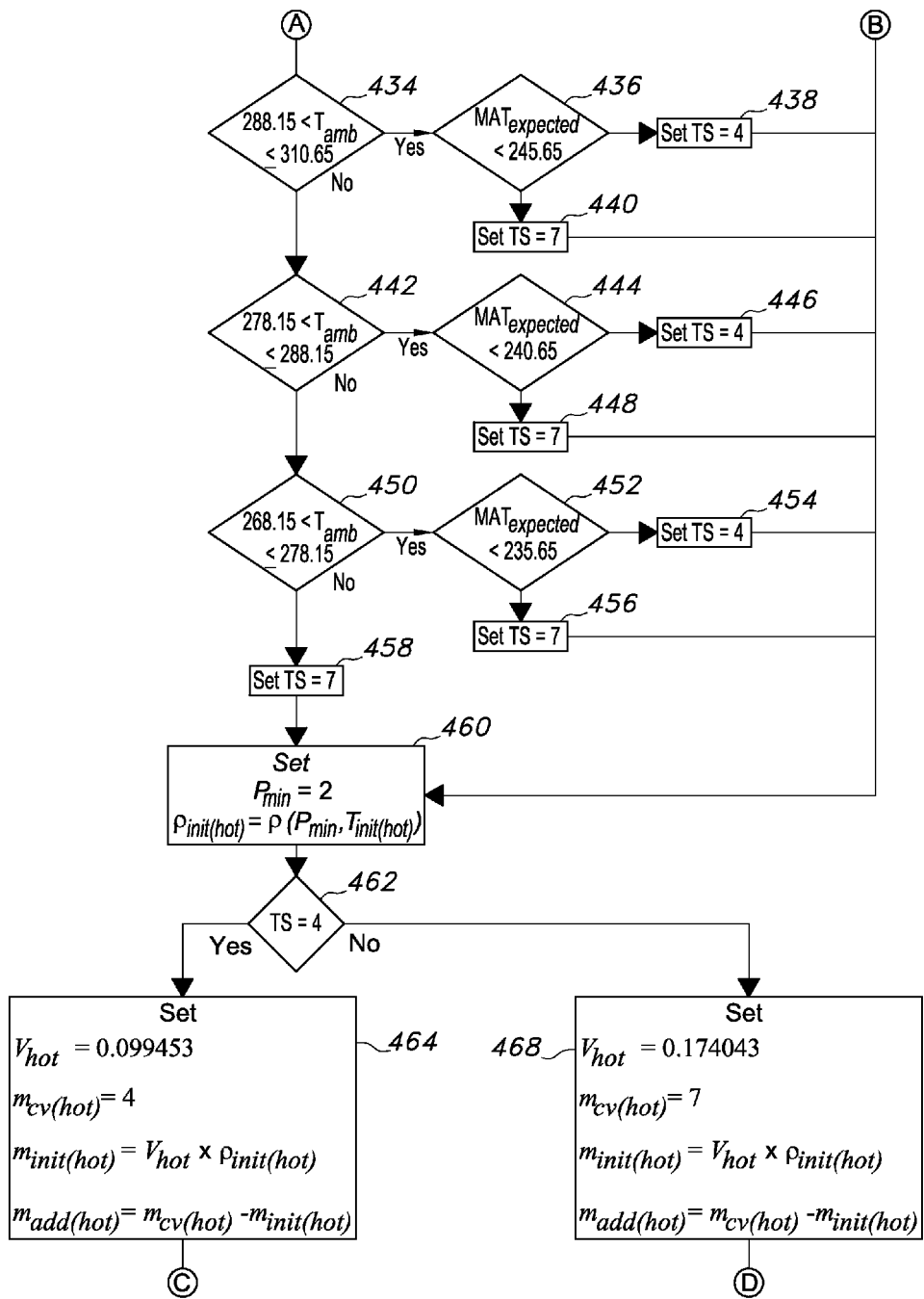
Figure 32C:
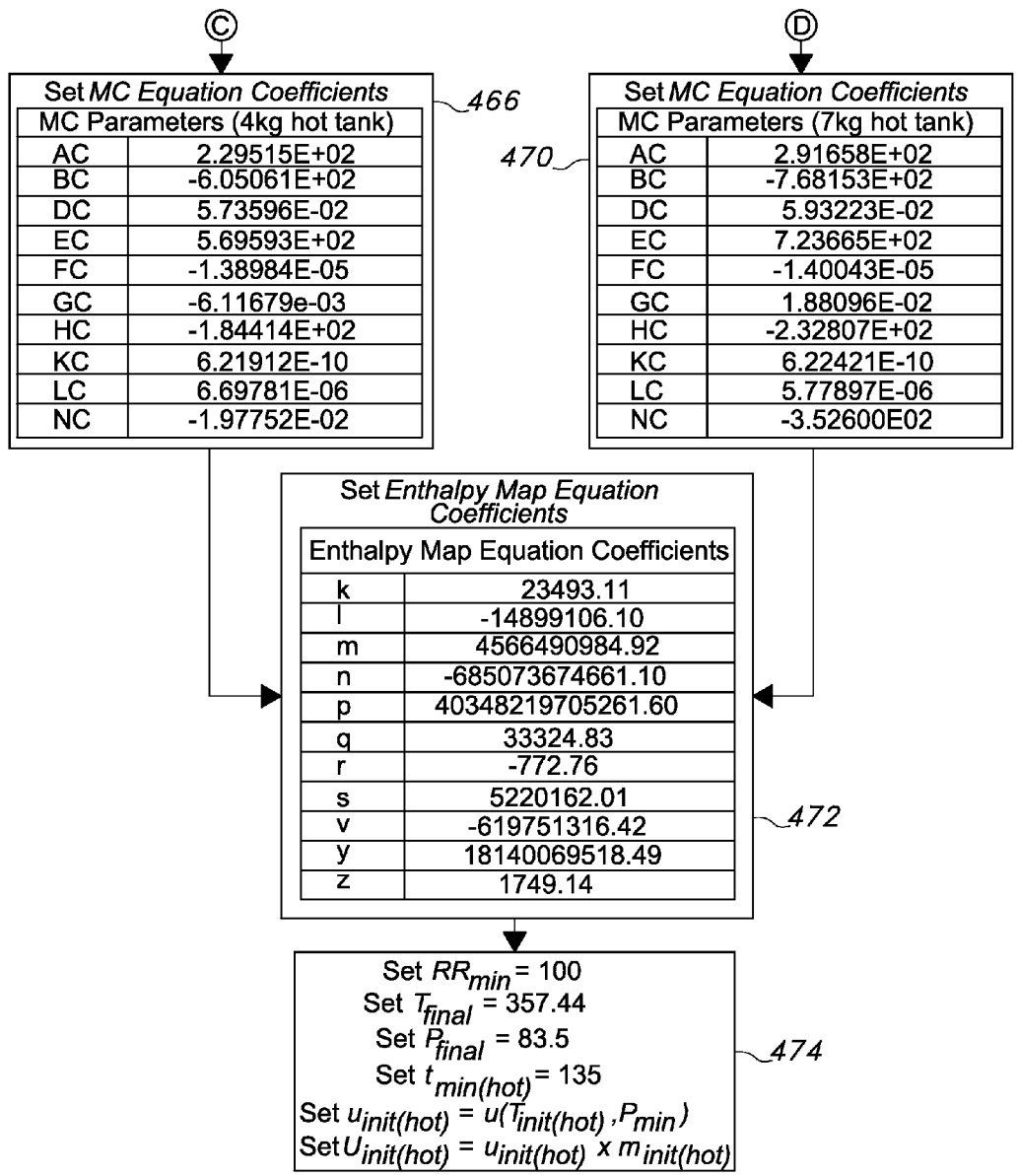

Turning to FIGS. 32A-C, the detailed steps carried out while setting the hot tank initial conditions of step 225 are shown. First, an initial assumed temperature of the gas in tank 124 before the fill commences ($T_{init(hot)}$) is set in steps 402-418 based on $T_{amb}$. More specifically, in step 402, if $T_{amb}$ is less than or equal to 273.15K, $T_{init(hot)}$ is set to 288.15K in step 404. Otherwise, the method progresses from step 402 to step 406. In step 406, if $T_{amb}$ is both greater than 273.15K, and less than or equal to 283.15K, the method moves to step 408, otherwise the method moves to step 410. In step 408 $T_{init(hot)}$ is set according to the equation $T_{init(hot)}=T_{amb}+15K$.

In step 410, if $T_{amb}$ is both greater than 283.15K, and less than or equal to 293.15K, the method moves to step 412, otherwise the method moves to step 414. In step 412, $T_{init(hot)}$ is set according to the equation $T_{init(hot)}=0.5\times T_{amb}+156.575K$. In step 414, if $T_{amp}$ is both greater than 293.15K, and less than or equal to 308.15K, the method moves to step 416, otherwise the method moves to step 418. In step 416, $T_{init(hot)}$ is set according to the equation $T_{init(hot)}=0.668\times T_{amb}+107.315K$. In step 418, $T_{init(hot)}$ is set to 313.15K. The method progresses to step 420 following any of steps 404, 408, 412, 416, and 418.

The expected end of fill mass average pre-cooling temperature ($MAT_{expected}$) is set in step 420. The value of $MAT_{expected}$ is set as close to the actual mass average pre-cooling temperature for the gas in tank 124 as possible. The value of $MAT_{expected}$ may be set by the manufacturer of the hydrogen station 100 at the factory based on the expected behavior and characteristics of the pre-cooling system employed. $MAT_{expected}$ need not be a constant value, but can be a function of conditions.

A tank size (TS) is set in steps 422-458 based on $MAT_{expected}$ and $T_{amb}$. More specifically, in step 422, if $T_{amb}$ is greater than 315.65K, the method progresses to step 424 where TS is set to 4 kg. Otherwise, the method progresses from step 422 to step 426.

In step 426, if $T_{amb}$ is both greater than 310.65K and less than or equal to 315.65K, the method progresses to step 428. Otherwise, the method progresses from step 426 to step 434. Further, the method progresses from step 428 to step 430 when the $MAT_{expected}$ is less than 250.65, otherwise the method progresses from step 428 to step 432. TS is set to 4 kg in step 430, and TS is set to 7 kg in step 432.

In step 434, if $T_{amb}$ is both greater than 288.15K and less than or equal to 310.65K, the method progresses to step 436. Otherwise, the method progresses from step 434 to step 442. Further, the method progresses from step 436 to step 438 when the $MAT_{expected}$ is less than 245.65, otherwise the method progresses from step 436 to step 440. TS is set to 4 kg in step 438, and TS is set to 7 kg in step 440.

In step 442, if $T_{amb}$ is both greater than 278.15K and less than or equal to 288.15K, the method progresses to step 444. Otherwise, the method progresses from step 442 to step 450. Further, the method progresses from step 444 to step 446 when the $MAT_{expected}$ is less than 240.65, otherwise the method progresses from step 444 to step 448. TS is set to 4 kg in step 446, and TS is set to 7 kg in step 448.

In step 450, if $T_{amb}$ is both greater than 268.15K and less than or equal to 278.15K, the method progresses to step 452. Otherwise, the method progresses from step 450 to step 458. Further, the method progresses from step 452 to step 454 when the $MAT_{expected}$ is less than 235.65, otherwise the method progresses from step 452 to step 456. TS is set to 4 kg in step 454, and TS is set to 7 kg in steps 456 and 458. The method progresses to step 460 following any of steps 424, 430, 432, 438, 440, 446, 448, 454, 456, and 458.

In step 460, a value is set for the minimum tank pressure $P_{min}$ and the initial calculated density of the gas in the hot tank 124 before the fill commences ($\rho_{init(hot)}$) as a function of $P_{min}$ and $T_{init(hot)}$ according to the equation $\rho_{init(hot)}=\rho(P_{min}, T_{init(hot)})$. The value for $P_{min}$ is set based on a worst case starting pressure for a fill of tank 124 in hot tank conditions. Following step 460, the values and coefficients used in the MC equation [25] of step 235 are set based on the TS value in steps 462-470. More specifically, if TS equals 4 (tank size of 4 kg) in step 462, the values and coefficients used in the MC equation [25] of step 235 are set in accordance with steps 464 and 466, otherwise, the tank is deemed to have a size of 7 kg (TS=7) values and coefficients used in the MC equation [25] of step 235 are set in accordance with steps 468 and 470. The MC equation values and coefficients of steps 464 and 466 are exemplary and not intended to be limiting. Accordingly, a person having ordinary skill in the art can choose to use different MC equation values and coefficients than those listed in steps 464 and 466.

In step 462, the method progresses to step 464 when TS equals 4, where values used in the MC equation [25] of step 235 are set. The values set in step 464 are the volume of the hot tank 124 ($V_{hot}$), the final hot mass in the hot tank 124 at 100% SOC ($m_{cv(hot)}$), the initial calculated mass in the hot tank 124 before the fill commences ($m_{init(hot)}$), the calculated mass to be added to the hot tank 124 during the fill to achieve 100% SOC ($m_{add(hot)}$)/$V_{hot}$ and $m_{cv(hot)}$ are set based on tank 124 in hot tank conditions. After step 464, coefficients for the MC equation [25] of step 235 are set in accordance with step 466, and then the method progresses to step 472.

In step 462, the method progresses to step 468 when TS does not equal 4, where values used in the MC equation [25] of step 235 are set. The values set in step 468 are the volume of the hot tank 124 ($V_{hot}$), $m_{cv(hot)}$, $m_{init(hot)}$, and $m_{add(hot)}$. $V_{hot}$ and $m_{cv(hot)}$ are set based on tank 124 in hot tank conditions. After step 468, coefficients for the MC equation [25] of step 235 are set in step 470, and then the method progresses to step 472. The MC equation coefficients of steps 466 and 470 were obtained using hot tank simulation result data. The MC equation values and coefficients of steps 466 and 470 are exemplary and not intended to be limiting. Accordingly, a person having ordinary skill in the art can choose to use different MC equation values and coefficients than those listed in steps 468 and 470.

In step 472, coefficients for the enthalpy map equation [24] of step 235 are set. The enthalpy map equation coefficients were obtained using hot tank simulation result data. Once the coefficients for the enthalpy map equation [24] are set in step 472, the method progresses to step 474 where the minimum pressure ramp rate for all time steps $RR_{min}$, the target temperature for end of fill $T_{final}$, the ending fill pressure $P_{final}$, the minimum fill time $t_{min(hot)}$, the initial specific internal energy of the gas in the tank before fill commencement $u_{init(hot)}$, and the initial internal energy of the gas in the tank before fill commences $U_{init(hot)}$ are also set. The $T_{final}$ value is set based on a max temperature of the gas in tank 124 and to account for error in the MC equation [25]. The $P_{final}$ value is determined based on the enthalpy map equation [20] such that hydrogen station 100 provides a full fill to tank 124 most of the time while achieving a fast fill of tank 124 all of the time. The $T_{final}$ value is determined to prevent the hydrogen station from exceeding a maximum temperature in the hot tank.

The enthalpy map equation coefficients of step 472 are exemplary and not intended to be limiting. Accordingly, a person having ordinary skill in the art can choose to use different enthalpy map equation coefficients than those listed in step 472. Further, the values set in step 474 are exemplary and not intended to be limiting. A person having ordinary skill in the art can choose to use different values than those shown in step 274 in order to prevent the gas in tank 124 from exceeding 85° C. during the fill in accordance with SAE J2601.

Turning back to FIG. 30, following step 225, step 230 of the RR control and step 260 of the pressure ending control are performed. In step 230, the RR control time step calculations are performed In general, the time step calculations commence with calculating α, which is the adjustment factor used in the estimated end of fill mass average enthalpy equation [20] to account for variability in RR. Generally, α is calculated based on a comparison of the ramp rate RR during a current calculation and the RR from an immediately preceding calculation. Then, the mass average pre-cooling temperature is calculated. The RR control time step calculations are shown in further detail in FIG. 33, which is discussed below.

Figure 33:
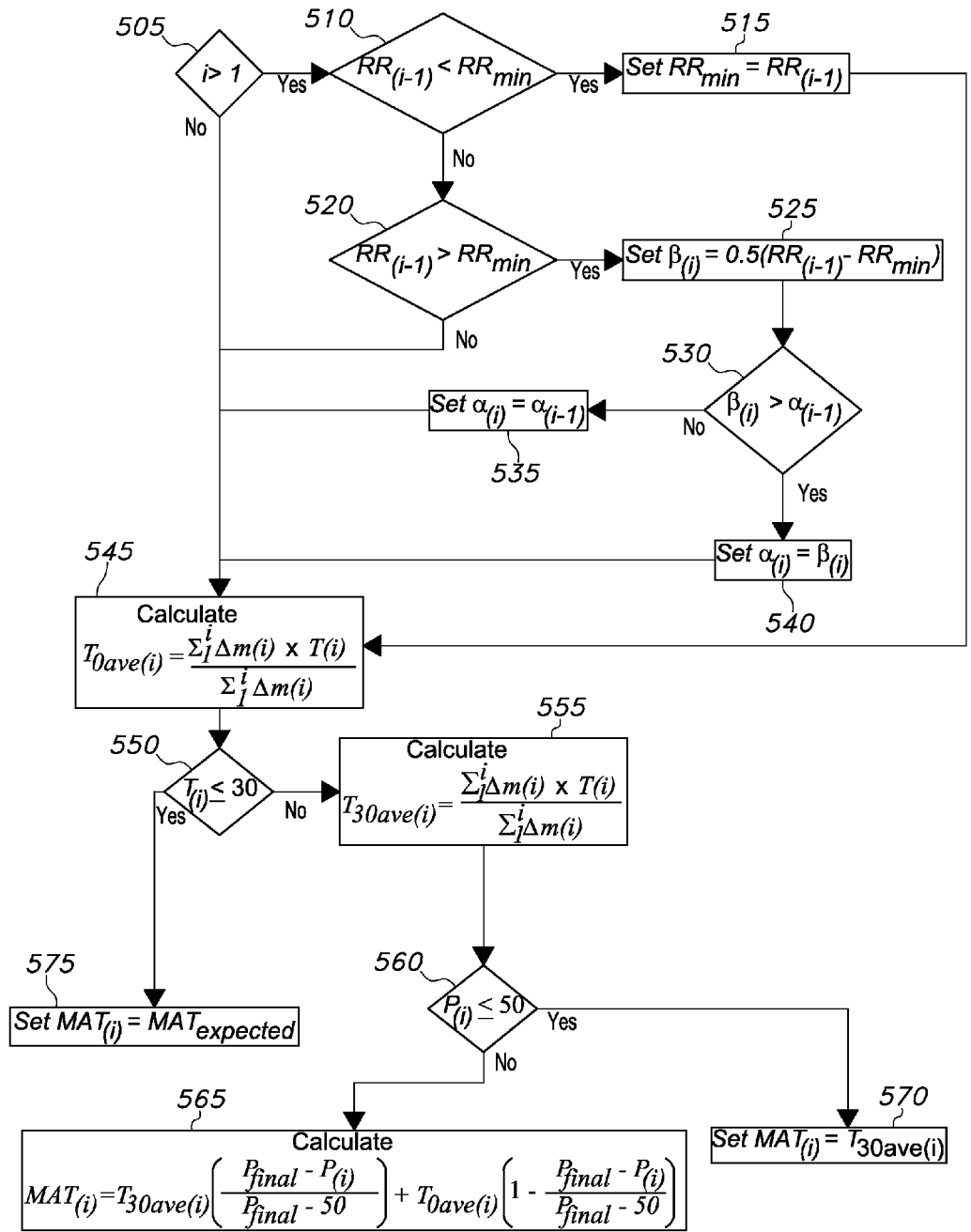
FIG. 33 is a flow chart illustrating the time step calculations of FIG. 30 for the second modified MC method in accordance with an embodiment of the present application.

Turning to FIG. 33, the detailed steps performed in the time step calculations of step 230 are shown. In steps 505-540, a value for $RR_{min}$ is set and a value for α is set. α is the adjustment factor used in the mass average enthalpy equation [24] of step 235 to account for variability in the RR.

In step 505, if "i" is greater than 1, the method proceeds to step 510, otherwise the method proceeds to step 545. In step 510, the method proceeds to step 515 if the calculated RR value in the previous time step ($RR_{(i-1)}$) is less than $RR_{min}$, otherwise the method proceeds to step 520. In step 515, $RR_{min}$ is set equal to $RR_{(i-1)}$. In step 520, the method proceeds to step 525 if $RR_{(i-1)}$ is greater than $RR_{min}$, otherwise the method proceeds to step 545. In step 525, a value for $β_{(i)}$ is set according to the equation $β_{(i)}=0.5(RR_{(i-1)}-RR_{min})$. β is a temporary variable used for the calculation of α. After step 525, the method progresses to step 530, where the method progresses to step 540 when $β_{(i)} > α_{(i-1)}$, otherwise the method progresses to step 535. It is noted that the value of $α_{(i-1)}$ is the value of α from the last time step.

In step 535 $α_{(i)}$ is set equal to $α_{(i-1)}$ and the method progresses to step 545 following step 535. In step 540, $α_{(i)}$ is set equal to $β_{(i)}$ and the method progresses to step 545 following step 540.

A value for mass average pre-cooling temperature (MAT) is determined in steps 545-575. The equation used to determine the value for mass average pre-cooling temperature is based on P, the pressure of the gas measured by pressure sensor 104 at the nozzle 120 of the dispenser 114, and t, the elapsed time since the beginning of the fill. In step 545, a first average mass average pre-cooling temperature calculation ($T_{0ave}$) is performed based on an average of the mass average pre-cooling temperature calculations since the beginning of the fill (since t=0) until the current time "t" using the equation [21]:

$$T_{0ave(i)} = \frac{\sum_{1}^{i} \Delta m_{(i)} \times T_{(i)}}{\sum_{1}^{i} \Delta m_{(i)}} \quad [21]$$

where $T_{0ave(i)}$ is the $T_{0ave}$ for the current time step.

After step 545, the method progresses to step 550. In step 550, the method progresses to step 575 if $t_{(i)}$ is less than or equal to thirty, in other words not more than 30 seconds have passed since the beginning of the fill, otherwise the method proceeds to step 555. In step 575, $MAT_{(i)}$ is set equal to $MAT_{expected}$, where $MAT_{(i)}$ is the mass average pre-cooling temperature for the current time step. In step 555, a second average mass average pre-cooling temperature calculation ($T_{30ave}$) is performed based on an average of the mass average pre-cooling temperature calculations starting since 30 seconds from the beginning of the fill (since t=30) until the current time "t" using the equation [22]:

$$T_{30ave(i)} = \frac{\sum_{1}^{i} \Delta m_{(i)} \times T_{(i)}}{\sum_{1}^{i} \Delta m_{(i)}} \quad [22]$$

where $T_{30ave(i)}$ is the $T_{30ave}$ for the current time step.

After step 555, the method progresses to step 560. In step 560, the method progresses to step 570 if the $P_{(i)}$ is less than or equal to 50, in other words the pressure of the gas at the nozzle 120 of the dispenser 114 is not greater than 50 MPa, otherwise, the method proceeds to step 565. The pressure value of 50 MPa in step 560 is exemplary and was empirically selected based on simulation data. Therefore, a predetermined pressure value other than 50 MPa may be used in other embodiments of the method in step 560. In step 570, $MAT_{(i)}$ is set equal to $MAT_{30ave(i)}$. In step 565, the mass average pre-cooling temperature is calculated using a weighted average of the $T_{0ave}$ and the $T_{30ave}$. The weighting placed on the $T_{0ave}$ and the $T_{30ave}$ changes with rising pressure in tank 124, such that at a highest allowed dispenser pressure, the weighting is 100% on the $T_{0ave}$ measured from the beginning of the fill. The mass average pre-cooling temperature is calculated with the weighted average of the $T_{0ave}$ and the $T_{30ave}$ using the equation [23]:

$$MAT_{(i)} = T_{30ave(i)} \left[ \frac{P_{final} - P_{(i)}}{P_{final} - 50} \right] + T_{0ave(i)} \left[ 1 - \frac{P_{final} - P_{(i)}}{P_{final} - 50} \right]. \quad [23]$$

Turning back to FIG. 30, following step 230, iterative calculations are performed in step 235, in which an estimation for total fill time for the current time step ($t_{fin(j)}$), an estimated mass average enthalpy at the end of the fill ($h_{ave\_EM(j)}$) in accordance with equation [20], and the MC for the hot tank ($MC_{hot(j)}$) are iteratively calculated. The iterative calculations stop once $MC_{hot(j)}$ converges with $MC_{req(j)}$. $MC_{req(j)}$ is the MC required to achieve the target final gas temperature $T_{final}$ based on initial conditions and the enthalpy put in the tank 124. Once $MC_{hot(j)}$ converges with $MC_{req(j)}$, generally the total fill time for the current time step ($t_{final(i)}$) is set equal to $t_{fin(j)}$. The iterative calculations are shown in further detail in FIGS. 34A-B, which are discussed below.

Figure 34A:
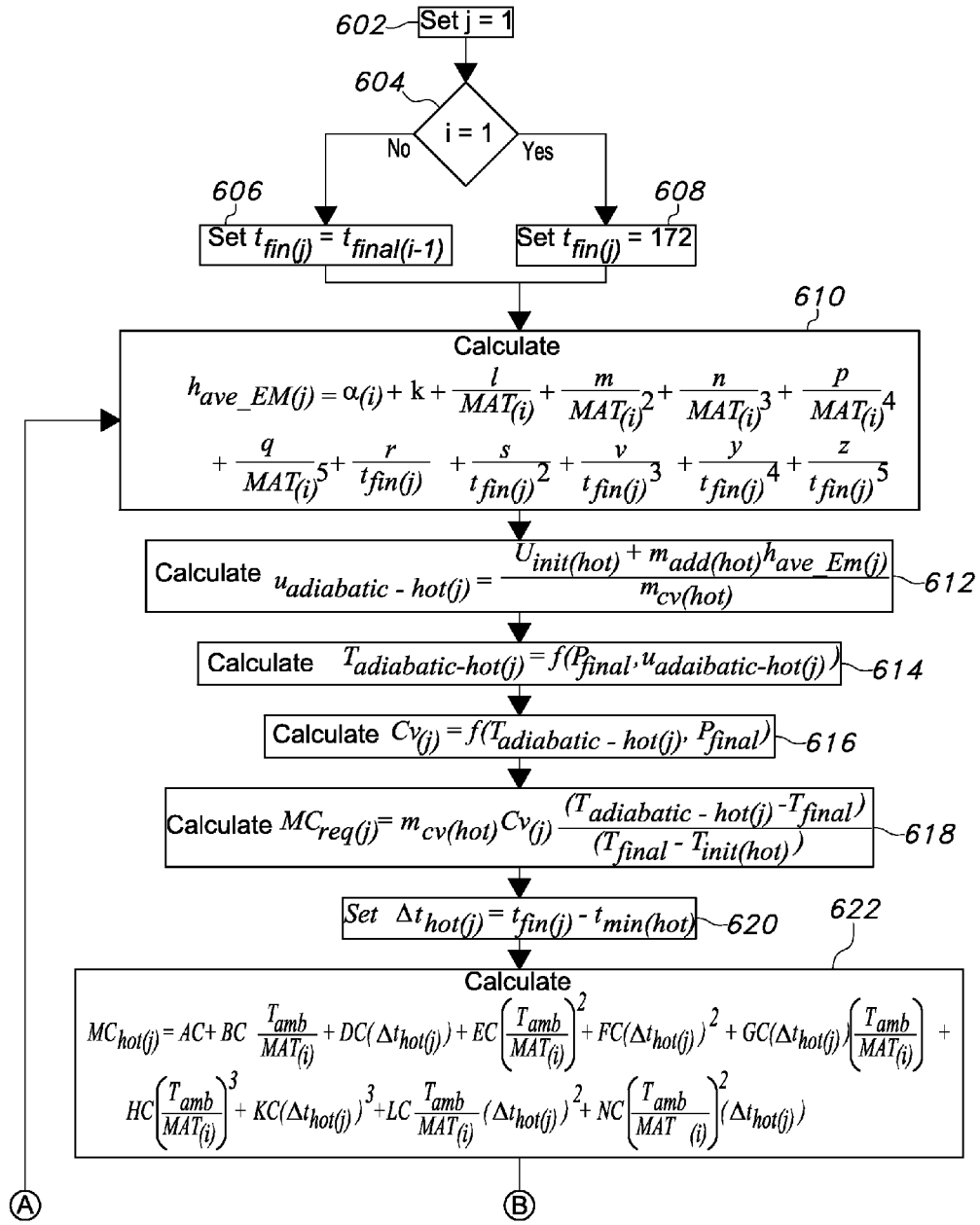
FIGS. 34A-B are a flowchart illustrating the iterative calculation of FIG. 30 for the second modified MC method in accordance with an embodiment of the present application.
Figures 34B, 35:
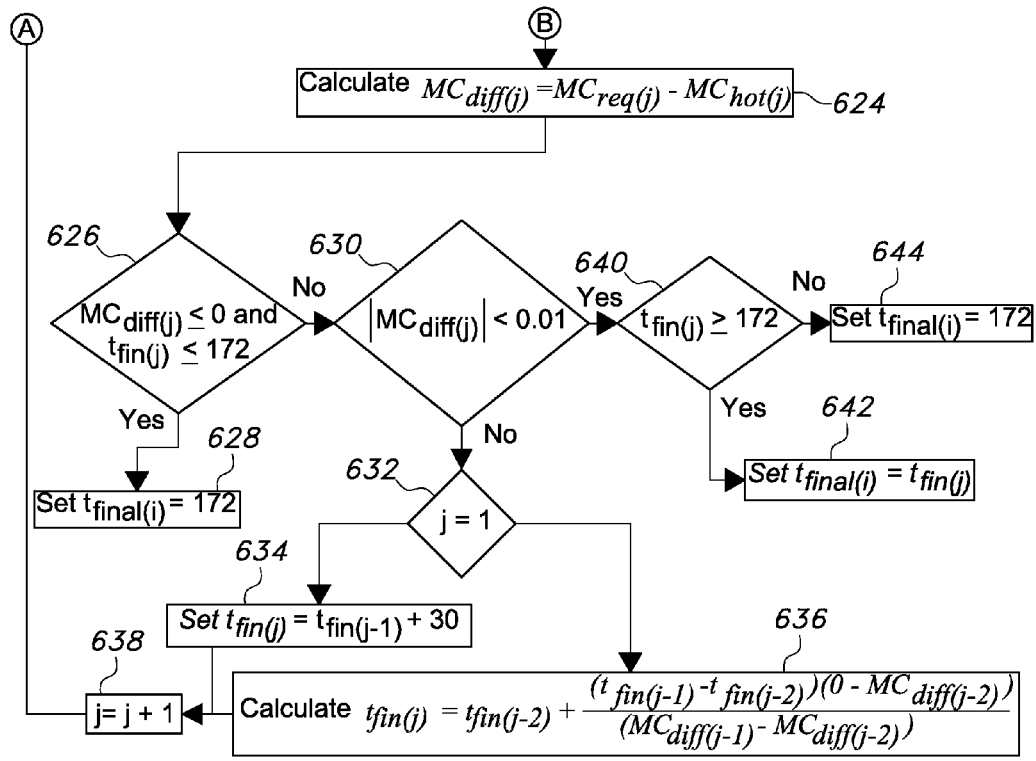
FIG. 35 illustrates the pressure ramp rate calculation of FIG. 30 for the second modified MC method in accordance with an embodiment of the present application.

Turning to FIGS. 34A-B, the detailed steps carried out while performing the iterative calculations in step 235 are shown. First, an iteration counter variable "j" is set to 1 in step 602. In steps 604-608, $t_{fin(j)}$ is set. More specifically, if "i" is equal to 1 in step 604, then the method progresses to step 608. However, if "i" is not equal to 1 in step 604, the method progresses to step 606. In step 608, $t_{fin(j)}$ is set to 172 seconds. In step 606, $t_{fin(j)}$ is set to $t_{final(i-1)}$, where $t_{final(i-1)}$ is $t_{final(i)}$ from the previous time step. The method progresses to step 610 following steps 606 or 608. In step 610 the estimated end of fill mass average enthalpy ($h_{ave\_EM(j)}$) is calculated using the following Enthalpy Map equation [24]:

$$h_{aveEM(j)} = \alpha_{(i)} + k + \frac{l}{MAT_{(i)}} + \frac{m}{MAT_{(i)}^2} + \frac{n}{MAT_{(i)}^3} + \frac{p}{MAT_{(i)}^4} + \frac{q}{MAT_{(i)}^5} + \frac{r}{t_{fin(j)}} + \frac{s}{t_{fin(j)}^2} + \frac{v}{t_{fin(j)}^3} + \frac{y}{t_{fin(j)}^4} + \frac{z}{t_{fin(j)}^5} \quad [24]$$

where k, l, m, n, p, q, r, s, v, y, z are constants from step 472, which were obtained by fitting the enthalpy map equation [24] to hot tank simulation result data.

It is noted that $t_{final}$ of equation [20] has been further specified as $t_{fin(j)}$ in equation [24].

After step 610, the specific adiabatic internal energy of the gas in the hot tank 124 ($u_{adiabatic-hot(j)}$) is calculated in step 612 using the equation $$u_{adiabatic-hot(i)} = \frac{U_{init(hot)} + m_{add(hot)} h_{ave\_EM(j)}}{m_{cv(hot)}}.$$

After step 612, the adiabatic temperature of the gas in the hot tank ($T_{adiabatic-hot(j)}$) is calculated in step 614 using the equation $T_{adiabatic-hot(j)} = f(P_{final}, u_{adiabatic-hot(j)})$. After step 614, the specific heat capacity of hydrogen at constant volume ($Cv_{(j)}$) is calculated in step 616 using the equation $Cv_{(j)} = f(T_{adiabatic-hot(j)}, P_{final})$. After step 616, the MC required to achieve the target final gas temperature $T_{final}$ based on initial conditions and the enthalpy put in the tank ($MC_{req(j)}$) is calculated in step 618 using the equation $$MC_{req(j)} = m_{cv(hot)} Cv_{(j)} \frac{(T_{adiabatic(j)} - T_{Final})}{(T_{final} - T_{init(hot)})}.$$

After step 618, the final fill time beyond a minimum fill time ($\Delta t_{hot(j)}$) is set in step 620 based on the estimated total time required to fill from 2 MPa to $P_{final}$ ($t_{fin(j)}$) and the minimum fill time $t_{min(hot)}$ using the following equation $\Delta t_{hot(j)} = t_{fin(j)} - t_{min(hot)}$.

Following step 620, the MC calculated for the hot tank ($MC_{hot(j)}$) is calculated in step 622 using equation [25]:

$$MC_{hot(j)} = AC + BC\frac{T_{amb}}{MAT_{(i)}} + DC(\Delta t_{hot(j)}) + EC\left(\frac{T_{amb}}{MAT_{(i)}}\right)^2 + FC(\Delta t_{hot(j)})^2 + GC(\Delta t_{hot(j)})\left(\frac{T_{amb}}{MAT_{(i)}}\right) + HC\left(\frac{T_{amb}}{MAT_{(i)}}\right)^3 + KC(\Delta t_{hot(j)})^3 + LC\frac{T_{amb}}{MAT_{(i)}}(\Delta t_{hot(j)})^2 + NC\left(\frac{T_{amb}}{MAT_{(i)}}\right)^2(\Delta t_{hot(j)}) \quad [25]$$

where

AC, BC, DC, EC, FC, GC, HC, KC, LC, NC are constants from steps 466 or 470, which were obtained by fitting the MC equation [25] to hot tank simulation result data.

It is noted that the general term $\Delta t$ of equation [19] is further specified as $\Delta t_{hot(j)}$ in equation [25]. Further, it is noted that constant designations AC, BC, DC, EC, FC, GC, HC, KC, LC, and NC in equation [25] are used in place of constant designations a, b, c, d, e, f, g, h, i, and j from equation [19].

After step 622, the difference ($MC_{diff(j)}$) between the required MC ($MC_{req(j)}$) and the actual MC ($MC_{hot(j)}$) is calculated using the equation $MC_{diff(j)} = MC_{req(j)} - MC_{hot(j)}$.

The total time required to fill the tank 124 from 2 MPa to $P_{final}$ ($t_{final(i)}$) is se. based on $MC_{diff(j)}$ and $t_{fin(j)}$, in steps 626-644. More specifically, in step 626, the method proceeds to step 628 when $MC_{diff(j)}$ is less than or equal to zero and $t_{fin(j)}$ is less than or equal to 172 seconds, otherwise the method proceeds to step 630. In step 628 $t_{final(i)}$ is set equal to 172 seconds. In step 630 the method proceeds to step 640 if the absolute value of $MC_{diff(j)}$ is less than 0.01, otherwise the method proceeds to step 632. In step 632, if "j" is equal to 1 the method proceeds to step 634, otherwise the method proceeds to step 636. In step 634 $t_{fin(j)}$ is set equal to the value of $t_{fin(j)}$ from the last iteration ($t_{fin(j-1)}$)+30 seconds. In step 636, $t_{fin(j)}$ is set according to the equation $$t_{fin(j)} = t_{fin(j-2)} + \frac{(t_{fin(j-1)} - t_{fin(j-2)})(0 - MC_{diff(j-2)})}{(MC_{diff(j-1)} - MC_{diff(j-2)})}.$$

The method progresses to step 638 following both steps 634 and 636. In step 638 "j" is incremented according to the equation j=j+1 and the method proceeds to step 610.

In step 640, the method proceeds to step 642 if $t_{fin(j)}$ is greater than or equal to 172 seconds, otherwise the method proceeds to step 644. In step 642, $t_{final(i)}$ is set equal to $t_{fin(j)}$. In step 644, $t_{final(i)}$ is set equal to 172 seconds.

Turning back to FIG. 30, after a value for $t_{final(i)}$ is determined in step 235, the value for $t_{final(i)}$ is used to calculate a pressure ramp rate RR for the current time step ($RR_{(i)}$) in step 240. The $RR_{(i)}$ is set based on the ending fill pressure $t_{final}$, the measured pressure of the gas at the dispenser outlet $P_{(i)}$, the elapsed time since the fill commenced $t_{(i)}$, a predetermined minimum tank pressure value associated with the minimum mass average enthalpy $P_{min}$, and the value of $t_{final(i)}$. The $RR_{(i)}$ calculation is shown in further detail in FIG. 35, in which in which the pressure ramp rate RR is calculated in step 705 using the following RR equation [26]:

$$RR_{(i)} = \frac{P_{final} - P_{(i)}}{t_{final(i)}\left(\frac{P_{final} - P_{initial}}{P_{final} - P_{min}}\right) - t_{(i)}} \quad [26]$$

Turning back to FIG. 30, after the $RR_{(i)}$ is calculated in step 240, the fueling speed controller determines and sets the fueling speed of hydrogen station 100 during step 245 based on the $RR_{(i)}$. The fueling speed controller 128 adjusts the speed of gas delivered to tank 124 using flow regulator 108.

Following step 245, "i" is incremented by 1 in step 250. After step 250, new measurements for $P_{(i)}$ and $T_{(i)}$ are taken, $t_{(i)}$ is set to equal the time that has elapsed since the start of the fill, and $\Delta m_{(i)}$ is calculated. $\Delta m_{(i)}$ is the change in mass added to tank 124 during the previous time step as measured by mass flow meter 106 of hydrogen station 100. $\Delta m_{(i)}$ is calculated by multiplying the flow rate of dispenser 114 during the previous time step by the amount of time that elapsed during the previous time step. Following step 255, the method returns to steps 230 and 260.

In step 260, $P_{(i)}$ is compared to $P_{max}$, where $P_{max}$ is a predetermined maximum gas pressure permitted within tank 245. If $P_{(i)}$ is greater than or equal to $P_{max}$ in step 260 the fill of tank 124 is stopped. Otherwise, the method proceeds to step 265, which checks to see whether communication has been established between communication receiver 107 of hydrogen station 100 and a tank temperature sensor 125 located within tank 124. The method proceeds to step 270 when communication is present and proceeds to step 280 when communication is not present.

MC density calculations are carried out within step 280 using the cold tank initial conditions calculated in step 220. After the MC density is calculated, it is compared to a predetermined MC non-communication density limit in step 285. The method proceeds to step 290 where the fill is stopped when the calculated MC density exceeds the MC non-communication density limit in step 285. Otherwise, the method proceeds to step 295, after step 285. In step 295, the fill is continued for the remainder of the current time step until new $P_{(i)}$, $T_{(i)}$, $\Delta m_{(i)}$, and $t_{(i)}$ values are calculated for the next time step in step 255, at which time the pressure ending control steps return to step 260. This allows the RR control steps and pressure ending control steps to use the same time step increments "i". The details of pressure ending control steps 280-295, which are carried out when communication has not been established between tank temperature sensor 125 and hydrogen station 100, are shown in further detail in FIG. 36.

Figure 36:
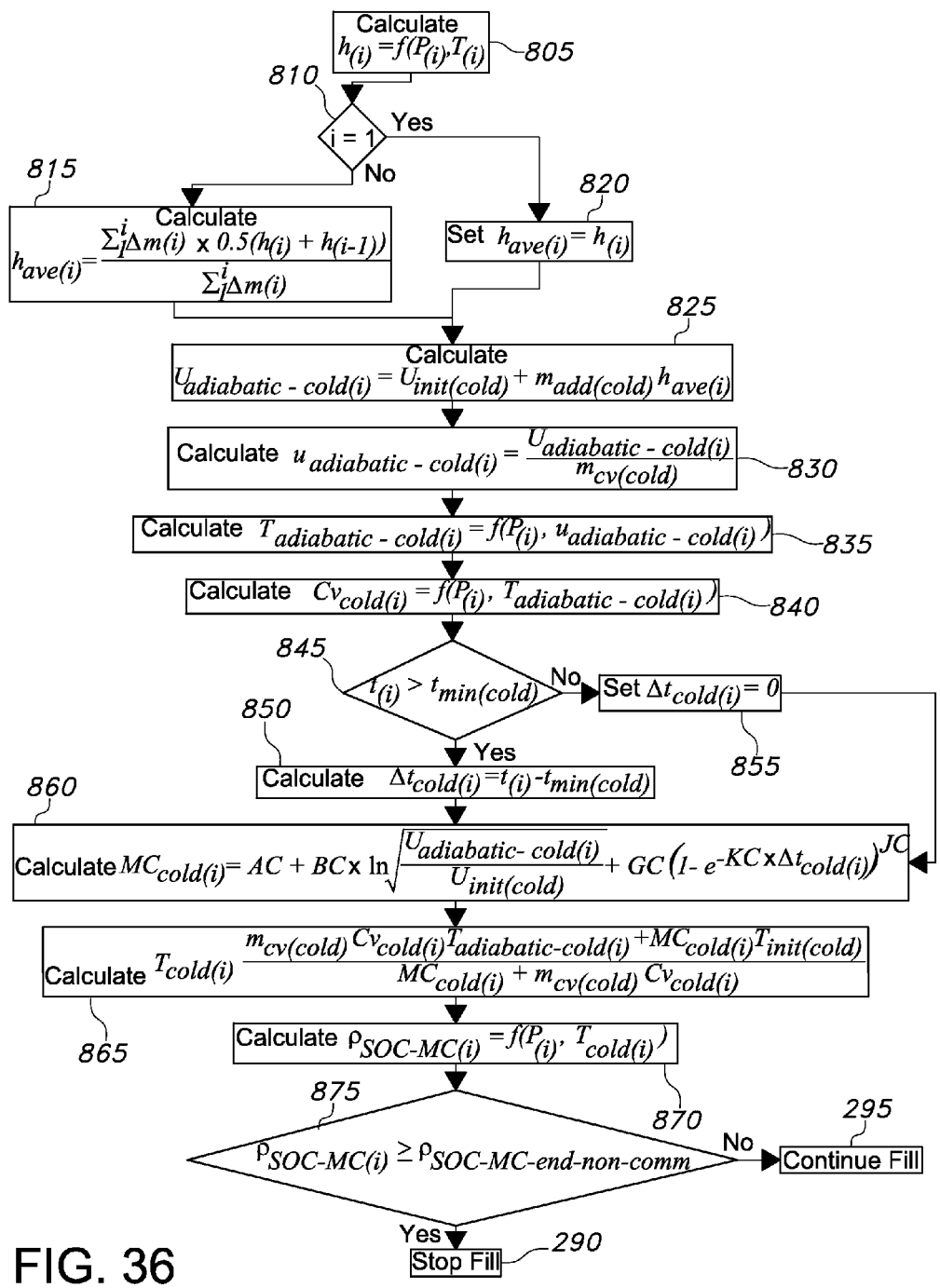
FIG. 36 is a flowchart illustrating the pressure ending control of FIG. 30 when communication is not present between a tank temperature sensor and gas dispenser for the second modified MC method in accordance with an embodiment of the present application.

Turning to FIG. 36, the details are shown for the pressure ending control steps 280-295 that are used when communication between the tank temperature sensor 125 and hydrogen station 100 is not present. The pressure ending control steps of FIG. 36 determine if the filling of tank 124 with gas should end based on the MC density of the gas in tank 124 ($\rho_{SOC-MC(i)}$). First, the mass average enthalpy of the gas in tank 124 is calculated in steps 805-820. In step 805, the enthalpy of the gas ($h_{(i)}$) in tank 124 is calculated as a function of $P_{(i)}$ and $T_{(i)}$, using the equation $h_{(i)} = f(P_{(i)}, T_{(i)})$ and then the method proceeds to step 810. In step 810, the method proceeds to step 820 if "i" is equal to 1, otherwise the method proceeds to step 815. In step 820, the mass average enthalpy ($h_{ave(i)}$) is set equal to $h_{(i)}$. In step 815, $h_{ave(i)}$ is calculated using the equation $$h_{ave(i)} = \frac{\sum_{1}^{i} \Delta m_{(i)} \times 0.5 * (h_{(i)} + h_{(i-1)})}{\sum_{1}^{i} \Delta m_{(i)}}.$$

Following steps 815 and 820, values used for the MC equation [27] of step 860 and the equation [28] for the temperature of the gas in the cold tank 124 ($T_{cold(i)}$) of step 865 are calculated in steps 825-850. First the method proceeds to step 825, where the adiabatic internal energy of the gas in the cold tank 124 is calculated using the equation $U_{adiabatic-cold(i)} = U_{init(cold)} + m_{add(cold)} h_{ave(i)}$. Following step 825, the method proceeds to step 830 where the specific adiabatic internal energy of the gas in the cold tank 124 ($u_{adiabatic-cold(i)}$) is calculated using the equation $$u_{adiabatic-cold(i)} = \frac{U_{adiabatic-cold(i)}}{m_{cv(cold)}}.$$

The method proceeds to step 835 following step 830, where the adiabatic temperature of the gas in the cold tank 124 ($T_{adiabatic-cold(i)}$) is calculated as a function of $P_{(i)}$ and $u_{adiabatic-cold(i)}$ using the equation $T_{adiabatic-cold(i)} = f(P_{(i)}, u_{adiabatic-cold(i)})$.

Following step 835, the specific heat capacity of the gas at constant volume ($Cv_{cold(i)}$) is calculated as a function of $P_{(i)}$ and $T_{adiabatic-cold(i)}$ for the cold tank 124 using the equation $Cv_{cold(i)} = f(P_{(i)}, T_{adiabatic-cold(i)})$. Following step 840, the method progresses through step 845 to step 850 if $t_{(i)}$ is greater than $t_{min(cold)}$, otherwise, the method progresses to step 855. In step 850, the current fill time beyond $t_{min(cold)}$ ($\Delta t_{cold(i)}$) is set using the equation $\Delta t_{cold(i)} = t_{(i)} - t_{min(cold)}$. In step 855, $\Delta t_{cold(i)}$ is set to 0 seconds. The method progresses to step 860 following step 850 or 855.

The MC density of the gas in tank 124 ($\rho_{SOC-MC(i)}$) is calculated in steps 860-870. First, in step 860, the MC for the cold tank 124 ($MC_{cold(i)}$) is calculated using the following equation [27]:

$$MC_{cold(i)} = AC + BC \times \ln\sqrt{\frac{U_{adiabatic-cold(i)}}{U_{init(cold)}}} + GC(1 - e^{-KC \times \Delta t_{cold(i)}})^{JC} \quad [27]$$

where

AC, BC, GC, KC, JC are constants from step 350, which were obtained by fitting MC equation [27] to simulation results of a 1 kg type 3 tank, but could also have been obtained by fitting MC equation [27] to test result data.

Following step 860, the temperature of the gas in the cold tank 124 ($T_{cold(i)}$) is calculated in step 865 using the equation [28]:

$$T_{cold(i)} = \frac{m_{cv(cold)} Cv_{cold(i)} T_{adiabatic-cold(i)} + MC_{cold(i)} T_{init(cold)}}{MC_{cold(i)} + m_{cv(cold)} Cv_{cold(i)}}. \quad [28]$$

Following step 865, $\rho_{SOC-MC(i)}$ is calculated in step 870 as a function of $P_{(i)}$ and $T_{cold(i)}$ using the equation $\rho_{cold(i)} = f(P_{(i)}, T_{cold(i)})$. Following step 870, the method proceeds to step 875, where the $\rho_{SOC-MC(i)}$ is compared to the MC non-communication density limit ($\rho_{SOC-MC-end-non-comm}$). The method progresses to step 290 when the $\rho_{SOC-MC(i)}$ is greater than or equal to the $\rho_{SOC-MC-end-non-comm}$, otherwise the method progresses to step 295. In step 290 the fill is stopped. In step 295, the fill is continued for the remainder of the current time step until new $P_{(i)}$, $T_{(i)}$, $\Delta m_{(i)}$, and $t_{(i)}$ values are calculated for the next time step in step 255, at which time the pressure ending control steps return to step 260. This allows the RR control steps and pressure ending control steps to use the same time step increments "i".

Turning back to FIG. 30, if communication has been established between communication receiver 107 of dispenser 114 of hydrogen station 100 and a tank temperature sensor 125 located within tank 124 in step 265, MC density calculations and communication density calculations are carried out within step 270 using the cold tank initial conditions calculated in step 220. After the MC density and communication density are calculated, they are compared to a predetermined MC density limit and communication density limit in step 275. The method proceeds to step 290 where the fill is stopped when the calculated MC density or calculated communication density exceeds the corresponding MC density limit or communication density limit in step 275. Otherwise, after step 275, the method proceeds to step 295, where the fill is continued for the remainder of the current time step until new $P_{(i)}$, $T_{(i)}$, $\Delta m_{(i)}$, and $t_{(i)}$ values are calculated for the next time step in step 255, at which time the pressure ending control steps return to step 260. This allows the RR control steps and pressure ending control steps to use the same time step increments "i". The details of pressure ending control steps 270-275, 290, and 295, which are carried out when communication has been established between tank temperature sensor 125 and hydrogen station 100, are shown in further detail in FIG. 37.

Figure 37:
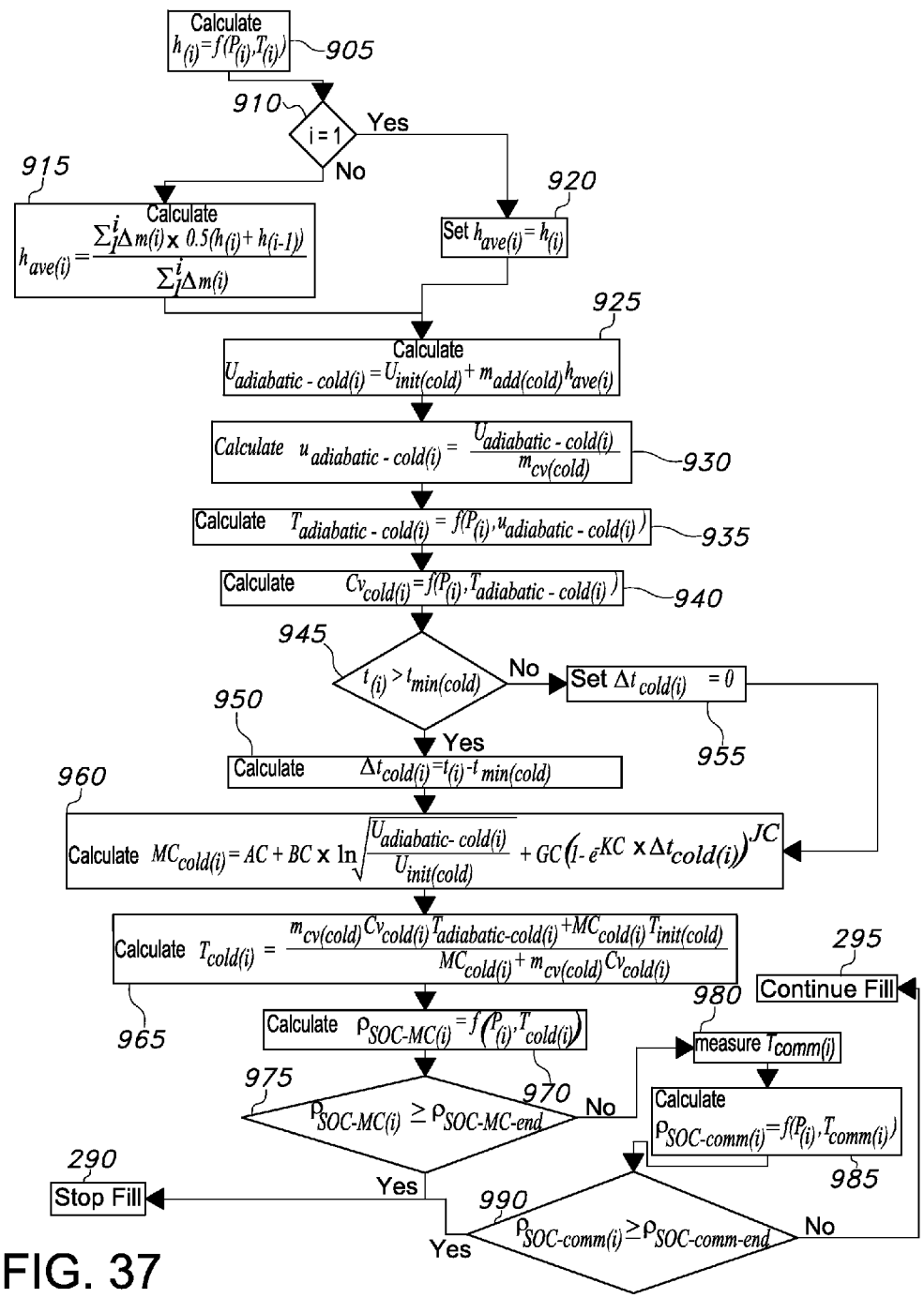
FIG. 37 is a flowchart illustrating the pressure ending control of FIG. 30 when communication is present between a tank temperature sensor and gas dispenser for the second modified MC method in accordance with an embodiment of the present application.

Turning to FIG. 37, the actions that take place within steps 905-970 of FIG. 37 are the same actions that take place within steps 805-870 of FIG. 36. Therefore, steps 905-970 of FIG. 37 will not be discussed for the sake of brevity. FIG. 37 has additional steps beyond those of FIG. 36, namely steps 885-895. In step 975, the $\rho_{SOC\text{-}MC(i)}$ is compared to the MC density limit ($\rho_{SOC\text{-}MC\text{-}end}$) and the method progresses to step 290 when the $\rho_{SOC\text{-}MC(i)}$ is greater than or equal to the $\rho_{SOC\text{-}MC\text{-}end}$, otherwise the method progresses to step 980. In step 290 the fill is stopped.

In step 980 the temperature of the gas in tank 124 is measured using the tank temperature sensor 125 in tank 124 ($T_{comm(i)}$). $T_{comm(i)}$ is received by filling station 100 through communication receiver 107. The input receiver 126 of the controller 112 of the hydrogen station 100 communicates with, and continuously receives measurement values as inputs from the tank temperature sensor 125 ($T_{comm(i)}$) through the communication receiver 107. The input receiver 126 continuously communicates the measurement of tank temperature sensor 125 ($T_{comm(i)}$) to the fueling speed controller 128. In one embodiment, the communications receiver 107 and tank temperature sensor 125 communicate using the IRDA protocol. However, it is contemplated that a different communications protocol could be used in other embodiments.

Once the $T_{comm(i)}$ measurement is obtained in step 980, the method progresses to step 985, where the communication density of the gas in the tank 124 is calculated ($\rho_{SOC\text{-}comm(i)}$) as a function of $P_{(i)}$ and $T_{comm(i)}$ using the equation $\rho_{SOC\text{-}comm(i)} = f(P_{(i)}, T_{comm(i)})$. Following step 985, the method proceeds to step 990, where the $\rho_{SOC\text{-}comm(i)}$ is compared to the communication density limit ($\rho_{SOC\text{-}comm\text{-}end}$). The method progresses to step 290 when $\rho_{SOC\text{-}comm(i)}$ is greater than $\rho_{SOC\text{-}comm\text{-}end}$, otherwise the method progresses to step 295. In step 290 the fill is stopped. In step 295, the fill is continued for the remainder of the current time step until new $P_{(i)}$, $T_{(i)}$, $\Delta m_{(i)}$, and $t_{(i)}$ values are calculated for the next time step in step 255, at which time the pressure ending control steps return to step 260. This allows the RR control steps and pressure ending control steps to use the same time step increments "i".

The main difference between the methods shown in FIG. 36 and FIG. 37 is that the decision to stop the fill in FIG. 36 is based solely on the $\rho_{SOC\text{-}MC(i)}$, but the method in FIG. 37 considers both of the $\rho_{SOC\text{-}MC(i)}$ and the $\rho_{SOC\text{-}comm(i)}$ when deciding whether to stop the fill of tank 124.

According to another aspect, the modified MC Method may be further modified (second modified MC Method) to employ active/dynamic fueling speed control in which the hydrogen station or dispenser continuously calculates the mass average pre-cooling temperature (MAT), and uses the continuously calculated mass average pre-cooling temperature to adjust the fueling speed. More particularly, the second modified MC Method adjusts the fueling speed based on a pressure ramp rate (RR), calculated using the mass average pre-cooling temperature, such that the gas temperature inside the tank does not exceed a target temperature, i.e., the 85° C. safety limit established in SAE J2601. The mass average pre-cooling temperature is calculated based on the time elapsed since the beginning of the fill of tank 124 ($t$) and pressure of the gas measured at the nozzle 120 of the dispenser 114 ($P$). Like the modified MC method described above, the estimated end of fill mass average enthalpy (MAE) is still used, but only to calculate the MC equation in the second modified MC method. Further, the estimated end of fill mass average enthalpy in the second modified MC method is derived from the mass average pre-cooling temperature and estimated total fill time ($t_{fin}$) using the enthalpy map equation [24]. The total fill time ($t_{final}$) is determined based on the MC equation [25] that is calculated using the estimated end of fill mass average enthalpy.

Further, like the above-described modified MC Method, the second modified MC Method uses active fueling speed control controls. However, whereas the above-described modified MC method active fueling speed control continuously calculates the mass average enthalpy of the dispensed hydrogen based on real-time measured conditions during the hydrogen fill, the second modified MC method active fueling speed control continuously calculates the mass average pre-cooling temperature. The fueling speed is then adjusted during the hydrogen fill based on the RR, which is continuously determined based on the continuously calculated values of the mass average pre-cooling temperature.

Mass average pre-cooling temperature can be determined using the time elapsed since the beginning of the fill and the pressure in tank 124. Generally, when more than 30 seconds have elapsed since the beginning of the fill and the pressure in tank 124 is greater than 50 MPa, the mass average pre-cooling temperature is calculated based on a $P_{final}$, P, $T_{30ave}$, and $T_{0ave}$, using mass average pre-cooling temperature map equation [23]. Equation [23] uses a weighted average of $T_{30ave}$ and $T_{0ave}$ that changes with rising pressure in tank 124, such that at a highest allowed dispenser pressure, the weighting is 100% on the $T_{0ave}$ measured from the beginning of the fill. If more than 30 second has elapsed since the beginning of the fill, but the pressure within tank 124 has not reached 50 MPa, the mass average pre-cooling temperature is set equal to $T_{30ave}$. If more than 30 second has not elapsed since the beginning of the fill, the mass average pre-cooling temperature is set equal to $MAT_{expected}$.

RR can be determined by $P_{final}$, P, fill time ($t_{final}$), $P_{min}$, and t using equation [25]. As detailed above, by continuously calculating the mass average pre-cooling temperature, and using the continuously calculated mass average pre-cooling temperature to continuously calculate the RR, the fueling speed can be actively determined and adjusted during the hydrogen fill to optimize the hydrogen fill.

Returning to the flowcharts of FIGS. 30-40, a method of filling a compressed gas tank 124 includes determining a fill time ($t_{final}$) predicted to produce a gas final temperature ($T_{final}$), determining a final pressure ($P_{final}$) calculated to produce a state of charge of 100% within the compressed gas tank 124, and delivering gas to the compressed gas tank 124 at a pressure ramp rate (RR) using equation [26] that achieves the final pressure $P_{final}$ at a conclusion of the fill time ($t_{final}$) in tank 124.

The method further includes calculating a mass average pre-cooling temperature of the gas (MAT), calculating an estimated end of fill mass average enthalpy of the gas dispensed to the tank 124 based on at least the mass average pre-cooling temperature using equation [24] or [20], and calculating the fill time ($t_{final}$) based on the estimated end of fill mass average enthalpy.

The mass average pre-cooling temperature of the gas (MAT) is determined by setting the mass average pre-cooling temperature (MAT) to equal a predetermined expected mass average pre-cooling temperature ($MAT_{expected}$), when less than a predetermined amount of time has elapsed since a beginning of the fill (e.g. 30 seconds). Further, the mass average pre-cooling temperature (MAT) is set equal to a mass average pre-cooling temperature iteratively calculated from the predetermined time following the beginning of the fill until the current time ($T_{30ave}$), when a predetermined amount of time has elapsed since the beginning of the fill and a pressure of the gas measured at the nozzle 120 of the dispenser 114 is less than a predetermined pressure (e.g. 50 MPa). Further, when a predetermined amount of time has elapsed since the beginning of the fill and the pressure of the gas measured at the nozzle 120 of the dispenser 114 is greater than or equal to the predetermined pressure (e.g. 50 MPa), the mass average pre-cooling temperature (MAT) is calculated using equation [23]. Equation [23] calculates the mass average pre-cooling temperature (MAT) using a transitional weighted average of a mass average pre-cooling temperature iteratively calculated since the beginning of the fill until the current time ($T_{0ave}$) and the mass average pre-cooling temperature iteratively calculated from the predetermined time following the beginning of the fill until the current time ($T_{30ave}$).

In equation [25], a weighting factor on the mass average pre-cooling temperature iteratively calculated since the beginning of the fill until the current time ($T_{0ave}$) is increased and a weighting factor on the weight on the mass average pre-cooling temperature calculated from the predetermined time following the beginning of the fill until the current time ($T_{30ave}$) is decreased as the pressure of the gas at the nozzle 120 of the dispenser 114 (P) increases. An increase in the pressure of the gas at the nozzle 120 of the dispenser 114 (P) naturally results in an increase in the pressure of the gas in the gas tank 124.

The estimated end of fill mass average enthalpy is calculated based on at least the mass average pre-cooling temperature (MAT) and an adjustment factor ($\alpha$) that accounts for variability in the pressure ramp rate (RR). In some embodiments, the mass average pre-cooling temperature of the gas (MAT), estimated end of fill mass average enthalpy of the gas, and the fill time ($t_{final}$) are continuously calculated. It is noted that fill time ($t_{final}$) of equation [20] has been further specified as $t_{fin(j)}$ in equation [24]. However, the equations [20] and [24] remain identical since fill time ($t_{final}$) is set equal to $t_{fin(j)}$ during the last iteration of the calculation of the fill time ($t_{final}$). Further, it is noted that the estimated end of fill mass average enthalpy of the gas is represented by MAE in equation [20] and represented in iteratively calculated equation [24] by $h_{ave\_Em(j)}$.

More specifically, an estimation of the fill time $t_{final}$ ($t_{fin}$) is iteratively calculated using equation [24] until the estimation of the fill time ($t_{in}$) is less than a predetermined value of the estimation of the fill time ($t_{fin}$), and an absolute value of MC difference ($MC_{diff}$) is less than a predetermined value of MC difference ($MC_{diff}$). The predetermined value of MC difference ($MC_{diff}$) is the difference between a required MC ($MC_{req}$) for the tank 124 in hot soak conditions and an actual MC (MC) calculated for the tank 124 in hot soak conditions. The actual MC (MC) is calculated using equations [19] or [25], which slightly differ only in nomenclature and therefore produce the same result. More specifically. the general term ($\Delta t$), for a final fill time beyond a minimum fill time used in equation [19], is further specified as the term $\Delta t_{hot(j)}$ in equation [25], which represents a final fill time beyond a minimum fill time for the current iteration.

The method further includes stopping the delivery of gas to the gas tank 124 when a communication density of gas ($\rho_{SOC\text{-}comm}$) in the gas tank 124 is greater than a communication density limit ($\rho_{SOC\text{-}comm\text{-}end}$). The delivery of gas to the gas tank 124 is also stopped when an MC density of gas ($\rho_{SOC\text{-}MC}$) in the gas tank 124 is greater than an MC density of gas limit ($\rho_{SOC\text{-}MC\text{-}end}$). The delivery of gas to the gas tank 124 is also stopped when the MC density of hydrogen gas ($\rho_{SOC\text{-}MC}$) in the gas tank 124 is greater than an MC non-communication density of gas limit ($\rho_{SOC\text{-}MC\text{-}end\text{-}non\text{-}comm}$). The delivery of gas to the gas tank 124 is also stopped when a current pressure of gas (P) at the nozzle 120 of the dispenser 114 (P) is greater than or equal to a gas tank pressure limit ($P_{max}$).

With reference to FIG. 41, to continuously determine the mass average pre-cooling temperature, a hydrogen filling station 100 is provided with a temperature sensor 102, a pressure sensor 104, a mass flow meter 106, an optional communication receiver 107, a hydrogen flow regulator 108, and an ambient temperature sensor 110, all of which communicate with a hydrogen station controller 112 (controller 112). The hydrogen station 100 also includes a dispenser 114 which includes a base 116 and a hose 118. The hose 118 is connected to and extends from the base 116, and includes a nozzle 120 at a distal end thereof. In some embodiments, a breakaway 119 is located between the base 116 and the nozzle 120 along the hose 118. The nozzle 120 is configured to couple with a vehicle input receptacle 122 which communicates with a vehicle gas tank 124. Hydrogen gas is communicated from a source through the base 116 and hose 118 to the vehicle gas tank 124 during fueling. In some embodiments, tank 124 has a tank temperature sensor 125, which makes direct measurements of the temperature of the gas in tank 124 and provides these temperatures to controller 112 of hydrogen station 100 through communication receiver 107 and input receiver 126. Tank temperature sensor 125 and hydrogen station 100 can communicate using a variety of protocols through communication receiver 107, such as, but not limited to, IRDA.

The temperature sensor 102, pressure sensor 104, mass flow meter 106, communication receiver 107, hydrogen flow regulator 108, ambient temperature sensor 110, and controller 112 are used to control the operation of the hydrogen station 100. The temperature sensor 102, pressure sensor 104, mass flow meter 106, hydrogen flow regulator 108, and ambient temperature sensor 110 are generally known devices, and will therefore not be described in detail herein. The controller 112 may include one or more arithmetic processors, computers, or any other devices capable of receiving all of the herein-described measurement inputs, performing all of the herein-described calculations, and controlling the dispenser 114 to dispense hydrogen to the vehicle gas tank 124 as described herein.

To this end, the controller 112 may include an input receiver 126 and a fueling speed controller 128. The input receiver 126 communicates with, and continuously receives measurement values as inputs from, the temperature sensor 102, pressure sensor 104, mass flow meter 106, optional communication receiver 107, and ambient temperature sensor 110. The input receiver 126 continuously communicates these inputs to the fueling speed controller 128. The fueling speed controller 128 calculates the fueling speed in the manner described below, and controls the hydrogen flow regulator 108 to cause the dispenser 114 to dispense hydrogen at the calculated fueling speed. More specifically, the fueling speed controller 128 continuously receives the inputs from the input receiver 126, performs the necessary calculations to continuously calculate the mass average pre-cooling temperature, estimated end of fill mass average enthalpy, pressure rate ramp, and fueling speed, and continuously controls the hydrogen flow regulator 108 to cause the dispenser 114 to dispense hydrogen at the continuously determined fueling speed. It is to be appreciated that the controller 112 may be used to receive inputs and perform calculations related to all of the other calculations of the above-described MC Method, modified MC Method, and second modified MC method.

With reference to the hydrogen station 100 in FIG. 41, which includes a dispenser 114 having a base 116 and a hose 118, the inputs to Equation [26], and the above algorithm, are provided by the temperature sensor 102, pressure sensor 104, mass flow meter 106, and ambient temperature sensor 110, and optional tank temperature sensor 125 via communication receiver 107, which respectively measure the temperature of the hydrogen gas at nozzle 120, the pressure of the hydrogen gas at nozzle 120, the mass of hydrogen gas dispensed by dispenser 120, the temperature of the hydrogen gas in tank 124, and the ambient temperature at dispenser 114. These values are continuously measured and output to the input receiver 126 of the controller 112. The input receiver 126 receives these values and communicates these values to the fueling speed controller 128. The fueling speed controller 128 then continuously calculates the mass average pre-cooling temperature of the hydrogen gas mass average pre-cooling temperature, estimated end of fill mass average enthalpy, the total time to complete the hydrogen fill ($t_{final}$), the pressure ramp rate RR, and the fueling speed in manner discussed above. The fueling speed controller 128 then controls the hydrogen flow regulator 108 to cause the dispenser 114 to dispense hydrogen to the vehicle tank 124 at the determined fueling speed. This process is continuously (iteratively or non-iteratively) performed (e.g., at each of a plurality of time steps) during the hydrogen fill, such that the fueling speed is actively adjusted during the hydrogen fill.

Also shown in FIG. 41 is the vehicle tank system 130, which includes the vehicle input receptacle 122, at least one valve 129, tank system tubing 123, vehicle tank 124, and optional tank temperature sensor 125.

Further, with reference to FIG. 41, the hydrogen filling station 100, in some embodiments, includes a dispenser 114 for providing hydrogen to a vehicle gas tank 124 and a hydrogen filling station controller 112. The hydrogen filling station controller 112 includes an input receiver 126 configured to continuously receive measured values of a pressure, a temperature, and a flow rate of hydrogen dispensed to the gas tank 124 from a temperature sensor 102, a pressure sensor 104, and a mass flow meter 106 provided in the dispenser 114 of the hydrogen gas filling station 100.

The hydrogen filling station controller 112 also includes a fueling speed controller 128 configured to calculate a mass average pre-cooling temperature of the hydrogen gas (MAT) using mass average pre-cooling temperature map equation [23] and calculate an estimated end of fill mass average enthalpy of the gas dispensed to the tank 124 using enthalpy map equations [20] or [24] based on at least the mass average pre-cooling temperature (MAT) while the hydrogen is being dispensed to the gas tank 124 by the dispenser 114 of the hydrogen filling station 100. The fueling speed controller 128 is further configured to calculate a fill time ($t_{final}$) based on the estimated end of fill mass average enthalpy, while the hydrogen is being dispensed to the gas tank 124 by the dispenser 114 of the hydrogen filling station 100.

The fueling speed controller 128 is also configured to calculate a pressure ramp rate (RR) using pressure ramp rate equation [25] that achieves a final pressure $P_{final}$ based on the fill time ($t_{final}$) while the hydrogen is being dispensed to the gas tank 124 by the dispenser 114 of the hydrogen filling station 100. The fueling speed controller 128 is additionally configured to determine a fueling speed based on the pressure ramp rate RR while the hydrogen is being dispensed to the gas tank 124 by the dispenser 114 of the hydrogen filling station 100. The fueling speed controller 128 is further configured to control the dispenser 114 of the hydrogen filling station 100 to adjust a fueling speed while the hydrogen is being dispensed to the gas tank 124 by the dispenser 114 of the hydrogen filling station 100.

With additional reference to FIG. 41, in some embodiments of hydrogen station 100, hydrogen station controller 112 includes an input receiver 126 configured to continuously receive measured values of a pressure, a temperature, and a flow rate of hydrogen dispensed to the gas tank 124 from a temperature sensor 102, a pressure sensor 104, and a mass flow meter 106 provided in the dispenser 114 of the hydrogen gas filling station 100.

The hydrogen filling station controller 112 also includes a fueling speed controller 128 configured to calculate a mass average pre-cooling temperature of the hydrogen gas (MAT) using mass average pre-cooling temperature map equation 23 and calculate an estimated end of fill mass average enthalpy of the gas dispensed to the tank 124 using enthalpy map equations [20] or [24] based on at least the mass average pre-cooling temperature (MAT) while the hydrogen is being dispensed to the gas tank 124 by the dispenser 114 of the hydrogen filling station 100. The fueling speed controller 128 is further configured to calculate a fill time ($t_{final}$) based on the estimated end of fill mass average enthalpy, while the hydrogen is being dispensed to the gas tank 124 by the dispenser 114 of the hydrogen filling station 100.

The hydrogen station controller 112 is further configured to set the mass average pre-cooling temperature (MAT) to equal a predetermined expected mass average pre-cooling temperature ($MAT_{expected}$), when less than a predetermined amount of time has elapsed since a beginning of the fill (e.g. 30 seconds). Further, the hydrogen station controller 112 is also configured to set the mass average pre-cooling temperature (MAT) equal to a mass average pre-cooling temperature iteratively calculated from the predetermined time following the beginning of the fill until the current time ($T_{30ave}$), when a predetermined amount of time has elapsed since the beginning of the fill and a pressure of the gas measured at the nozzle 120 of the dispenser 114 is less than a predetermined pressure (e.g. 50 MPa). Further, the hydrogen station controller 112 is additionally configured to set the mass average pre-cooling temperature (MAT) using equation [23] when a predetermined amount of time has elapsed since the beginning of the fill and a pressure of gas (P) measured at the nozzle 120 of the dispenser 114 is greater than or equal to the predetermined pressure (e.g. 50 MPa). Equation [23] calculates the mass average pre-cooling temperature (MAT) using a transitional weighted average of a mass average pre-cooling temperature iteratively calculated since the beginning of the fill until the current time ($T_{0ave}$) and the mass average pre-cooling temperature iteratively calculated from the predetermined time following the beginning of the fill until the current time ($T_{30ave}$).

In equation [25], a weighting factor on the mass average pre-cooling temperature iteratively calculated since the beginning of the fill until the current time ($T_{0ave}$) is increased and a weighting factor on the weight on the mass average pre-cooling temperature calculated from the predetermined time following the beginning of the fill until the current time ($T_{30ave}$) is decreased as the pressure of the gas at the nozzle 120 of the dispenser 114 (P) increases. An increase in the pressure of the gas at the nozzle 120 of the dispenser 114 (P) naturally results in an increase in the pressure of the gas in the gas tank 124.

The hydrogen station controller 112 is further configured to calculate the estimated end of fill mass average enthalpy based on at least the mass average pre-cooling temperature (MAT) and an adjustment factor ($\alpha$) that accounts for variability in the pressure ramp rate (RR). In some embodiments, hydrogen station controller 112 is configured to continuously calculate the mass average pre-cooling temperature of the gas (MAT), estimated end of fill mass average enthalpy of the gas, and the fill time ($t_{final}$).

More specifically, hydrogen station controller 112 is configured to calculate an estimation of the fill time for the current time step ($t_{fin}$) iteratively using equation [24] until the estimation of the fill time ($t_{fin}$) is less than a predetermined value of the estimation of the fill time ($t_{fin}$), and an absolute value of MC difference ($MC_{diff}$) is less than a predetermined value of MC difference ($MC_{diff}$). The predetermined value of MC difference ($MC_{diff}$) is the difference between a required MC ($MC_{req}$) for the tank in hot soak conditions and an actual MC (MC) calculated for the tank in hot soak conditions. The actual MC (MC) is calculated using MC equations [19] or [25].

The hydrogen station controller 112 is further configured to stop the delivery of gas to the gas tank 124 when a communication density of gas ($\rho_{SOC\text{-}comm}$) in the gas tank 124 is greater than a communication density limit ($\rho_{SOC\text{-}comm\text{-}end}$). The hydrogen station controller 112 is additionally configured to stop the delivery of gas to the gas tank 124 when an MC density of gas ($\rho_{SOC\text{-}MC}$) in the gas tank 124 is greater than an MC density of gas limit ($\rho SOC\text{-}MC\text{-}end$). The hydrogen station controller 112 is further configured to stop the delivery of gas to the gas tank 124 when the MC density of hydrogen gas ($\rho_{SOC\text{-}MC}$) in the gas tank 124 is greater than an MC non-communication density of gas limit ($\rho_{SOC\text{-}MC\text{-}end\text{-}non\text{-}comm}$). The hydrogen station controller 112 is also configured to stop the delivery of gas to the gas tank 124 when a current pressure of gas (P) measured at the nozzle 120 of the dispenser 114 is greater than or equal to a gas tank pressure limit ($P_{max}$).

By the above-described active fueling speed control, the fueling speed may be determined to optimize the hydrogen fill so as to, for example, reduce the time required for the hydrogen fill to complete while adhering to the relevant safety parameters (i.e., while keeping the hydrogen temperature below 85° C.). To this point, the mass average pre-cooling temperature, as in the above-described second modified MC method, may determine a better fueling speed value than that obtained otherwise.

Although the MC Method, modified MC method, and second modified MC method were developed and have been described with an emphasis on filling vehicle hydrogen tanks at hydrogen filling stations, modification of the MC Method, modified MC method, and second modified MC method to improve their performance in connection with fueling hydrogen busses or fueling systems with cryogenic gasses or liquids is certainly contemplated. Similarly, it is anticipated that the MC Method, modified MC method, and second modified MC method could readily be adapted for use in conjunction with compressed natural gas vehicle fueling, or fast filling of vessels involving any industrial gas and/or for calculating the resulting temperature of any process in which a pressurized gas is injected into a pressure vessel. The applicability of the MC Method, modified MC method, and second modified MC method and the associated constants reflecting the thermodynamic properties and behavior for other processes can be determined by applying a similar test matrix as set out above in connection with compressed hydrogen tank refueling for automobiles.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of filling a compressed gas tank, comprising:
determining a fill time ($t_{final}$) predicted to produce a gas final temperature ($T_{final}$);
determining a final pressure ($P_{final}$) calculated to produce a state of charge of 100% within the compressed gas tank;
delivering gas to the compressed gas tank at a pressure ramp rate (RR) that achieves the final pressure ($P_{final}$) at a conclusion of the fill time ($t_{final}$), wherein the gas is delivered to the compressed gas tank using a dispenser;
calculating a mass average pre-cooling temperature (MAT) of the gas;
calculating an estimated end of fill mass average enthalpy of the gas dispensed to the tank based on at least the mass average pre-cooling temperature (MAT); and
calculating the fill time ($t_{final}$) based on the estimated end of fill mass average enthalpy.

2. A method of filling a compressed gas tank, comprising:
determining a fill time ($t_{final}$) predicted to produce a gas final temperature ($T_{final}$);
determining a final pressure ($P_{final}$) calculated to produce a state of charge of 100% within the compressed gas tank;
delivering gas to compressed gas tank at a pressure ramp rate (RR) that achieves the final pressure ($P_{final}$) at a conclusion of the fill time ($t_{final}$), wherein the gas is delivered to the compressed gas tank using a dispenser;
continuously calculating a mass average pre-cooling temperature (MAT) of the gas;
continuously calculating an estimated end of fill mass average enthalpy of the gas dispensed to the tank based on at least the mass average pre-cooling temperature (MAT); and
continuously calculating the fill time ($t_{final}$) based on the estimated end of fill mass average enthalpy of the gas dispensed to the tank.

3. The method according to claim 2, wherein, while delivering gas to the gas tank, the method comprises:
   continuously calculating the pressure ramp rate (RR) that achieves the final pressure ($P_{final}$) based on the fill time ($t_{final}$);
   continuously determining a fueling speed based on the calculated pressure ramp rate (RR); and
   continuously adjusting the fueling speed to the determined fueling speed while delivering gas to the gas tank.

4. The method according to claim 3, wherein the pressure ramp rate (RR) is continuously calculated according to the equation $$RR = \frac{P_{final} - P}{t_{final}\left(\frac{P_{final} - P_{initial}}{P_{final} - P_{min}}\right) - t}$$

wherein RR is the pressure ramp rate, P is a current pressure of gas measured at a nozzle of the dispenser, $P_{initial}$ is the initial measured pressure of gas in the tank before the fill commenced, $P_{min}$ is the pressure associated with the minimum mass average enthalpy, $t_{final}$ is the fill time, the $P_{final}$ is the pressure calculated to produce a state of charge of 100% within the compressed gas tank, and t is the time elapsed since the fill commenced.

5. The method according to claim 2, wherein calculating the mass average pre-cooling temperature (MAT) includes:
   setting the mass average pre-cooling temperature (MAT) to equal a predetermined expected mass average pre-cooling temperature ($MAT_{expected}$), when less than a predetermined amount of time has elapsed since a beginning of the fill;
   setting the mass average pre-cooling temperature (MAT) equal to a mass average pre-cooling temperature iteratively calculated from the predetermined time following the beginning of the fill until the current time, when the predetermined amount of time has elapsed since the beginning of the fill and a pressure (P) of gas measured at a nozzle of the dispenser is less than a predetermined pressure; and
   setting the mass average pre-cooling temperature (MAT) equal to a transitional weighted average of a mass average pre-cooling temperature iteratively calculated since the beginning of the fill until the current time and the mass average pre-cooling temperature iteratively calculated from the predetermined time following the beginning of the fill until the current time, when the predetermined amount of time has elapsed since the beginning of the fill and the pressure of gas (P) measured at the nozzle of the dispenser is greater than or equal to the predetermined pressure.

6. The method according to claim 5, wherein calculating the transitional weighted average of the mass average pre-cooling temperature includes, increasing a weighting factor on the mass average pre-cooling temperature iteratively calculated since the beginning of the fill until the current time, and decreasing a weighting factor on the mass average pre-cooling temperature iteratively calculated from the predetermined time following the beginning of the fill until the current time, as the pressure of the gas in the gas tank increases.

7. The method according to claim 1, wherein the estimated end of fill mass average enthalpy is calculated based on at least the mass average pre-cooling temperature (MAT) and an adjustment factor ($\alpha$) that accounts for variability in the pressure ramp rate (RR).

8. The method according to claim 1, wherein the estimated end of fill mass average enthalpy is calculated according to the enthalpy map equation $$MAE = \alpha + k + \frac{l}{MAT} + \frac{m}{MAT^2} + \frac{n}{MAT^3} + \frac{p}{MAT^4} + \frac{q}{MAT^5} + \frac{r}{t_{fin}} + \frac{s}{t_{fin}^2} + \frac{v}{t_{fin}^3} + \frac{y}{t_{fin}^4} + \frac{z}{t_{fin}^5}$$

wherein MAE is the estimated end of fill mass average enthalpy, MAT is the mass average pre-cooling temperature, $t_{fin}$ is an estimate of the total time needed to fill the tank from 2 MPa to final pressure $P_{final}$, $\alpha$ is an adjustment factor to account for variability in the pressure ramp rate (RR), and k, l, m, n, p, q, r, s, v, y, z are constants.

9. The method according to claim 1, wherein calculating the fill time ($t_{final}$) comprises:
   iteratively calculating an estimation of the fill time ($t_{fin}$) until the estimation of the fill time ($t_{fin}$) is less than a predetermined value of the estimation of the fill time $t_{fin}$, and an absolute value of an MC difference ($MC_{diff}$) is less than a predetermined value of the MC difference ($MC_{diff}$), where the MC difference ($MC_{diff}$) is the difference between a required MC ($MC_{req}$) for the tank in hot soak conditions and an actual MC (MC) calculated for the tank in hot soak conditions,
   wherein the actual MC (MC) is a composite heat capacity value of the gas in the tank determined according to the equation:

$$MC = a + b\frac{T_{amb}}{MAT} + c(\Delta t) + d\left(\frac{T_{amb}}{MAT}\right)^2 + e(\Delta t)^2 + f(\Delta t)\left(\frac{T_{amb}}{MAT}\right) + g\left(\frac{T_{amb}}{MAT}\right)^3 + h(\Delta t)^3 + i\frac{T_{amb}}{MAT}(\Delta t)^2 + j\left(\frac{T_{amb}}{MAT}\right)^2(\Delta t)$$

wherein a, b, c, d, e, f, g, h, i, and j are constants, $T_{amb}$ is an ambient air temperature, and $\Delta t$ is the final fill time beyond a minimum fill time $t_{min}$ predetermined prior to the start of the fill.

10. The method according to claim 1, wherein, the gas tank is a hydrogen vehicle gas tank.

11. The method according to claim 1, further comprising:
    stopping the delivery of gas to the gas tank when any one of the following occurs:
    a communication density of gas ($\rho_{SOC-comm}$) in the gas tank is greater than a communication density limit ($\rho_{SOC-comm-end}$);
    an MC density of gas ($\rho_{SOC-MC}$) in the gas tank is greater than an MC density of gas limit ($\rho_{SOC-MC-end}$);
    the MC density of hydrogen gas ($\rho_{SOC-MC}$) in the gas tank is greater than an MC non-communication density of gas limit ($\rho_{SOC-MC-end-non-comm}$); or
    a current pressure of gas (P) measured at a nozzle of the dispenser is greater than or equal to a gas tank pressure limit ($P_{max}$).

12. A controller configured to control a hydrogen filling station, the controller comprising:
    an input receiver configured to continuously receive measured values of a pressure (P), a temperature, and a flow rate of hydrogen dispensed to a gas tank from a temperature sensor, a pressure sensor, and a mass flow meter provided in a dispenser of the hydrogen gas filling station; and a fueling speed controller configured to:
  calculate a mass average pre-cooling temperature (MAT) of the hydrogen gas;
  calculate an estimated end of fill mass average enthalpy of the gas dispensed to the tank based on at least the mass average pre-cooling temperature (MAT) while the hydrogen is being dispensed to the gas tank by the dispenser of the hydrogen filling station;
  calculate a fill time ($t_{final}$) based on the estimated end of fill mass average enthalpy while the hydrogen is being dispensed to the gas tank by the dispenser of the hydrogen filling station;
  calculate a pressure ramp rate (RR) that achieves a final pressure ($P_{final}$) based on the fill time ($t_{final}$) while the hydrogen is being dispensed to the gas tank by the dispenser of the hydrogen filling station;
  determine a fueling speed based on the pressure ramp rate (RR) while the hydrogen is being dispensed to the gas tank by the dispenser of the hydrogen filling station; and
  control the dispenser of the hydrogen filling station to adjust the fueling speed while the hydrogen is being dispensed to the gas tank by the dispenser of the hydrogen filling station.

13. The controller according to claim 12, wherein the fueling speed controller is configured to:
  set the mass average pre-cooling temperature (MAT) to equal a predetermined expected mass average pre-cooling temperature ($MAT_{expected}$), when less than a predetermined amount of time has elapsed since a beginning of the fill;
  set the mass average pre-cooling temperature (MAT) equal to a mass average pre-cooling temperature iteratively calculated from the predetermined time following the beginning of the fill until the current time, when the predetermined amount of time has elapsed since the beginning of the fill and the pressure (P) of gas measured at a nozzle of the dispenser is less than a predetermined pressure; and
  calculate the mass average pre-cooling temperature (MAT) by setting the mass average pre-cooling temperature (MAT) equal to a transitional weighted average of a mass average pre-cooling temperature iteratively calculated since the beginning of the fill until the current time and the mass average pre-cooling temperature iteratively calculated from the predetermined time following the beginning of the fill until the current time, when the predetermined amount of time has elapsed since the beginning of the fill and the pressure (P) of gas measured at the nozzle of the dispenser is greater than or equal to the predetermined pressure.

14. The controller according to claim 13, wherein calculating the transitional weighted average of the mass average pre-cooling temperature includes increasing a weighting factor on the mass average pre-cooling temperature iteratively calculated since the beginning of the fill until the current time and decreasing a weighting factor on the mass average pre-cooling temperature iteratively calculated from the predetermined time following the beginning of the fill until the current time as the pressure of the gas in the gas tank increases.

15. The controller according to claim 12, wherein the fueling speed controller is configured to calculate the estimated end of fill mass average enthalpy according to the enthalpy map equation:

$$MAE = \alpha + k + \frac{l}{MAT} + \frac{m}{MAT^2} + \frac{n}{MAT^3} + \frac{p}{MAT^4} + \frac{q}{MAT^5} + \frac{r}{t_{fin}} + \frac{s}{t_{fin}^2} + \frac{v}{t_{fin}^3} + \frac{y}{t_{fin}^4} + \frac{z}{t_{fin}^5}$$

wherein MAE is the estimated end of fill mass average enthalpy, MAT is the mass average pre-cooling temperature, $t_{fin}$ is an estimate of the total time needed to fill the tank from 2 MPa to final pressure $P_{final}$, $\alpha$ is an adjustment factor to account for variability in the pressure ramp rate RR, and k, l, m, n, p, q, r, s, v, y, z are constants.

16. The controller according to claim 12, wherein the fueling speed controller is configured to calculate the fill time $t_{final}$ by:
  iteratively calculating an estimation of the fill time ($t_{fin}$) until the estimation of the fill time $t_{fin}$ is less than a predetermined value of the estimation of the fill time ($t_{fin}$), and an absolute value of an MC difference ($MC_{diff}$) is less than a predetermined value of the MC difference ($MC_{diff}$), where the MC difference ($MC_{diff}$) is the difference between a required MC ($MC_{req}$) for the tank in hot soak conditions and an actual MC (MC) calculated for the tank in hot soak conditions,
  wherein the actual MC (MC) is a composite heat capacity value of the gas in the tank determined according to the equation:

$$MC = a + b\frac{T_{amb}}{MAT} + c(\Delta t) + d\left(\frac{T_{amb}}{MAT}\right)^2 + e(\Delta t)^2 + f(\Delta t)\left(\frac{T_{amb}}{MAT}\right) + g\left(\frac{T_{amb}}{MAT}\right)^3 + h(\Delta t)^3 + i\frac{T_{amb}}{MAT}(\Delta t)^2 + j\left(\frac{T_{amb}}{MAT}\right)^2(\Delta t)$$

wherein a, b, c, d, e, f, g, h, i, and j are constants, $T_{amb}$ is an ambient air temperature, and $\Delta t$ is the final fill time beyond a minimum fill time $t_{min}$ predetermined prior to the start of the fill.

17. The controller according to claim 12, wherein the fueling speed controller is configured to continuously calculate the pressure ramp rate (RR) according to the equation $$RR = \frac{P_{final} - P}{t_{final}\left(\frac{P_{final} - P_{initial}}{P_{final} - P_{min}}\right) - t}$$

wherein RR is the pressure ramp rate, P is the current pressure of gas measured at a nozzle of the dispenser, $P_{initial}$ is an initial measured pressure of gas in the tank before the fill commenced, $P_{min}$ is a pressure associated with a minimum mass average enthalpy, $t_{final}$ is the fill time, the $P_{final}$ is the pressure calculated to produce a state of charge of 100% within the compressed gas tank, and t is the time elapsed since the fill commenced.

18. The controller according to claim 12, wherein the fueling speed controller is further configured to:
  stop the delivery of hydrogen gas to the compressed gas tank when any one of the following occur:
    a communication density of hydrogen gas ($\rho_{SOC\text{-}comm}$) in the gas tank is greater than a communication density limit ($\rho_{SOC\text{-}comm\text{-}end}$);
    an MC density of hydrogen gas ($\rho_{SOC\text{-}MC}$) in the gas tank is greater than an MC density of gas limit ($\rho_{SOC\text{-}MC\text{-}end}$);

the MC density of hydrogen gas ($\rho_{SOC\text{-}MC}$) in the gas tank is greater than an MC non-communication density of gas limit ($\rho_{SOC\text{-}MC\text{-}end\text{-}non\text{-}comm}$), or the current pressure (P) of hydrogen gas measured at a nozzle of the dispenser is greater than or equal to a gas tank pressure limit ($P_{max}$).

19. The method according to claim 2, wherein the gas tank is a hydrogen vehicle gas tank.

20. The method according to claim 2, further comprising:
stopping the delivery of gas to the as tank when any one of the following occurs:
 a communication density of gas (ρSOC-comm) in the gas tank is greater than a communication density limit (ρSOC-comm-end);
 an MC density of gas (ρSOC-MC) in the gas tank is grater than an MC density of gas limit (ρSOC-MC-end);
 the MC density of hydrogen gas (ρSOC-MC) in the gas tank is greater than an MC non-communication density of gas limit (ρSOC-MC-end-non-comm); or
 a current pressure of gas (P) measured at a nozzle of the dispenser is greater than or equal to a gas tank pressure limit (Pmax).

* * * * *